(12) United States Patent
Greenfield

(10) Patent No.: US 10,311,763 B2
(45) Date of Patent: Jun. 4, 2019

(54) COLLAPSIBLE LAND-BASED MULTI-DIRECTIONAL SIGNAL ASSEMBLY

(71) Applicant: Michael Greenfield, Boca Raton, FL (US)

(72) Inventor: Michael Greenfield, Boca Raton, FL (US)

( * ) Notice: Subject to any disclaimer, the term of this patent is extended or adjusted under 35 U.S.C. 154(b) by 9 days.

(21) Appl. No.: 15/811,052

(22) Filed: Nov. 13, 2017

(65) Prior Publication Data

US 2018/0130387 A1 May 10, 2018

Related U.S. Application Data

(63) Continuation-in-part of application No. 14/855,888, filed on Sep. 16, 2015, now Pat. No. 9,815,536, which
(Continued)

(51) Int. Cl.

| | |
|---|---|
| *G09F 11/30* | (2006.01) |
| *B64F 1/36* | (2017.01) |
| *G09F 13/16* | (2006.01) |
| *B63B 22/16* | (2006.01) |
| *E01F 9/688* | (2016.01) |
| *G09F 13/22* | (2006.01) |
| *G09F 15/00* | (2006.01) |
| *G09F 19/02* | (2006.01) |
| *E01F 9/65* | (2016.01) |
| *B63C 11/26* | (2006.01) |
| *G09F 7/00* | (2006.01) |

(52) U.S. Cl.
CPC .............. *G09F 11/30* (2013.01); *B63B 22/16* (2013.01); *B63C 11/26* (2013.01); *B64F 1/36* (2013.01); *E01F 9/65* (2016.02); *E01F 9/688* (2016.02); *G09F 13/16* (2013.01); *G09F 13/22* (2013.01); *G09F 15/0062* (2013.01); *G09F 19/02* (2013.01); *G09F 2007/005* (2013.01); *G09F 2013/222* (2013.01)

(58) Field of Classification Search
CPC ........ G09F 11/30; G09F 15/0062; E01F 9/65; E01F 9/688
See application file for complete search history.

(56) References Cited

U.S. PATENT DOCUMENTS

| | | | | |
|---|---|---|---|---|
| 1,798,052 A | * | 3/1931 | Additon | B60Q 1/50 116/63 P |
| 2,693,044 A | * | 11/1954 | Roemisch | E01F 9/65 116/DIG. 7 |

(Continued)

*Primary Examiner* — Gary C Hoge
(74) *Attorney, Agent, or Firm* — Malloy & Malloy, P.L.

(57) ABSTRACT

A collapsible land-based multi-directional signal assembly includes a signal display assembly having one or more display surface, and at least one signal indicia affixed to each display surface. A collapsible land-based collapsible multi-directional signal assembly includes a multi-directional signal display assembly comprising a plurality of signal display panels. Each of the plurality of signal display panels comprising at least one display surface, and a plurality of signal indicia are affixed onto different ones of each of the plurality of display surfaces. A signal support assembly is provided such that the collapsible land-based multi-directional signal display assembly is disposable into a deployed orientation about the signal support member.

14 Claims, 75 Drawing Sheets

Related U.S. Application Data is a continuation-in-part of application No. 14/743,449, filed on Jun. 18, 2015, now Pat. No. 9,783,274, which is a continuation-in-part of application No. 14/319,984, filed on Jun. 30, 2014, now Pat. No. 9,302,743, which is a continuation-in-part of application No. 14/157,207, filed on Jan. 16, 2014, now Pat. No. 9,327,803, which is a continuation-in-part of application No. 14/071,782, filed on Nov. 5, 2013, now Pat. No. 9,221,525.

(60) Provisional application No. 62/108,244, filed on Jan. 27, 2015, provisional application No. 62/079,229, filed on Nov. 13, 2014, provisional application No. 62/072,148, filed on Oct. 29, 2014, provisional application No. 62/051,045, filed on Sep. 16, 2014, provisional application No. 62/014,217, filed on Jun. 19, 2014, provisional application No. 62/013,784, filed on Jun. 18, 2014, provisional application No. 62/011,285, filed on Jun. 12, 2014, provisional application No. 61/980,244, filed on May 8, 2014, provisional application No. 61/753,011, filed on Jan. 16, 2013.

(56) References Cited

U.S. PATENT DOCUMENTS

| | | | | |
|---|---|---|---|---|
| 2,781,017 | A * | 2/1957 | Fuller | B60Q 7/005 116/63 R |
| 5,363,792 | A * | 11/1994 | Petechik | B60Q 1/50 116/28 R |
| D362,199 | S * | 9/1995 | Evans | D10/109.1 |
| 6,149,339 | A * | 11/2000 | Salloum | E01F 13/02 116/63 P |
| 6,857,385 | B1 * | 2/2005 | Chen | B60Q 7/00 116/63 P |
| 7,549,248 | B1 * | 6/2009 | Luster | A01M 31/06 40/412 |
| 8,907,779 | B1 * | 12/2014 | Ross | B62J 6/00 340/473 |
| 2012/0204455 | A1 * | 8/2012 | Mothaffar | G09F 13/22 40/610 |
| 2017/0268187 | A1 * | 9/2017 | Willi | G09F 7/22 |
| 2018/0119372 | A1 * | 5/2018 | McO'Neil | E01F 9/654 |

* cited by examiner

TABLE 1

TOWING RESISTANCE TESTING RESULTS

Submerged Towing Resistance (Newtons)

|  | Slow | Medium | Fast |
|---|---|---|---|
| Large cube | 7.78 | 12.23 | 20.02 |
| Large cube w/ deflector | 4.45 | 6.67 | 11.12 |
| Small cube | 3.34 | 11.12 | 16.68 |
| Small cube w/ deflector | 3.34 | 6.67 | 7.78 |
| Traditional Flag | negligible | <2 | <4 |

Surface Towing Resistance (Newtons)

|  | Slow | Medium | Fast |
|---|---|---|---|
| Large cube | 3.34 | 12.23 | 18.90 |
| Large cube w/ deflector | 3.34 | 7.78 | 8.23 |
| Small cube | 3.34 | 12.23 | 17.79 |
| Small cube w/ deflector | 3.34 | 5.56 | 6.67 |
| Traditional Flag | negligible | <2 | <4 |

FIG 39

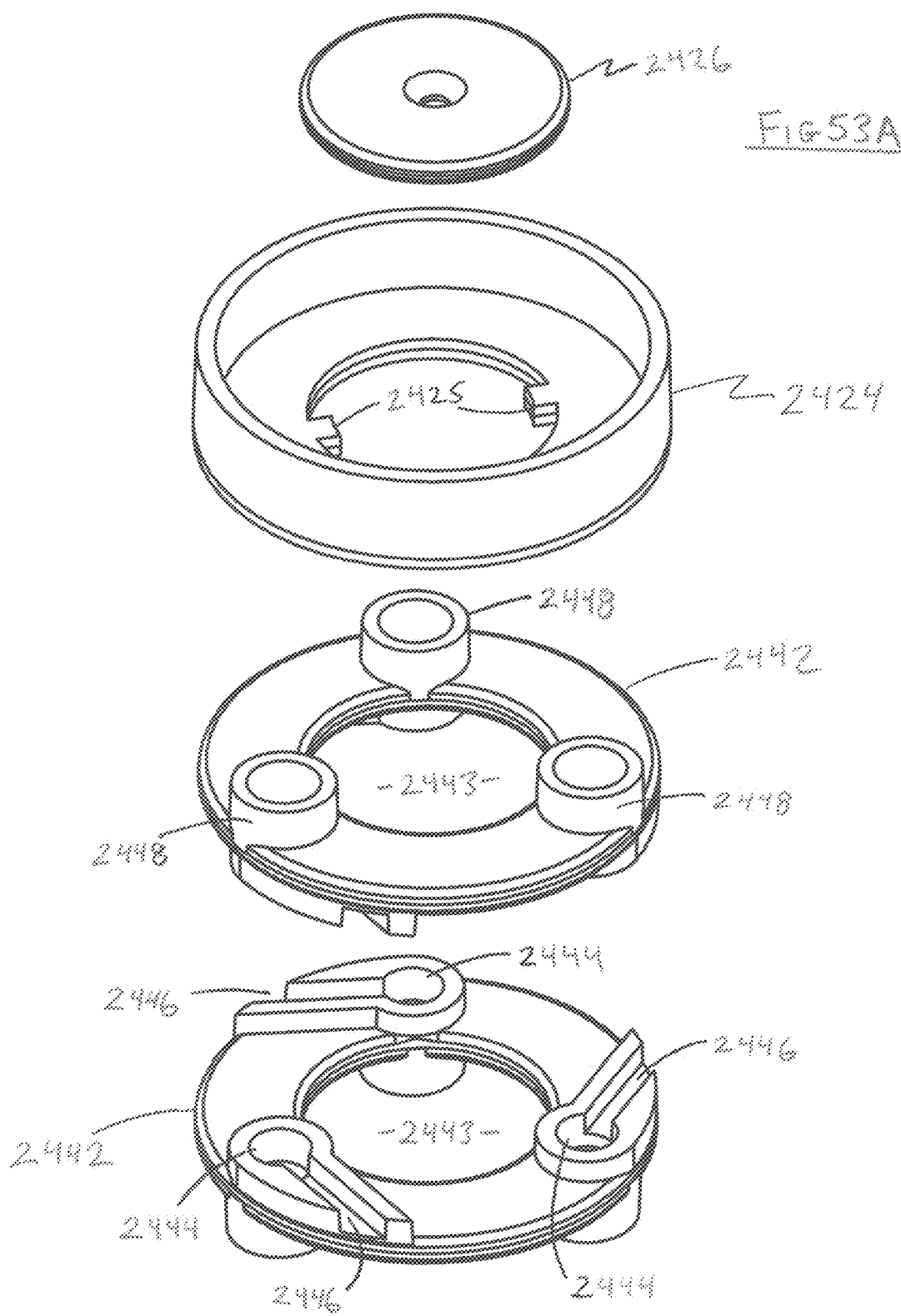

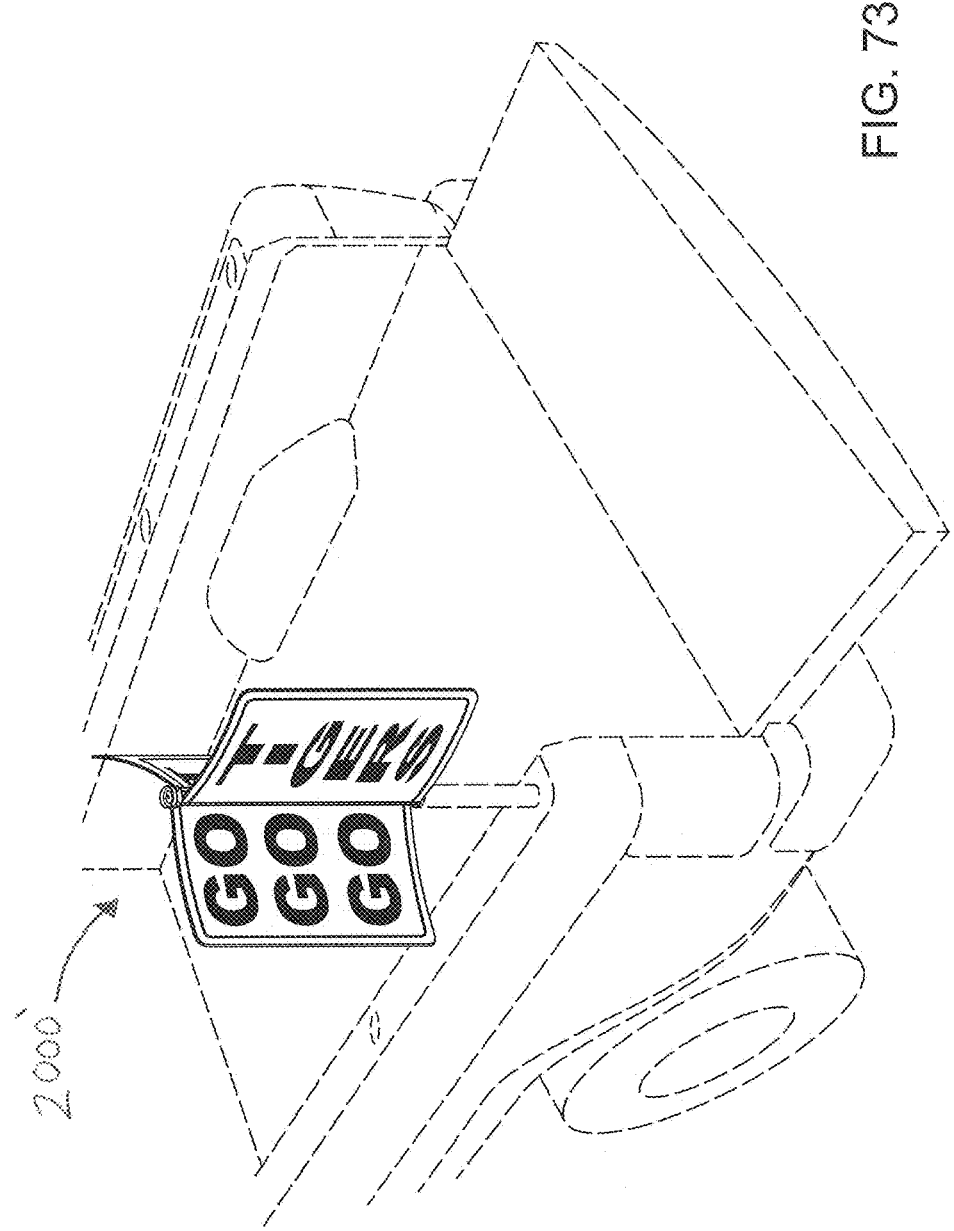

COLLAPSIBLE LAND-BASED MULTI-DIRECTIONAL SIGNAL ASSEMBLY

BACKGROUND

Field of the Invention

A collapsible multi-directional signal assembly, in one embodiment, is deployable in a land-based installation. A signal display assembly comprises one or more signal indicia affixed thereto, wherein the signal indicia are visible from essentially any point along a circle circumscribed along an axis through around a vertical axis through the assembly, such as, through a signal support assembly.

Description of the Related Art

The U.S. dive flag is an internationally recognized symbol indicating that one or more diver, snorkeler, or swimmer is in a body of water in the vicinity of the dive flag. This is a critical indication to alert boaters to the presence of one or more person in the water, such that they can adjust their course and avoid endangering the divers, snorkelers, etc. The most common means for the presentation of the U.S. dive flag is literally a flat, two-dimensional flag that is affixed to one end of a short flagpole, which is then affixed to an upper end of a small float or small buoy. While this may be adequate in calm waters on a clear day, with little wind, where the dive flag remains upright, unfurled, and reasonably visible to approaching boats, such days are few and far between.

As such, a number of devices have been developed in attempts to improve the visibility and alert boaters to the presence of a dive flag, and more importantly, the divers or other person in the water proximate thereto. One such device incorporates three separate two-dimensional dive flags each originating and extending outwardly from a common central flag pole or mast. A U.S. dive flag symbol is displayed across two panels of adjacent ones of the three dive flags. That is to say, one half of the U.S. dive flag is displayed on each side of each of the three two-dimensional dive flags, with adjacent sides forming the complete symbol. While the incorporation of three flag would seem to improve visibility, the fact remains that if a boater is on a course aligned with an edge of one of the three two-dimensional flags, the dive flag symbols may not be readily visible to the boater.

Another device comprises an inflatable body member having three or four sides, each having a dive flag symbol on each side. While this eliminates the issues associated with collapsible two dimensional flags, as well as lack of visibility along certain bearings of an oncoming watercraft, the body is structured to float directly on the surface of the water, such that in even modest wind and waves, the marker may be only intermittently visible to boaters in an oncoming vessel.

As such, it would be beneficial to provide a multi-directional signal assembly which is buoyant, so as to float on the surface of the water, and which includes one or more elongated display surface having an upper portion and a lower portion, and signal indicia affixed to the upper portion of the display surface to increase visibility to oncoming boaters by virtue of being maintained above the surface of the water. A counterweight assembly structured to maintain the display surface(s) in a generally upright orientation while deployed would provide a further benefit to assure that signal indicia affixed to a display surface remains visible while a multi-directional signal assembly is deployed. It would also be advantageous to combine an illumination assembly with such a multi-directional signal display, once again, to improve visibly of the assembly to oncoming boaters regardless of their course or bearing relative to the assembly while it is deployed in a body of water.

SUMMARY

The present disclosure is directed to a new and novel multi-directional signal assembly deployable on a surface of a body of water or a water borne vessel, or in a land-based installation or land-based vehicle. More importantly, the present disclosure provides a multi-directional signal assembly which is essentially visible from any point along a circle circumscribed around a vertical axis through the assembly.

In accordance with at least one embodiment, the present invention comprises a collapsible land-based multi-directional signal assembly deployable in an operative land-based orientation. The assembly includes a collapsible multi-directional signal display assembly comprising a plurality of signal display panels, wherein the plurality of signal display panels are disposable between a deployed orientation and a collapsed orientation. In one embodiment, each of the plurality of signal display panels comprising a pair of oppositely disposed display surfaces, and in one further embodiment, each of the plurality of signal display panels further comprising an inner edge and an outer edge. The present invention further includes an interconnect member attached along the inner edge of each of the plurality of signal display panels, in accordance with one embodiment, wherein each interconnect member comprising oppositely disposed ends. In at least one embodiment, a collapsible land-based multi-directional signal assembly comprises a plurality of complimentary signal indicia, wherein at least one of the plurality of complimentary signal indicia is affixed onto a different one of each of the plurality of display surfaces.

The present collapsible land-based multi-directional signal assembly, in accordance with one further embodiment, includes a signal support assembly and a signal mount assembly, wherein the signal support assembly and the signal mount assembly are cooperatively structured to facilitate disposition of the plurality of signal display panels between the deployed orientation and the collapsed orientation, wherein the collapsed orientation is at least partially defined by each of the plurality of signal display panels disposed adjacent and overlying or underlying one another and extending outwardly in a single direction from the signal support assembly while remaining interconnected thereto.

In accordance with one further embodiment, the present collapsible land-based multi-directional signal assembly deployable in an operative land-based orientation includes a mount assembly operatively interconnected to the signal support assembly, wherein the mount assembly comprises a mount member to securely mount the collapsible multi-directional signal display assembly in an operative land-based orientation.

In at least one embodiment, a multi-directional signal assembly in accordance with the present invention includes a buoyant float having four display surfaces each having dimensions of at least twelve inches by twelve inches and a signal indicia formed of U.S.C.G. approved reflective tape affixed thereon, wherein the four display surfaces are arranged at approximately ninety degree angles to one another forming a generally cubic configuration and each display surface is positioned substantially perpendicular to a surface of a body of water in which it is deployed. In at least one further embodiment, a multi-directional signal assembly in accordance with the present invention includes a buoyant float having three display surfaces.

A multi-directional signal assembly in accordance with the present disclosure comprises a signal display unit having a buoyant construction. The signal display unit comprises at least one display surface, however, in at least one embodiment, the signal display unit comprises a plurality of display surfaces. In one further embodiment, each of the plurality of display surfaces comprises a substantially rectangular configuration having an upper portion and a lower portion, and yet one further embodiment, each of the display surfaces comprises a rigid material of construction.

A signal display unit in accordance with one embodiment of the present disclosure includes an upper cap member and a lower cap member mounted at oppositely disposed ends of the plurality of display surfaces. In one embodiment, the lower cap member induces a dry storage container, and in at least one other embodiment, a power supply/control containment is provided in the lower cap member. In at least one embodiment, a power supply/control containment is mounted in an upper cap member.

In addition, the multi-directional signal assembly in accordance with the present disclosure comprises at least one signal indicia, and in at least one embodiment, a plurality of signal indicia, wherein at least one of the plurality of signal indicia is affixed onto an upper portion of a different one of each of the plurality of display surfaces. The signal indicia may comprise any of a plurality of images in order to convey a desired message, and in at least one embodiment, the signal indicia comprises a United States dive flag to indicate that one or more diver or snorkeler is in the water in the vicinity of the multi-directional signal assembly.

A counterweight mechanism is interconnected to the signal display unit in at least one embodiment in order to maintain the signal display unit in an operative orientation relative to the surface of the body of water. The operative orientation is at least partially defined by each of the plurality of display surfaces disposed in a substantially upright orientation relative to the surface of the body of water. The operative orientation may be further defined by maintaining the upper portion of each of the plurality of display surfaces substantially above the surface of the body of water, such that the display indicia affixed thereon is readily visible.

In accordance with at least one further embodiment of the present disclosure, an illumination system is mounted to the signal display unit. The illumination system comprises at least one illumination member to increase the visibility of the signal display unit while it is deployed in a body of water. In yet one further embodiment, an illumination system comprises a plurality of illumination members to increase the visibility of the signal display unit while deployed in an operative orientation on the surface of the body of water.

A controller is provided in at least one embodiment and is programmed to independently actuate one or more illumination member(s) upon detection of at least one environmental parameter.

Another embodiment of a multi-directional signal assembly in accordance with the present invention comprises a float assembly including a float body having a buoyant construction, wherein the float body has an inner core and an outer coating. In at least one further embodiment, the float body includes an upper section and a lower section, wherein the upper section of the float body comprises a substantially square rectangular configuration.

In at least one embodiment of the present invention, a support assembly is mounted to the float assembly to facilitate disposition of the float assembly in a free standing orientation, such as on a dock or on a boat or on the ground.

Further, a signal display assembly is disposed on an upper section of the float assembly, in at least one embodiment, wherein the signal display assembly comprising a plurality of display surfaces. In addition, and as before, the signal display assembly includes a plurality of signal indicia, wherein at least one of the plurality of signal indicia is affixed onto a different one of each of the plurality of display surfaces.

A counterweight assembly is interconnected to the float assembly in at least one embodiment, wherein the counterweight assembly biases the float assembly into an operative orientation relative to the surface of the body of water. The operative orientation of the float assembly is at least partially defined by a length of an upper section of a float body being disposed in an approximately perpendicular orientation relative to the surface of the body of water. An operative orientation is further defined, in at least one embodiment, by each of the plurality of display surfaces being disposed substantially above the surface of the body of water.

A multi-directional signal assembly in accordance with one embodiment of the present invention further includes an illumination assembly having an illumination member housing. In at least one embodiment, an illumination member housing includes at least one illumination member and an internal power supply. The illumination member housing is disposed in an operative engagement with the float assembly wherein operative engagement is at least partially defined in one embodiment by positioning the illumination assembly into an illumination housing sleeve and actuating the illumination member, thereby increasing visibility of the multi-directional signal assembly while it is deployed on the surface of the body of water.

In yet one further embodiment, a multi-directional signal assembly in accordance with the present invention includes a resistance deflector assembly comprising a deflector body which is removably mounted to a lower section of a float body. In at least one embodiment, the deflector body has a plurality of deflection surfaces each of which is angled downward and inward relative to the lower section of the float body so as to smoothly transition and divert the flow of water around the resistance deflection assembly while a multi-directional signal assembly is pulled, towed or otherwise moved across a body of water. As such, a resistance deflector assembly in accordance with the present invention reduces a resistive force which a swimmer or diver must overcome such that the multi-directional signal assembly may be pulled, towed or otherwise moved across the surface of the body of water.

At least one embodiment of the present invention is directed to a vessel mounted multi-directional signal assembly deployable on a vessel on a body of water. More in partial, in one embodiment, a vessel mounted multi-directional signal assembly includes a collapsible signal display assembly comprising a plurality of signal display panels, wherein the plurality of signal display panels are cooperatively disposable between an operative display orientation and a closed orientation. A base at least partially supports the plurality of signal display panels while disposed in the operative display orientation, and each of the plurality of signal display panels include a corresponding one of a plurality of display surfaces disposed thereon, and in one further embodiment, at least one of a plurality of signal indicia is affixed onto a different one of each of the plurality of display surfaces. As such, an operative display orientation is at least partially defined by each of the plurality of signal display panels disposed in a substantially vertical orientation.

In one further embodiment, the present invention is directed to a vessel mounted multi-directional signal assembly deployable on a vessel. A vessel mounted multi-directional signal assembly comprises a multi-directional signal display assembly, and in at least one embodiment, a collapsible multi-directional signal display assembly, having a plurality of signal display panel. Each of the plurality of signal display panels comprising at least one display surface, and in one embodiment each signal display panel comprises a plurality of display surfaces disposed on opposite sides thereof.

The present invention further comprises a plurality of signal indicia, wherein at least one of the plurality of signal indicia is affixed onto a different one of each of the plurality of display surfaces of the signal display panels. In at least one further embodiment, the multi-directional signal assembly comprises a plurality of complimentary signal indicia, wherein at least one of the plurality of complimentary signal indicia is affixed onto a different one of each of the plurality of display surfaces, and wherein the complimentary signal indicia affixed onto corresponding adjacent ones of the plurality of display surfaces in combination form a single indicia representative of a U.S. dive flag.

A signal support assembly is provided which facilitates disposition of the multi-directional signal display assembly between a deployed orientation and a collapsed orientation.

A vessel mount assembly is operatively interconnected to a signal support assembly, in at least one embodiment, wherein the vessel mount assembly comprises a mount member to facilitate deployment of the multi-directional signal display assembly on a vessel.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 12A is a perspective view of an alternate illustrative embodiment of a multi-directional signal assembly in accordance with the present invention.

FIG. 39 is a tabulation of towing resistance testing results designated as Table 1.

FIG. 53A is an exploded perspective view of indexed members, cap, and retainer plate in accordance with one embodiment of the present invention.

FIG. 73 is a perspective view of yet one further illustrative embodiment of a collapsible land-based multi-directional signal assembly disposed on a land-based vehicle having a plurality of signal display panels fully deployed in an operative display orientation.

Like reference numerals refer to like parts throughout the several views of the drawings.

DETAILED DESCRIPTION

As previously stated, the present disclosure is directed to a multi-directional signal assembly, generally as shown as at 10 throughout the figures. In at least one embodiment, a multi-directional signal assembly 10 in accordance with the present disclosure comprises a signal display unit 20 having a plurality of display surfaces 21, wherein at least one of said plurality of display surfaces 21 is visible from any point along a circle circumscribed around a vertical axis through the signal display unit 20 and planar with the plurality of display surfaces 21. Stated otherwise, at least one of the plurality of display surfaces 21 of the present multi-directional signal assembly 10, and more importantly, a signal indicia 22 displayed thereon, is visible from any direction which is generally perpendicular to the display surfaces 21.

Figure 1:
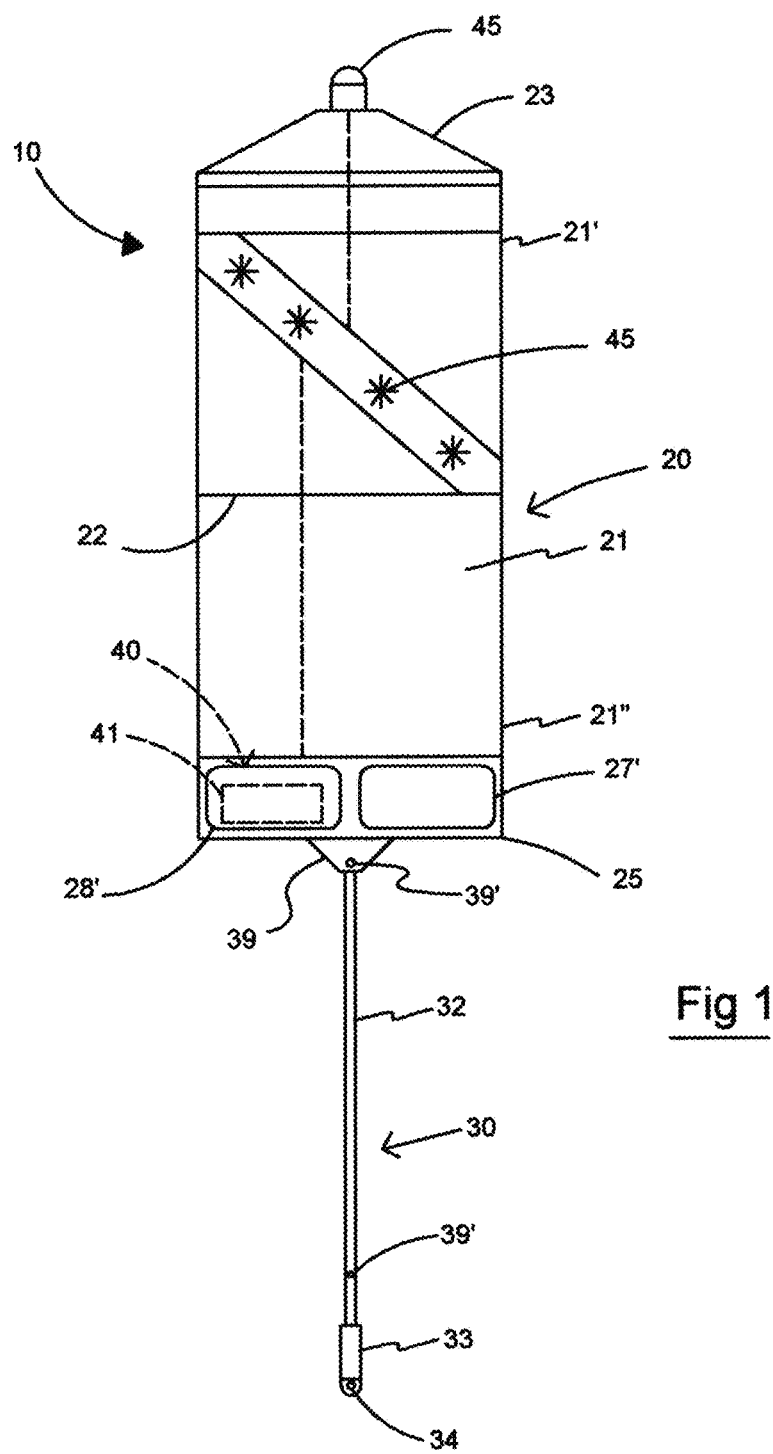
FIG. 1 is a front elevation of one illustrative embodiment of a multi-directional signal assembly in accordance with the present invention.

FIG. 1 is illustrative of one embodiment of a multi-directional signal assembly 10 in accordance with the present disclosure. More in particular, FIG. 1 presents a front elevation of one embodiment of a multi-directional signal assembly 10 comprising a signal display unit 20. As may be seen from the illustrative embodiment of FIG. 1, the signal display unit 20 comprises display surface 21 having a signal indicia 22 affixed to an upper portion 21' thereof. Display surface 21, in at least one embodiment, comprises a substantially rectangular configuration having a length and a width, wherein the length of the display surface 21 is aligned with a vertical axis through the center of the signal display unit 20. FIG. 1 further illustrates one embodiment of a counterweight mechanism 30, which is shown in a deployed orientation.

Signal indicia 22, in accordance with at least one embodiment of the present disclosure, comprises a Unites States dive flag, which is a widely known and readily recognizable signal indicating that a diver or snorkeler is in the water in the vicinity of the dive flag. The U.S. dive flag is crucial to mark the location of divers or snorkelers in the water, so that boats know to steer clear of the area for obvious safety reasons. The U.S. dive flag consists of a bright red or orange square having a broad white band running diagonally there through from the upper left corner to the lower right corner, such as is shown, by way of example, in the illustrative embodiments of FIGS. 3 and 9.

In one embodiment, the signal indicia 22 comprises a U.S. Coast Guard ("USCG") approved reflective tape. As one example, an orange 3M™ Marine Grade USCG High Intensity Reflective Adhesive Tape, Product No. 3M USCGFP-34, manufactured by 3M Company, St. Paul, Minn., is utilized to form the square portion of the U.S. dive flag on an upper portion 21' of a corresponding display surface 21. In a further embodiment, a white 3M™ Marine Grade USCG High Intensity Reflective Adhesive Tape, Product No. 3M USCGFP-30, once again, manufactured by 3M Company, St. Paul, Minn., is utilized to form the diagonal band through the orange square of the U.S. dive flag. In at least one embodiment, signal indicia 22 comprises a U.S. dive flag having a substantially square configuration and being approximately twelve inches by twelve inches.

In yet one further embodiment in accordance with the present disclosure, white 3M™ SOLAS Marine Grade USCG High Intensity Reflective Adhesive Tape, Product No. 3M USCGFP-30, is affixed to the lower portion 21" of each display surface 21, to provide further overall visibility to the signal display unit 20 while deployed in a body of water. Alternatively, a white marine paint may be applied to the lower portion 21" of each display surface 21 and/or to each of upper cap member 23 and lower cap member 25, each described in further detail below.

Figure 2:
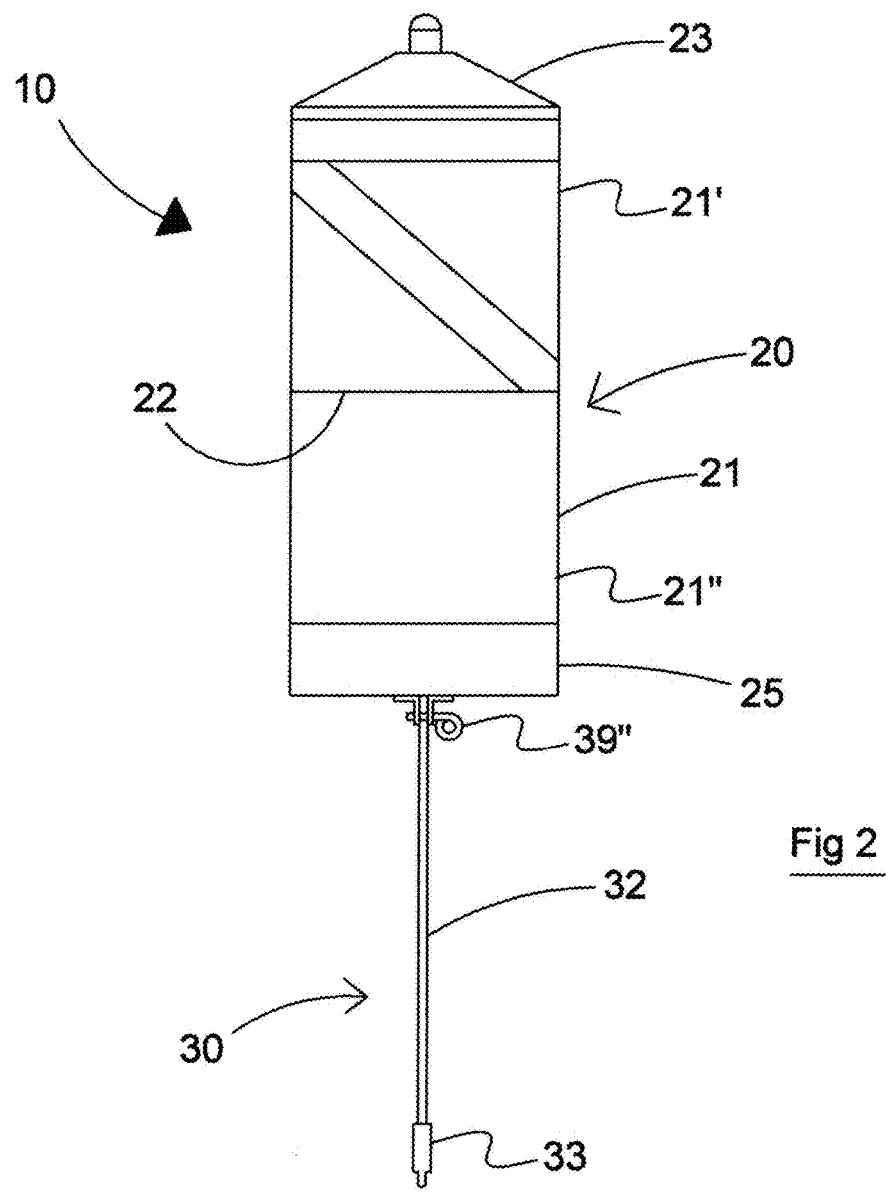
FIG. 2 is a side elevation of the illustrative embodiment of the multi-directional signal assembly of FIG. 1.

FIG. 2 presents an elevation of one side of the illustrative embodiment of FIG. 1, showing another of the plurality of display surfaces 21 of the signal display unit 20. FIG. 2 is further illustrative of another of the plurality of signal indicia 22 affixed to an upper portion 21' of corresponding display surface 21. FIG. 2 also presents a side elevation of the counterweight mechanism 30, once again, shown in a deployed orientation.

Figure 3:
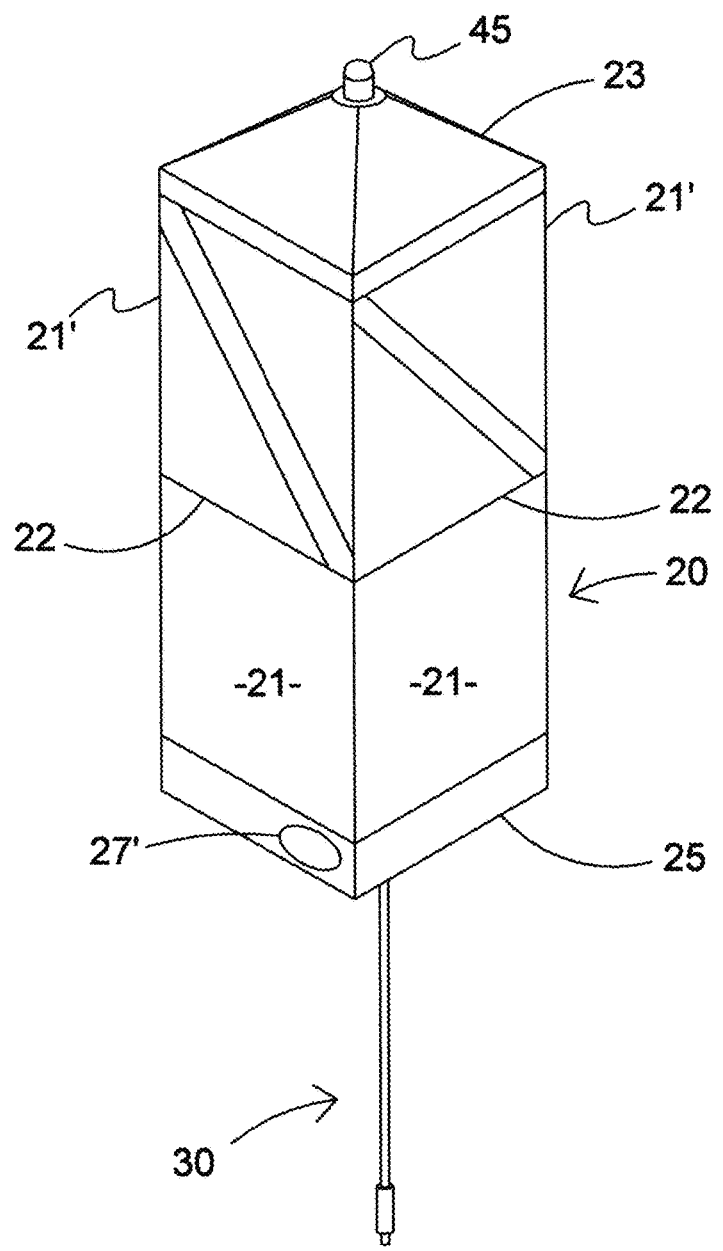
FIG. 3 is a perspective view of another illustrative embodiment of a multi-directional signal assembly in accordance with the present invention.

FIG. 3 is a perspective view of another embodiment of the multi-directional signal assembly 10. As clearly shown in the illustrative embodiment of FIG. 3, the signal display unit 20 comprises a plurality of display surfaces 21 each having at least one of a plurality of signal indicia 22 affixed thereto. Once again, each of the plurality of signal indicia 22 are affixed to an upper portion 21' of a corresponding one of the plurality of display surfaces 21. As will be appreciated from the illustrative embodiment of FIG. 3, at least one of the plurality of signal indicia 22 affixed to an upper portion 21' of one of the plurality of display surfaces 21 of the present multi-directional signal assembly 10 will be visible from any direction in a field of view which is generally perpendicular to the display surfaces 21.

Figure 7:
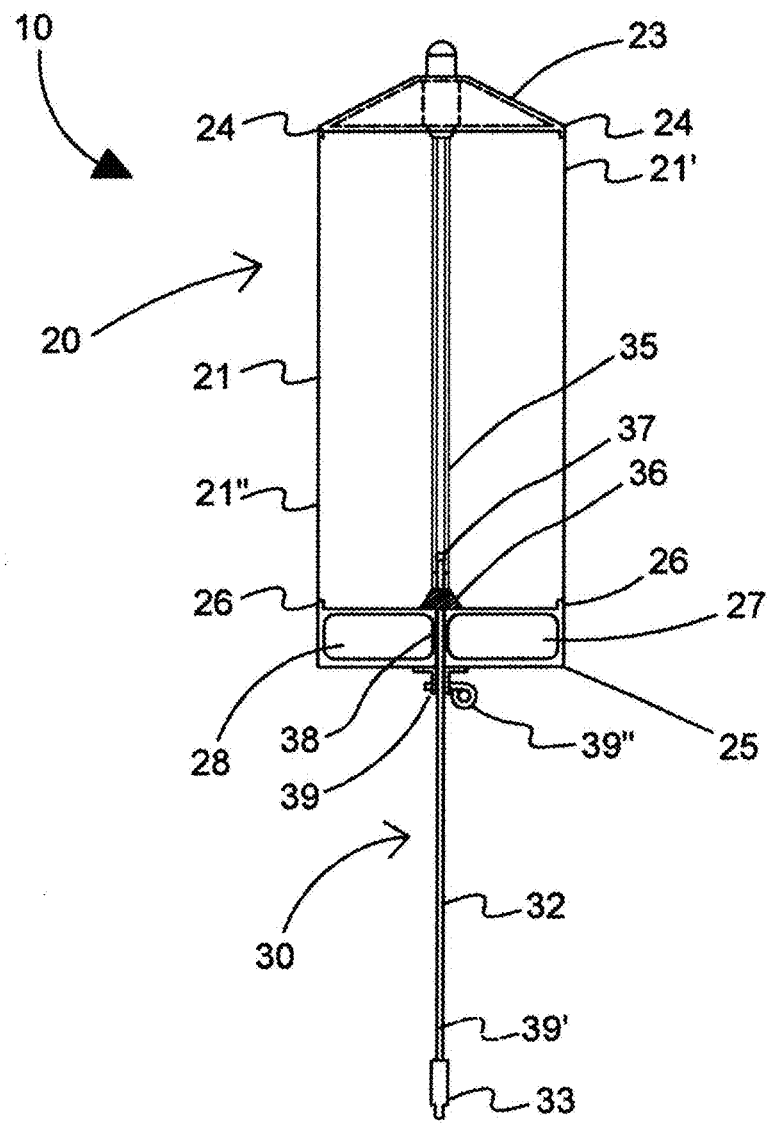
FIG. 7 is a partial cutaway view of one illustrative embodiment of a multi-directional signal assembly in accordance with the present invention illustrative of a counterweight mechanism in a deployed orientation.

As shown in the illustrative embodiments of FIGS. 1 through 3, the signal display unit 20 comprises an upper cap member 23 and a lower cap member 25. As may be seen best in FIG. 7, upper cap member 23 comprises a plurality of upper cap flanges 24. As also shown in FIG. 7, each of the plurality of upper cap flanges 24 are disposed to engage a corresponding one of the plurality of display surfaces 21. More in particular, the upper cap member 23 is affixed to an upper end of each of the plurality of display surfaces 21. In one embodiment, the upper cap member 23 is affixed to each of the plurality of display surfaces 21 via mechanical fasteners, for example, screws, bolts, rivets, staples, etc. Alternatively, chemical or heat welding may also be utilized to affix upper cap member 23 to each of the plurality of display surfaces 21. In at least one embodiment, a watertight or water resistant adhesive is utilized to securely affix upper cap member 23 to an upper end of each of the plurality of display surfaces 21. Similarly, and with continued reference to the illustrative embodiment of FIG. 7, lower cap member 25 comprises a plurality of lower cap flanges 26, each structured to engage a corresponding lower end of each of display surfaces 21. Similar to upper cap member 23, lower cap member 25, and more in particular the plurality of lower cap flanges 26, may be attached to each of the plurality of display surfaces 21 via mechanical fasteners, or chemical/heat welding. In at least one embodiment, a watertight or water resistant adhesive is utilized to affix each of the plurality of lower cap flanges 26 of the lower cap member 25 to a lower end of each of the plurality of display surfaces 21.

In at least one embodiment, both upper cap member 23 and lower cap member 25 are constructed of an acrylonitrile-butadiene-styrene ("ABS") thermoplastic material and, in one further embodiment, injection molding is utilized to form upper cap member 23 and lower cap member 25 from ABS. In addition, in one embodiment, each of the plurality of display surfaces 21 comprises a urethane foam construction. In yet one further embodiment, the plurality of display surfaces 21 comprise a unitary construction, i.e., the plurality of display surfaces 21 form a singular square rectangular configuration. In one embodiment, a synthetic elastomeric adhesive is utilized to affix upper cap member 23 and lower cap member 25 to the plurality of display surfaces 21. As one example, SCOTCH-WELD™ High performance Industrial Plastic Adhesive, Product Number 4693H, manufactured by 3M Company, St. Paul, Minn., is utilized to affix cap members 23, 25 to each of the plurality of display surfaces 21.

Thus, the combination of a watertight interconnection between the upper cap member 23 and lower cap member 25 with each of the plurality of display surfaces 21 provides a buoyant construction to signal display unit 20 such that it will float in a body of water. Further, this buoyant construction and the configuration of the plurality of display surfaces 21 is such that a substantial portion of the signal display unit 20 will remain above the surface of the body of water in which it is deployed.

In one alternate embodiment, a signal display unit 20 comprises a polystyrene foam core or shell having a plurality of display surfaces 21 securely affixed to each side of the signal display unit 20. As before, in one embodiment, the display panels 21 comprise a urethane foam construction. In at least one other embodiment, the signal display unit 20 comprises a square rectangular polystyrene foam core or shell approximately eleven inches by eleven inches by thirty inches in length, and has one inch thick urethane foam display panels 21 affixed along each side thereof. In this configuration, the display unit 20 comprises a buoyancy of about one hundred and twenty pounds force. Alternatively, a polystyrene core is injected into an assembled arrangement of urethane foam display panels 21. As result of the inherent buoyancy provided by the construction of such an embodiment of a signal display unit 20, the need for a lower cap member 25 being affixed to display panels 21 via a watertight seal or adhesive is eliminated. Of course, a lower cap member 25 may still be incorporated into such embodiment, for example, to seal the polystyrene foam core and/or to provide a housing for a dry storage container 27, as described in further detail below. Similarly, an upper cap member 23 affixed to display panels 21 is not necessary in such an embodiment, but may be included to provide a housing for one or more sensor 44 or illumination member 45, also disclosed in further detail below.

Figure 4:
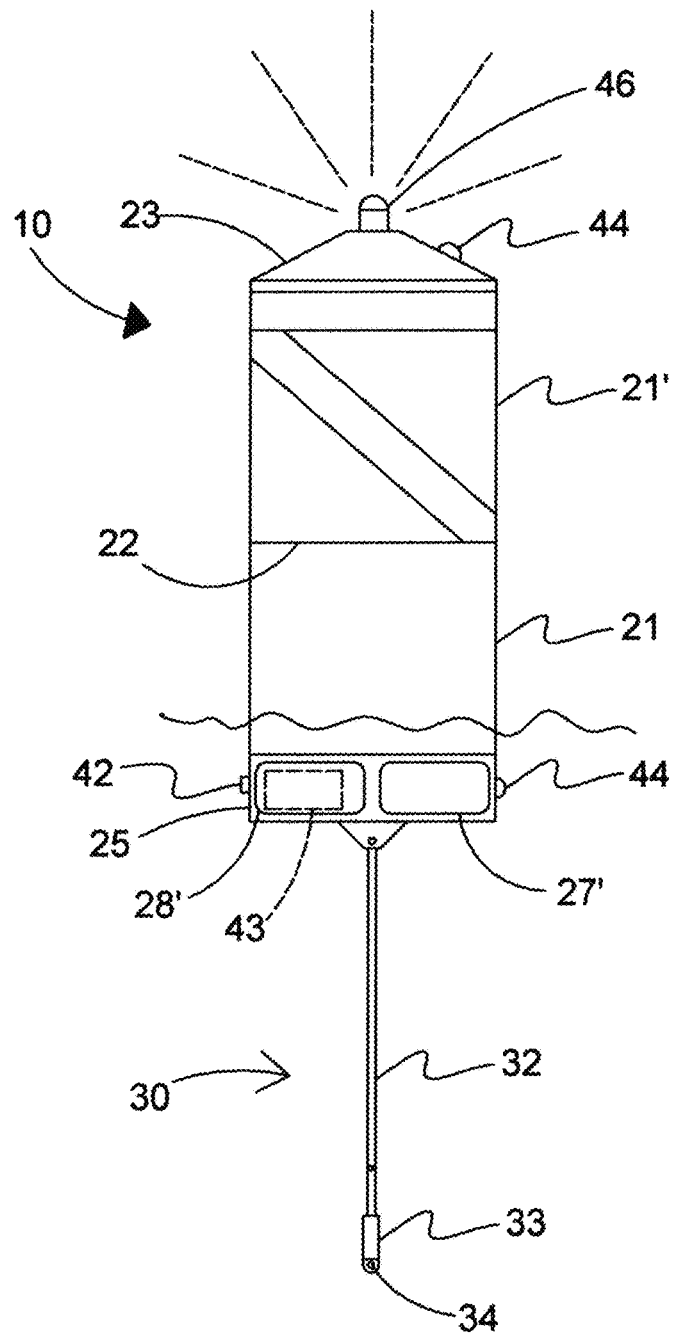
FIG. 4 is a front elevation of the illustrative embodiment of the multi-directional signal assembly of FIG. 1 deployed in a body of water.
Figure 5:
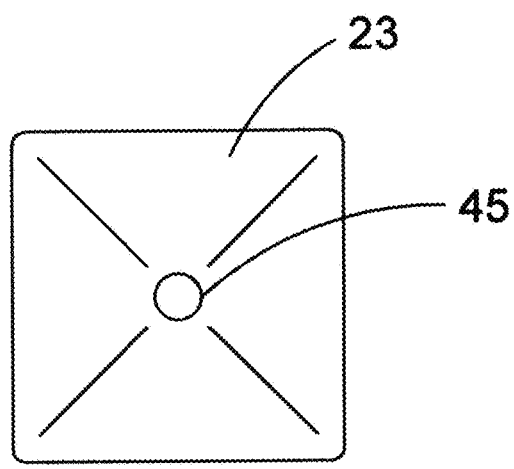
FIG. 5 is a top plan view of one illustrative embodiment of a multi-directional signal assembly in accordance with the present invention.

Looking again to the illustrative embodiment of FIG. 1, a multi-directional signal assembly 10 in accordance with the present disclosure comprises an illumination system 40 having at least one illumination member 45. Illumination system 40 includes a power supply 41 which may be actuated by a float switch 42, such as illustrated in FIG. 4. In one embodiment, the power supply 41 comprises one or more dry storage batteries. The float switch 42, in at least one embodiment, is structured to close the electrical circuit between the illumination system 40 and the power supply 41 upon immersion in a body of water, once again, as shown by way of example in FIG. 4. Of course, it is understood to be within the scope and intent of the present invention to provide other mechanisms to actuate the illumination system 40 including, by way of example only, a manual switch mechanism actuated by a user, a timer switch mechanism, or a sensor actuation mechanism, such as is described in further detail below.

Figure 9:
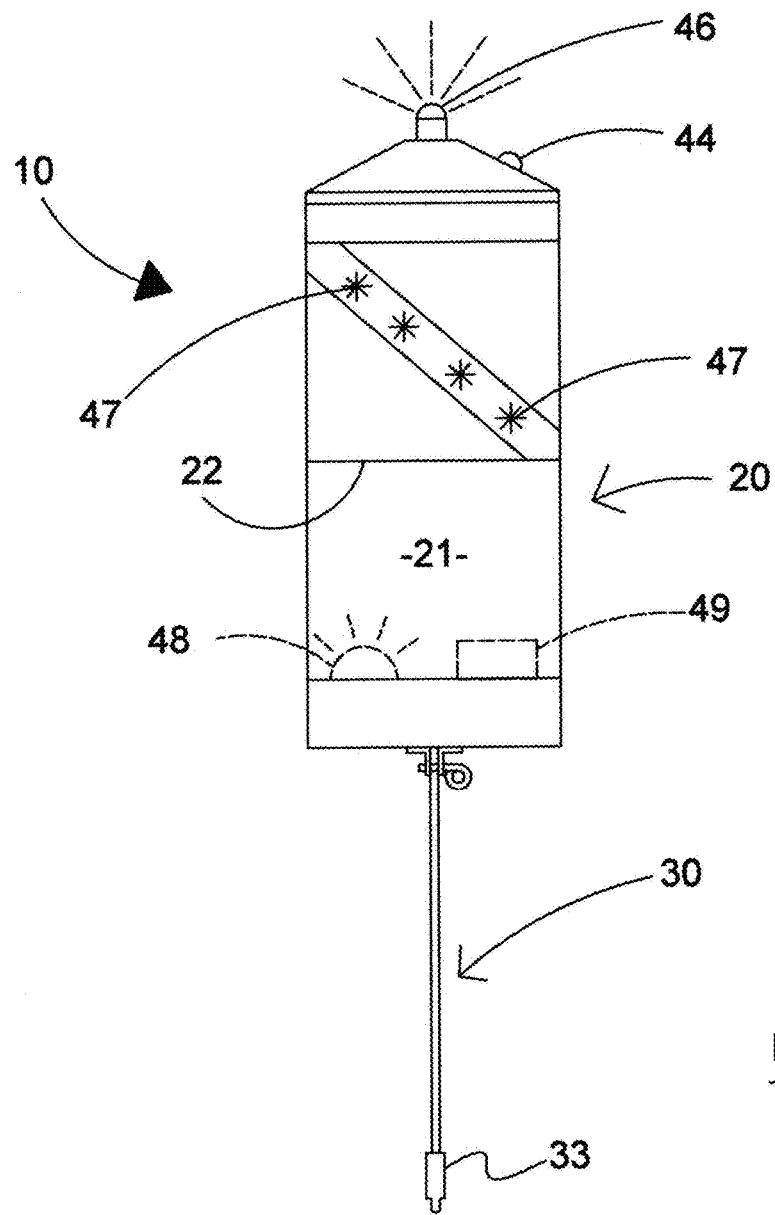
FIG. 9 is an elevation of yet another illustrative embodiment of a multi-directional signal assembly in accordance with the present invention.

As indicated above, in at least one embodiment the illumination system 40 further comprises a controller 43 which is programmed to actuate at least one illumination member 45 of the illumination system 40. In accordance with the illustrative embodiments presented in several of the figures, the illumination system 40 in accordance with the present disclosure comprises a plurality of illumination members 45. In one such embodiment, the controller 43 is programmed to independently actuate each of the plurality of illumination members 45. In yet one further embodiment, the controller 43 is programmed to actuate one or more of the plurality of illumination members 45 upon detection of at least one environmental parameter. For example, in one embodiment, a flashing light emitting diode 46 is mounted to an upper cap member 23 of the signal display unit 20, and the controller 43 is programmed to actuate the flashing light emitting diode 46 upon detection of a predetermined level of fog proximate the multi-directional signal assembly 10, via one or more sensor 44, such as shown in FIG. 4. Similarly, controller 43 may be programmed to illuminate a plurality of illumination members 45, such as, flashing light emitting diode 46, indicia light emitting diode 47 and/or internal light emitting diode 48, such as shown throughout the figures, based upon a preselected level of available ambient light proximate the multi-directional signal assembly 10, once again, such as may be detected via a sensor 44, such as illustrated in FIG. 9. In another embodiment, an accelerometer may be employed to detect wave motion, and to actuate or flash one or more illumination member 45 upon detection a crest of a wave, once again, to increase visibility of the signal display unit 20 while deployed in a body of water.

One or more sensor 44 may also be employed to detect pressure or leakage of water into the signal display unit 20, such as may result in failure to properly display the plurality of signal indicia 22. In yet one further embodiment of a multi-directional signal assembly 10 in accordance with the present disclosure, an electronic shark repellent mechanism 49 may be mounted to the signal display unit 20, such as is illustrated in FIG. 9, which emits an electrically generated signal which is known to deter sharks. The electronic shark repellent mechanism 49 may be automatically actuated when the assembly 10 is deployed in a body of water, such as via a float switch 42. Alternatively, the electronic shark repellent mechanism 49 may be actuated by a user in the event one or more sharks are visibly detected it the area, or in the event of an emergency or distress situation.

One or more sensor 44 may be combined with a digital display to indicate one or more environmental parameter including, but not limited to, water temperature, air temperature, wave height, battery capacity, diver depth, depth temperature, etc. A digital display may be mounted directly to the signal display unit 20 and/or attached at one end of diver/snorkeler tether to provide an immediate indication of the parameter(s) to the user.

As previously indicated, and with reference to the illustrative embodiments of FIGS. 1 and 2, the multi-directional signal assembly 10 in accordance with the present disclosure comprises a counterweight mechanism 30. A counterweight mechanism 30, in accordance with at least one embodiment, includes a weight deployment member 32 structured to have a weight 33 mounted thereto. In at least one embodiment, the weight deployment member 32 comprises an elongated rod or pole which extends downwardly and outwardly from the lower cap member 25 of the signal display unit 20. As shown in FIG. 1, the weight 33 may include an interconnection eyelet 34, which will allow the multi-directional signal assembly 10 to be attached to a tie line of a water craft, or to a tether attached to a user. In one embodiment, a further weight or anchor line is attached to the interconnection eyelet 34, so as to maintain the multi-directional signal assembly 10 in a particular location when deployed in a body of water.

A deployment member lock mechanism 39 is provided which, in at least one embodiment, includes one or more aperture 39' through the weight deployment member 32, corresponding to an aperture 39' through deployment lock mechanism 39. In one further embodiment, a pin 39" is provided to pass through the apertures 39' of the deployment lock mechanism 39, thereby maintaining weight deployment member 32 in either a deployed orientation as shown, for example, in FIGS. 1 through 4, or in a retracted orientation, such as is shown in FIG. 8.

Figure 8:
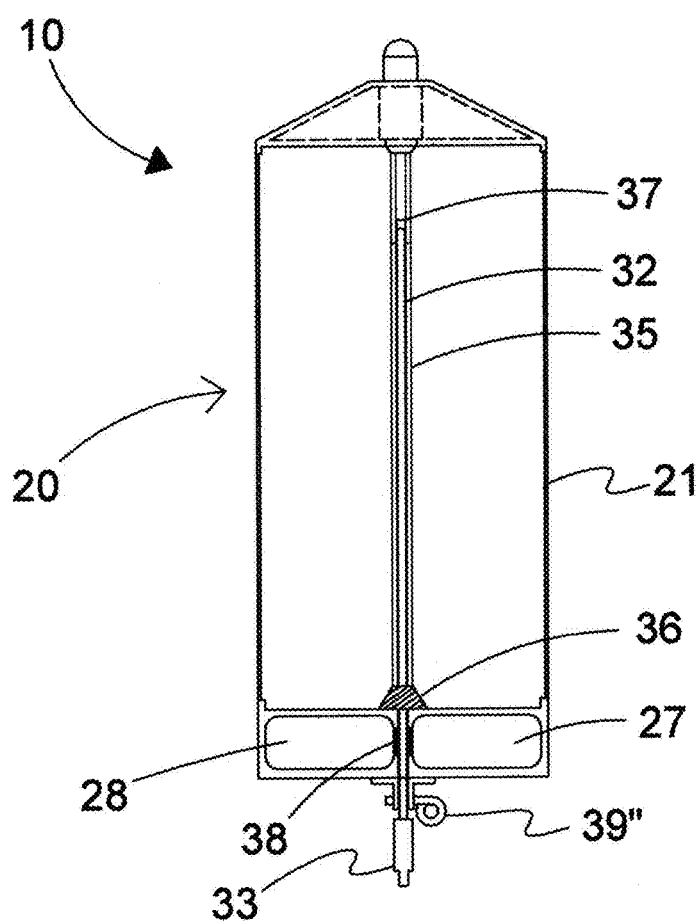
FIG. 8 is a partial cutaway view of the illustrative embodiment of a multi-directional signal assembly of FIG. 7 illustrative of the counterweight mechanism in a stowed orientation.

Looking further to FIGS. 7 and 8, in at least one embodiment, the counterweight mechanism 30 includes a deployment member housing 35 which is mounted in signal display unit 20. More in particular, deployment member housing 35 is dimensioned to receive a substantial portion of the weight deployment member 32 therein while the weight deployment member 32 is disposed in a retracted orientation, once again, as shown best in FIG. 8. In at least one further embodiment, and again with reference to FIGS. 7 and 8, counterweight mechanism 30 comprises a bearing mechanism 36 structured to facilitate repositioning of the weight deployment member 32 between a deployed orientation and a retracted orientation, as shown in FIGS. 7 and 8, respectively. In at least one embodiment, weight deployment member 32 includes a stop member 37 attached to one end so as to prevent weight deployment member 32 from being completely removed from the deployment member housing 35. More in particular, stop member 37 will abut against bearing mechanism 36 when the weight deployment member is fully extended outwardly from deployment housing 35 so as to prevent complete removal therefrom. In at least one further embodiment, and once again as shown in FIGS. 7 and 8, a watertight seal 38 is provided so as to prevent, or at least significantly minimize, the entry of water into the deployment member housing 35 and/or, more importantly, into the interior of the signal display unit 20, thereby maintaining the buoyant construction of the same. In an embodiment having a signal display unit 20 comprising a polystyrene core or shell, as disclosed above, the need for a watertight seal 38 is, of course, not necessary to maintain buoyancy.

FIGS. 7 and 8 are further illustrative of a dry storage container 27 formed in lower cap member 25 in at least one embodiment, thereby providing a user with a secure and dry location to store his or her valuables while swimming, diving, or snorkeling. In at least one embodiment, the dry storage container 27 is as manufactured by Otter Products, LLC of Fort Collins, Colo., and sold as part of the OTTERBOX® product line. A removable watertight cover 27', such as shown in FIG. 1, is provided to close dry storage container 27 and to form a water tight seal therewith. Also shown in FIGS. 7 and 8 is a power supply/control containment 28 which is also formed in lower cap member 25. The watertight cover 28' may be removably attached or, in at least one embodiment, permanently attached to seal the power supply/control containment 28 after power supply 41 and/or controller 43 are installed therein.

Figure 6:
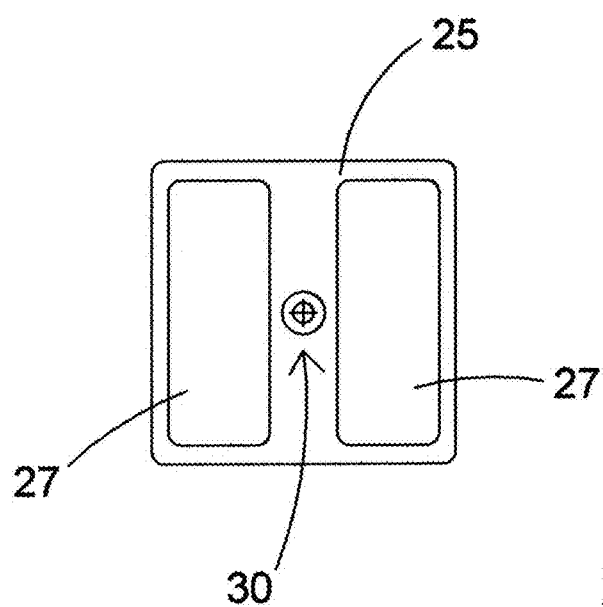
FIG. 6 is a bottom plan view of one illustrative embodiment of a multi-directional signal assembly in accordance with the present invention.

In at least one embodiment, the power supply/control containment 28 is formed in an upper cap member 23, and in one further embodiment, a watertight closure 28' is also affixed in a sealing engagement with the opening of power supply/control containment 28. In such an embodiment, the lower cap member 25 may comprise a plurality of dry containers 27, as shown in the illustrative embodiment of FIG. 6.

Another embodiment of a multi-directional signal assembly in accordance with the present invention is generally shown as at 100 in the illustrative embodiments of FIGS. 10 through 15. A multi-directional signal assembly 100 in accordance with the present disclosure comprises a float assembly 110 having a float body 111 comprising a buoyant construction. In at least one embodiment, the float body 111 includes an inner core 116 formed of a lightweight material of construction and an outer coating 117 to impart structural integrity to the inner core 116, similar to an exoskeleton, as may be seen in FIG. 15.

In at least one embodiment, the inner core 116 comprises a polystyrene foam construction, thereby being inherently buoyant in water. In at least one further embodiment, the inner core 116 comprises a polystyrene foam having a density in a range of about 1.5 pounds per cubic foot to about 2.5 pounds per cubic foot.

Figure 15:
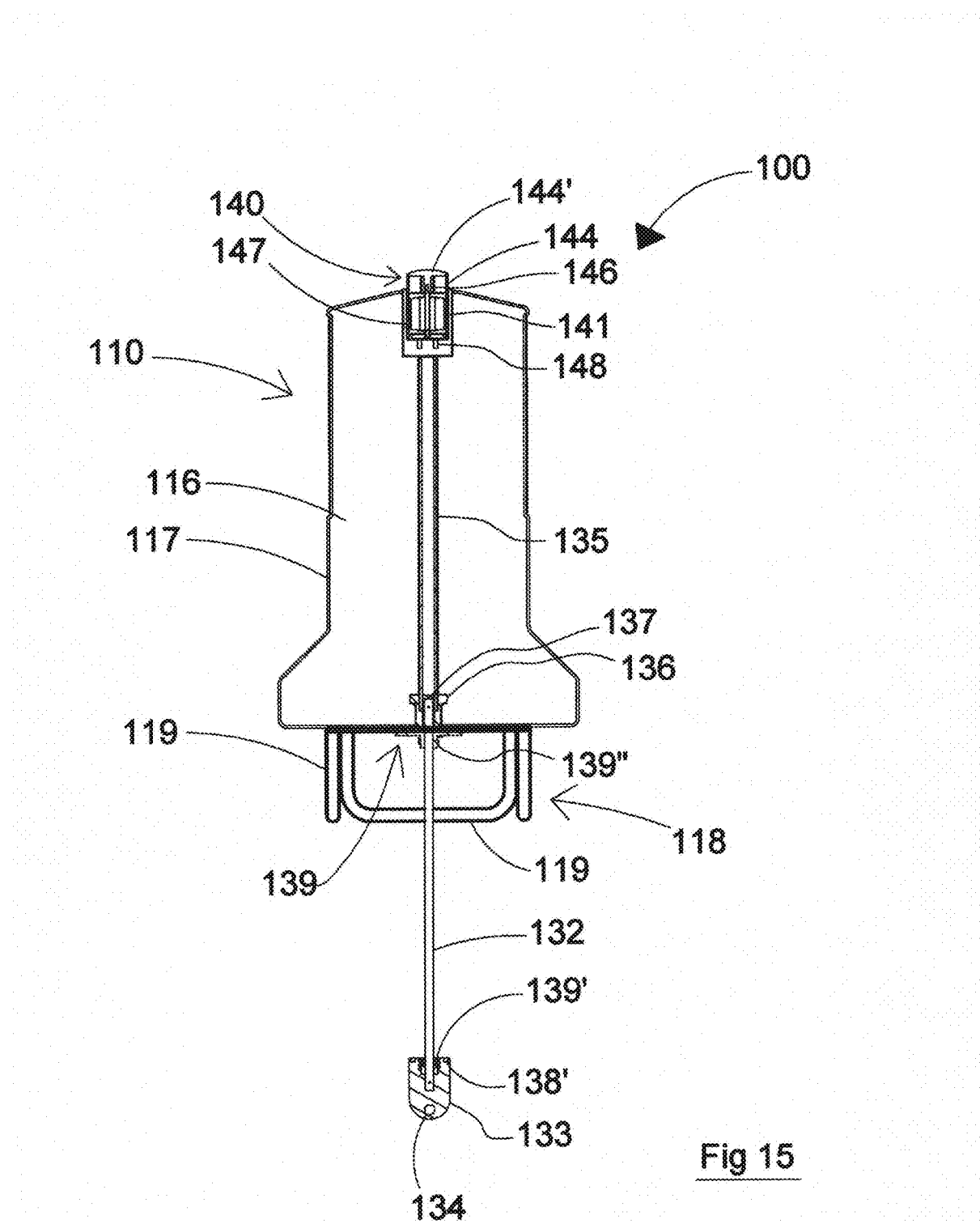
FIG. 15 is a partial cutaway view of one illustrative embodiment of a multi-directional signal assembly in accordance with the present invention illustrative of a counterweight mechanism in a deployed orientation.

As previously stated, in at least one embodiment the float assembly 110, and more in particular, the float body 111, comprises an outer coating 117, as shown best in FIG. 15. In at least one embodiment, the outer coating 117 comprises a layer of polyurea with a top coating aliphatic hydrocarbon, 100% solids, which are sprayed evenly over the inner core 116. In one further embodiment, the outer coating 117 is uniformly applied to a thickness in the range of about 0.03 inches to about 0.05 inches. In at least one further embodiment, the outer coating 117 comprises a Shore A harness in a range of about 88 to 92, and a tensile strength of about 2,200 pounds per square inch. In this configuration, the float assembly 110 comprises a buoyancy of about one hundred pounds force.

Figure 10:
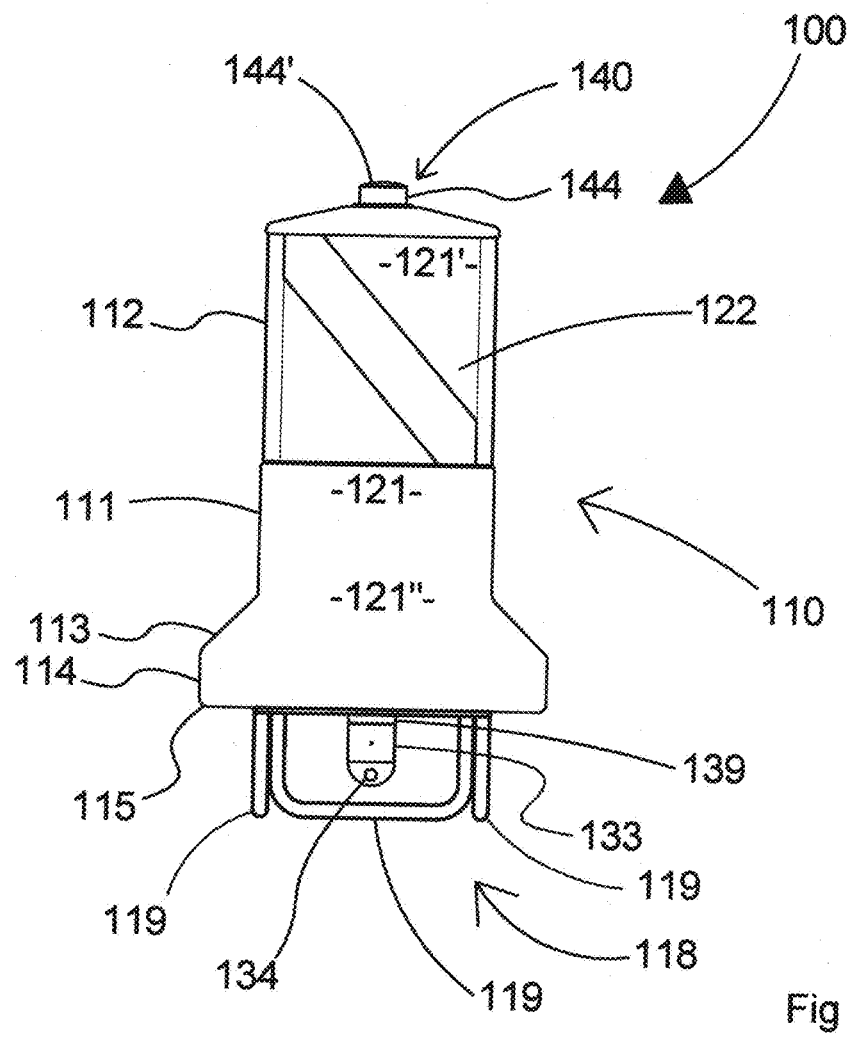
FIG. 10 is an elevation of another illustrative embodiment of a multi-directional signal assembly in accordance with the present invention.

Returning to the illustrative embodiment of a multi-directional signal assembly 100 of FIG. 10, the float body 111 comprises an upper section 112 and a lower section 114. In at least one embodiment, and as may be seen best in the illustrative embodiments of FIGS. 10, 12, and 13, the lower section 114 of the float body 111 comprises a larger periphery or footprint relative to the upper section 112. As will be appreciated, the larger footprint or periphery of the lower section 114 of the float body 111 provides additional stability to the float assembly 110 while deployed on a surface of a body of water, and in particular, the lower section 114 will tend to urge the upper section 112 into a upright orientation while deployed on the surface of a body of water. More specifically, in at least one embodiment, the upper section 112 comprises a substantially square rectangular configuration having a length and a width and in an upright orientation, the length of the upper section 112 will be approximately perpendicular to a surface of a body of water or other supporting surface.

Figure 11:
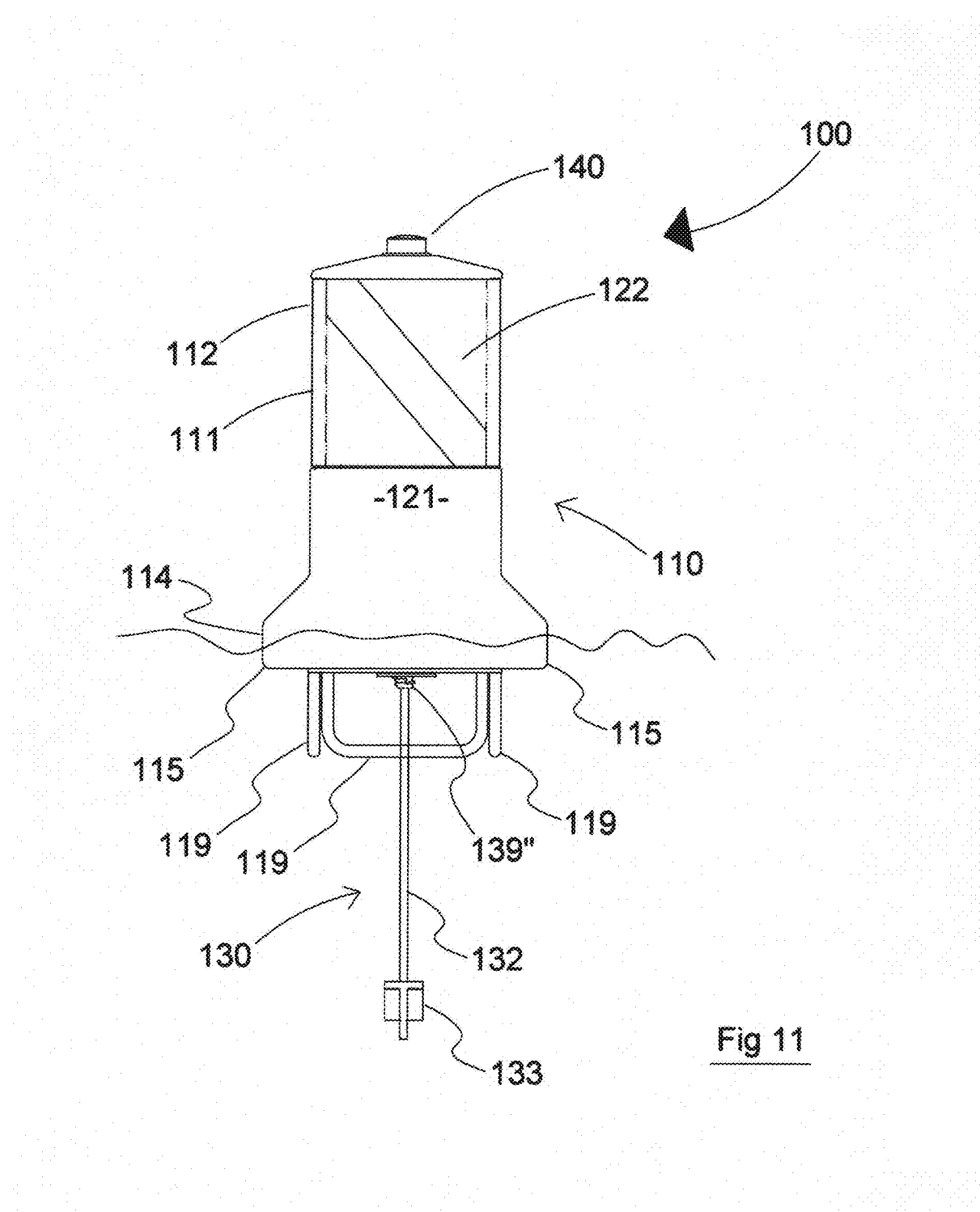
FIG. 11 is a side elevation of the illustrative embodiment of the multi-directional signal assembly of FIG. 10 deployed in a body of water.

As such, in at least one embodiment, an operative orientation is at least partially defined by a length of the upper section 112 of the float body 111 being disposed in an approximately perpendicular orientation relative to the surface of a body of water in which the float assembly 110 is deployed. FIG. 11 is illustrative of one embodiment of a float assembly 110 deployed on a surface of a body of water, wherein an upper section 112 of a float body 111 is disposed in an operative orientation, which is at least partially defined by a length of the upper section 112 disposed approximately perpendicular orientation relative to the surface of the body of water.

FIG. 12A is a perspective view illustrative of another alternate embodiment of a multi-directional signal assembly 100 is accordance with the present invention. In particular, as shown in FIG. 12A, the float body 111 comprises a substantially uniform square rectangular cross section over its entire length. Stated otherwise, both the upper and lower sections of the float body 111 in the embodiment of FIG. 12A have substantially similar outer peripheries or footprints, similar to the embodiments of FIGS. 1 through 9.

FIG. 10 illustrates a counterweight assembly 130 including a weight 133 affixed to the bottom of float assembly 110 and having an interconnection eyelet 134 through a portion thereof. As before, the interconnection eyelet 134 allows the multi-directional signal assembly 100 to be attached to a tie line of a water craft or to a tether attached to a user. Alternatively, a weight or anchor line is attached to the interconnection eyelet 134, so as to maintain the multi-directional signal assembly 100 in a particular location when deployed in a body of water. FIG. 10 illustrates a counterweight assembly 130 in a retracted orientation, wherein a weight deployment member (not shown) is disposed substantially within the float body 111 of the float assembly 110. Further, FIG. 10 illustrates a deployment lock mechanism 139 which serves to retain the weight 133 and weight deployment member (not shown) of the counterweight assembly 130 secured in a retracted orientation until released for deployment by a user.

FIG. 10 is further illustrative of one embodiment of a support assembly 118 mounted to a float assembly 110, and more in particular, to a lower section 114 of the float body 111, to facilitate disposition of the float assembly 110 in a free standing orientation, such as on a dock or on a boat or on the ground, while the counterweight assembly 130 is disposed in a retracted orientation. As may be seen best in the embodiments of FIGS. 10 and 14, the support assembly 118 comprises a plurality of support members 119 mounted to the lower section 114 and arranged so as to provide a free standing structure. As will be appreciated from FIG. 11, the plurality of support members 119 may also serve as hand hold for a swimmer or diver while in the water in order to rest, adjust equipment, etc. Each of the support members 119 of the support assembly 118 may be constructed from any of a variety of materials including metal or metal alloy tubing, or an engineered plastic tubing, such as, by way of example only, acrylonitrile butadiene styrene ("ABS"), in order to increase buoyancy of the overall multi-directional signal assembly 100 in accordance with the present invention. The support members 119 must comprise sufficient structural integrity to support the weight of the float assembly 110 while free standing out of the water, and to support the weight of a swimmer or diver holding onto a support member 119 while he or she is in the water.

In at least one embodiment, a utility belt or strap (not shown) may be affixed around the float body 111 including one or more utility hooks, rings, clips, etc., to allow a user a place to attach one or more items to the float body 111 while he or she is diving, swimming, spear fishing, etc., and in one further embodiment, one or more utility hooks, rings, clips, etc., may be mounted directly to a portion of the float body 111 itself.

FIG. 12A is illustrative of one alternate embodiment of a support assembly 118 of the present invention. As may be seen form FIG. 12A, the support assembly comprises a square frustum configuration having a plurality of support members 119 on each side. As before, the plurality of support members 119 are mounted to the lower section of the float body 111 and are arranged so as to provide a free standing structure. As will be appreciated from FIG. 12A, the plurality of support members 119 may also serve as hand hold for a swimmer or diver while in the water in order to rest, adjust equipment, etc. Also as before, the support assembly 118 of the embodiment of FIG. 12A may be constructed from any of a variety of materials including metal, metal alloy, or engineered plastic, such as, and once again by way of example only, acrylonitrile butadiene styrene ("ABS"), in order to increase buoyancy of the overall multi-directional signal assembly 100 in accordance with the present invention. The support members 119 must comprise sufficient structural integrity to support the weight of the float assembly 110 while free standing out of the water, and to support the weight of a swimmer or diver holding onto a support member 119 while he or she is in the water.

Figure 12:
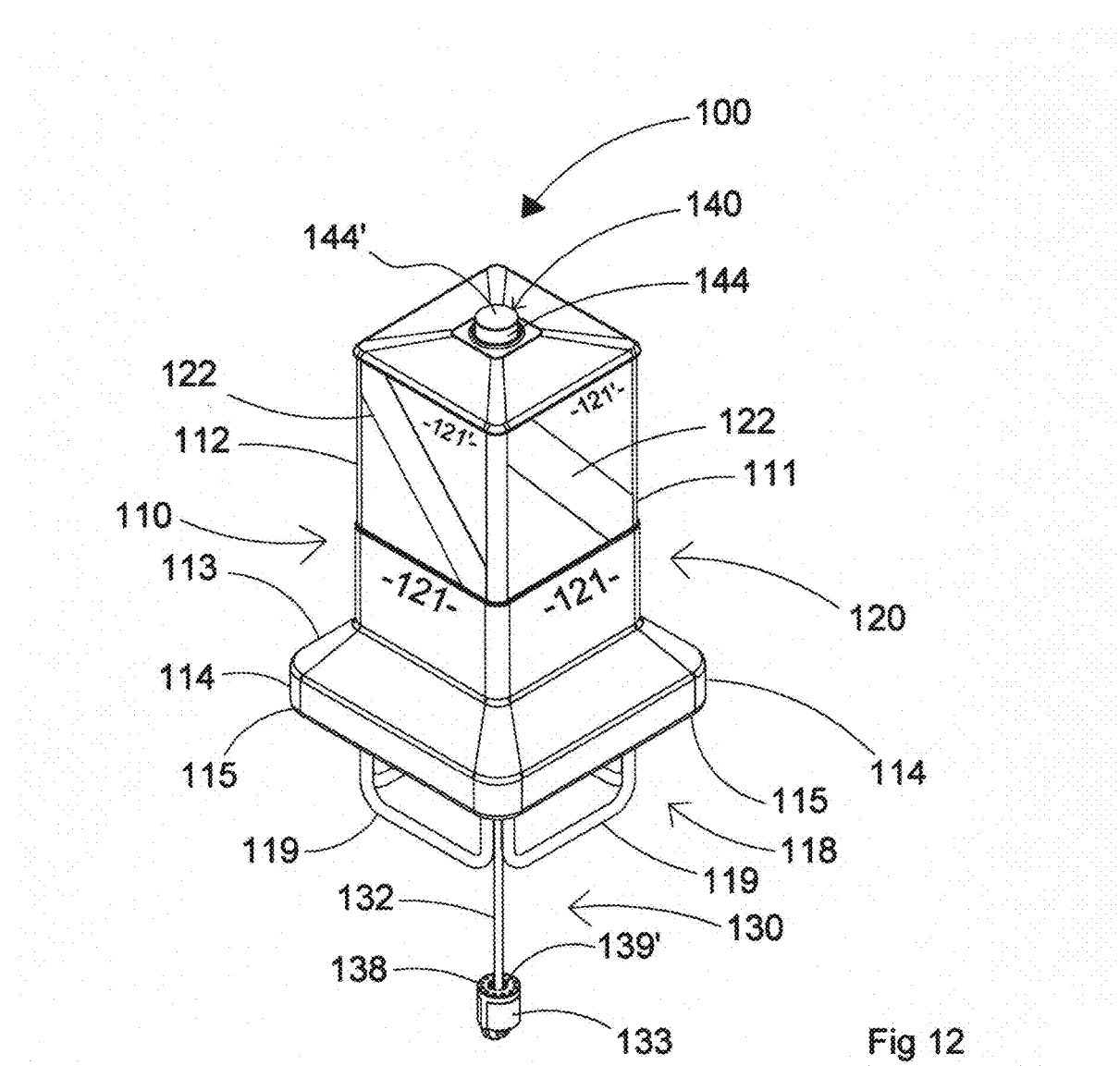
FIG. 12 is a perspective view of another illustrative embodiment of a multi-directional signal assembly in accordance with the present invention.
Figure 12:
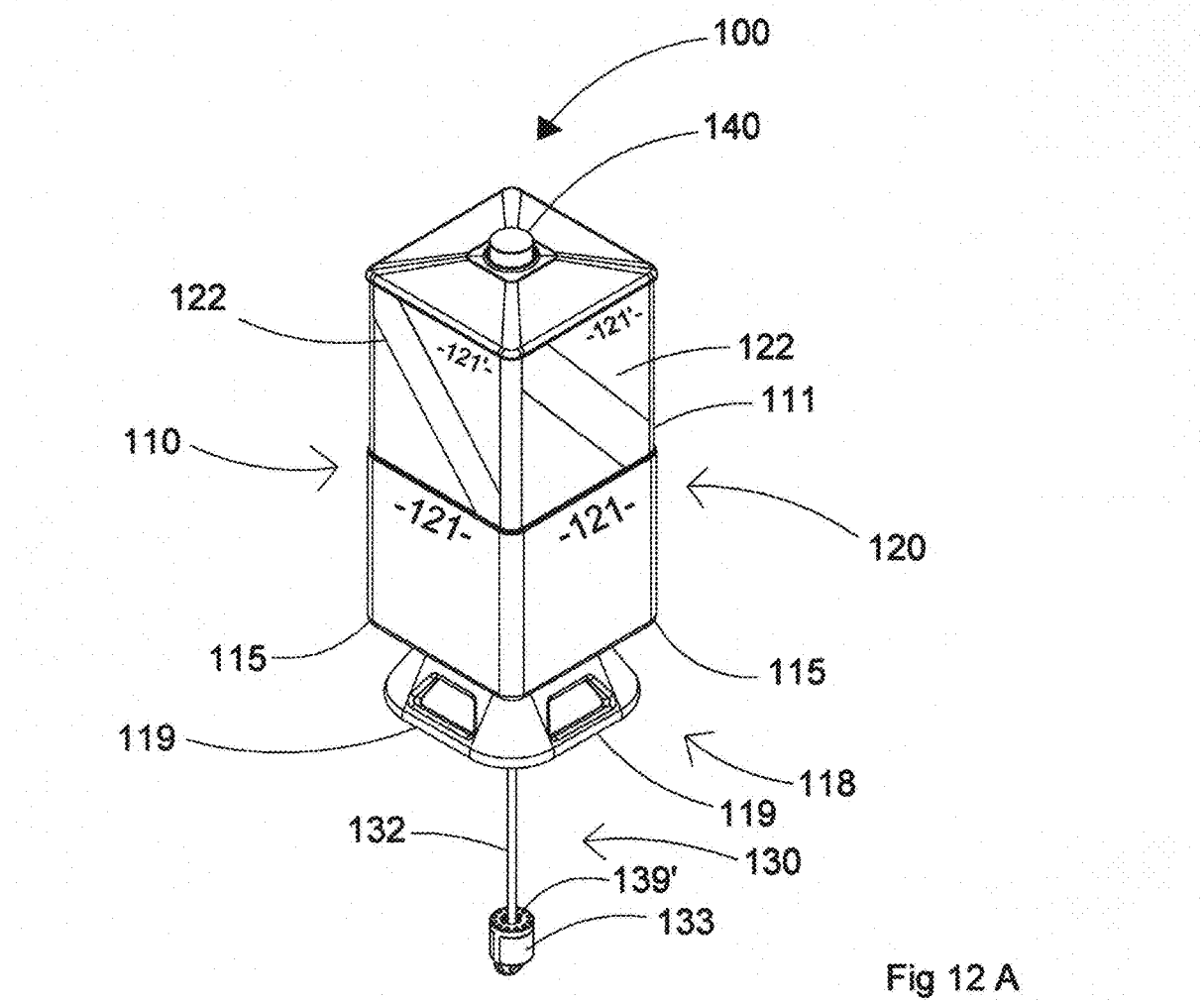
Figure 13:
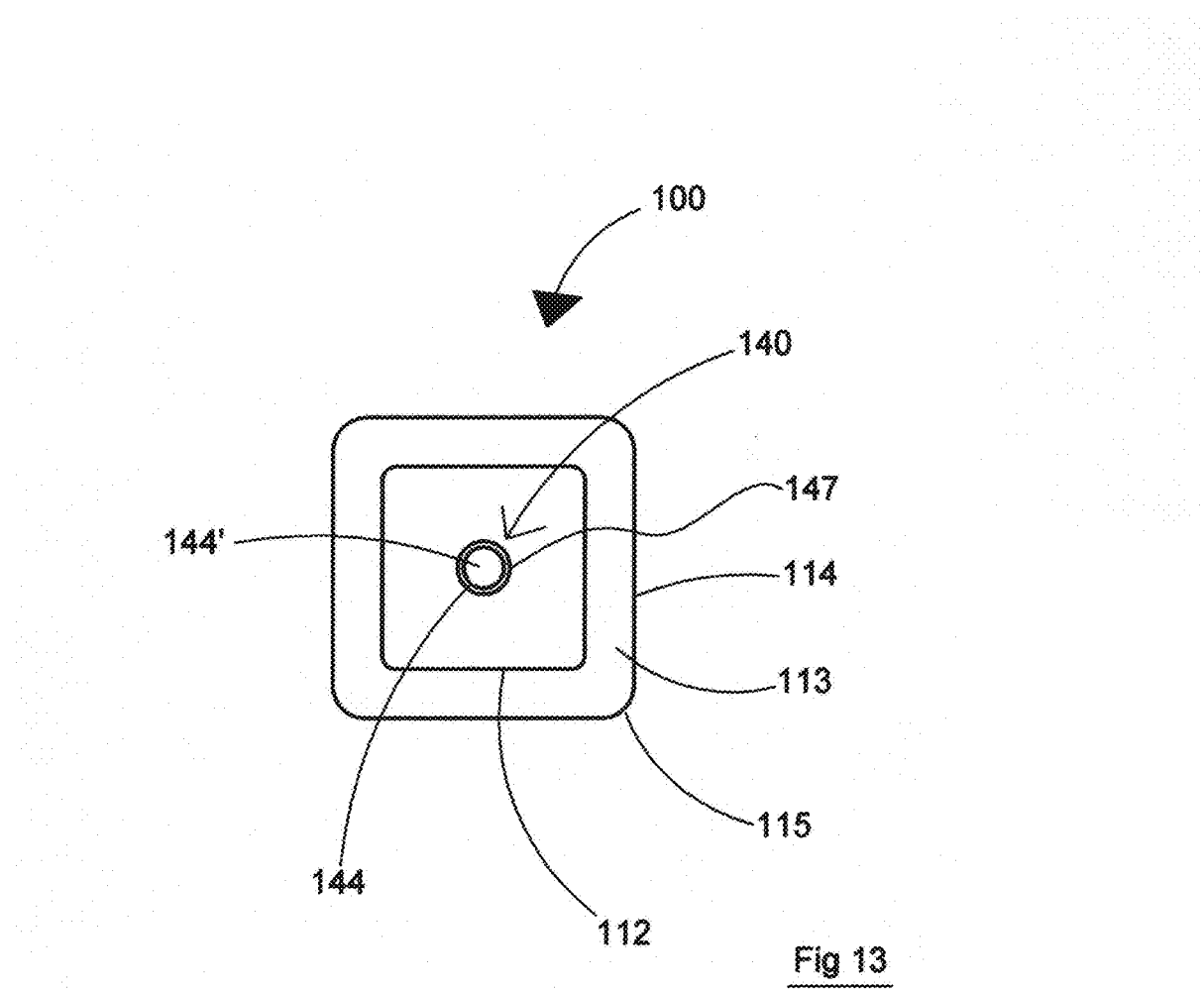
FIG. 13 is a top plan view of the illustrative embodiment of the multi-directional signal assembly of FIG. 10.
Figure 14:
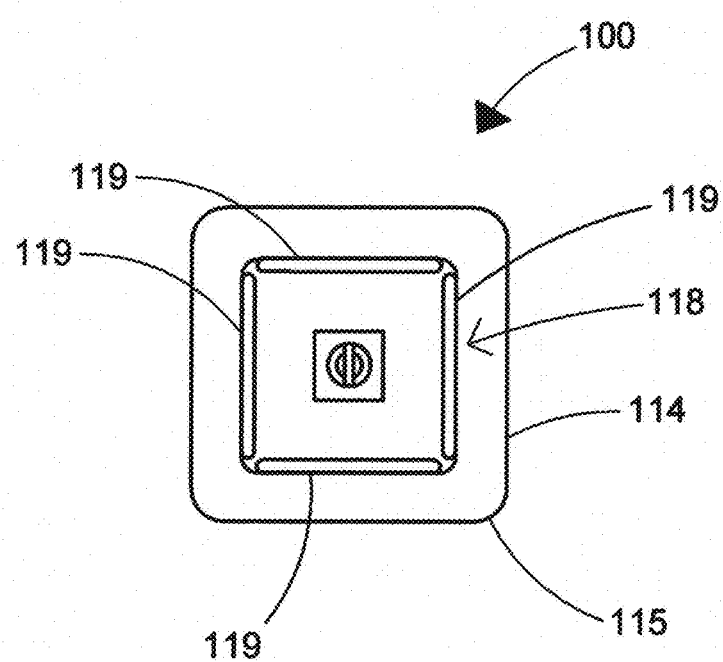
FIG. 14 is a bottom plan view of the illustrative embodiment of the multi-directional signal assembly of FIG. 10.

In one embodiment, the deployment lock mechanism 139 comprises a weight lock member 139' affixed to a portion of a weight 133, such as illustrated as internal threads in FIG. 12, and a float lock member 139" affixed to a portion of a float body 111, such a external threads shown in FIG. 11. Of course it will be appreciated that other mechanical fasteners may be utilized for a deployment member lock mechanism 139 in accordance with the present invention, other than or in addition to the threaded lock members 139' and 139" shown in the illustrative embodiments of FIGS. 11 and 12. As one example, aligning apertures and a retaining pin may be utilized, such as are shown as 39' and 39" in FIGS. 1 and 2, respectively. As another example, a quick connect type fitting may utilized as a deployment member lock mechanism 139 in accordance with the present invention.

One or more friction stop member 138 is mounted to either the weight 133 or the float body 111 in at least one embodiment in order to provide additional resistance against release of the weight deployment member 132. With reference to the illustrative embodiment of FIG. 12, a plurality of friction stop members 138 are mounted to the upper surface of a weight 133, and make contact with the base plate of the float lock member 139" shown in FIG. 11. More in particular, in one embodiment, a friction stop member 138 comprise a ball bearing mounted in a channel 138', as shown in FIG. 15, which is biased outwardly via a spring or similar biasing mechanism. As such, when the weight lock member 139' and the float lock member 139" of at least one embodiment of the present invention are threaded together into a locking orientation, friction stop members 138 will contact the base plate of float lock member 139" and will be forced back into corresponding channels 138'. As such, the spring or other biasing mechanism will apply a force against corresponding ones of the friction stop members 138 which will then apply force against the base plate of the float lock member 139", providing additional resistance which serves to retain the deployment member lock mechanism 139 in a locking orientation, such as is shown in FIG. 10, until released by a user.

Looking further to FIG. 15, in at least one embodiment, the counterweight assembly 130 includes a deployment member housing 135 which is mounted in a float assembly 110. More in particular, deployment member housing 135 is dimensioned to receive a substantial portion of the weight deployment member 132 therein while the weight deployment member 132 is disposed in a retracted orientation, once again, as shown best in FIG. 10. In at least one further embodiment, and again with reference to FIG. 15, the counterweight assembly 130 comprises a bearing mechanism 136 structured to facilitate repositioning of the weight deployment member 132 between a retracted orientation and a deployed orientation, as shown by way of example in FIGS. 10 and 11, respectively. In at least one embodiment, a weight deployment member 132 includes a stop member 137 attached to one end so as to prevent the weight deployment member 132 from being completely removed from the deployment member housing 135. More in particular, stop member 137 will abut against bearing mechanism 136 when the weight deployment member 132 is fully extended outwardly from the deployment housing 135 so as to prevent complete removal there from. In at least one further embodiment, and once again as shown in FIG. 15, a watertight seal 138 is provided so as to prevent, or at least minimize, the entry of water into the deployment member housing 135 and/or, more importantly, into the interior of the float assembly 110, thereby maintaining the buoyant construction of the same. In an embodiment having a float body 111 comprising a polystyrene foam core or shell, as disclosed above, the need for a watertight seal 138 is, of course, not necessary to maintain buoyancy.

Looking further to FIG. 11, which again is illustrative of a counterweight assembly 130 in a deployed orientation, a weight deployment member 132 is fully extended downwardly from the float body 111 thereby positioning the weight 133 a distance below the float body 111, the distance being only slightly less than the overall height of the float body 111 itself. As will be appreciated, in the deployed orientation, the counterweight assembly 130 serves to bias the float assembly 100 into an operative orientation relative to a surface of a body of water, such as is illustrated by way of example in FIG. 11.

As also shown in the figures, the lower section 114 of the float body 111 comprises a contoured lower edge 115 around its lower periphery which, as will be appreciated, facilitates movement of the float assembly 110 along and across the surface of a body of water, such as while in tow by a swimmer, diver, etc. A transition section 113 is provided in at least one embodiment of the present invention which extends outwardly and downwardly from the lower periphery of the upper section 112 of the float body 111 to the upper periphery of the lower section 114 of the float body 11, such as is shown best in FIGS. 10 and 12.

As in the previously disclosed embodiments, a multi-directional signal assembly 100 in accordance with the present invention comprises a signal display assembly 120 having a plurality of display surfaces 121, wherein at least one of said plurality of display surfaces 121 is visible from any point along a circle circumscribed around a vertical axis through a float assembly 110 and planar with the plurality of display surfaces 121. Stated otherwise, at least one of the plurality of display surfaces 121 of the signal display assembly 120 of the present multi-directional signal assembly 100, and more importantly, at least one of the signal indicia 122 displayed thereon, is visible from any direction which is generally perpendicular to the display surfaces 121.

FIG. 10 is illustrative of one embodiment of a multi-directional signal assembly 100 in accordance with the present disclosure, and in particular, FIG. 10 presents an elevation of one embodiment of a multi-directional signal assembly 100 comprising a signal assembly 120 affixed to an upper section 112 of a float assembly 110, and more in particular to an upper section 112 of a float body 111. As may be seen from the illustrative embodiment of FIG. 10, the signal display assembly 120 comprises a display surface 121 having a signal indicia 122 affixed to an upper portion 121' thereof. Display surface 121, in at least one embodiment, comprises a substantially rectangular configuration having a length and a width, wherein the length of the display surface 121 is aligned with a vertical axis through the center of the float assembly 110.

Signal indicia 122, in accordance with at least one embodiment of the present disclosure, comprises a Unites States dive flag, which is a widely known and readily recognizable signal indicating that a diver or snorkeler is in the water in the vicinity of the dive flag. The U.S. dive flag is crucial to mark the location of divers or snorkelers in the water, so that boats know to steer clear of the area for obvious safety reasons. The U.S. dive flag consists of a bright red or orange square having a broad white band running diagonally there through from the upper left corner to the lower right corner, such as is shown, by way of example, in the illustrative embodiments of FIGS. 10 through 12A.

In one embodiment, the signal indicia 122 comprises a U.S. Coast Guard ("USCG") approved reflective tape. As one example, an orange 3M™ Marine Grade USCG High Intensity Reflective Adhesive Tape, Product No. 3M USCGFP-34, manufactured by 3M Company, St. Paul, Minn., is utilized to form the square portion of the U.S. dive flag on an upper portion 121' of a corresponding display surface 121. In a further embodiment, a white 3M™ Marine Grade USCG High Intensity Reflective Adhesive Tape, Product No. 3M USCGFP-30, once again, manufactured by 3M Company, St. Paul, Minn., is utilized to form the diagonal band through the orange square of the U.S. dive flag. In at least one embodiment, signal indicia 122 comprises a U.S. dive flag having a substantially square configuration and being approximately twelve inches by twelve inches.

In yet one further embodiment in accordance with the present disclosure, white 3M™ SOLAS Marine Grade USCG High Intensity Reflective Adhesive Tape, Product No. 3M USCGFP-30, is affixed to the lower portion 121" of each display surface 121, to provide further overall visibility to the signal display assembly 120 while the multi-directional signal assembly 100 is deployed in a body of water. Alternatively, a white marine paint may be applied to the lower portion 121" of each display surface 121.

FIG. 11 presents an elevation of another side of the illustrative embodiment of FIG. 10, showing another of the plurality of display surfaces 121 of the signal display assembly 120. FIG. 11 is further illustrative of another of the plurality of signal indicia 122 affixed to an upper portion 121' of corresponding display surface 121. FIG. 11 also presents a side elevation of a counterweight assembly 130, shown in a deployed orientation, as previously indicated.

FIGS. 12 and 12A are perspective views of different embodiments of a multi-directional signal assembly 100 in accordance with the present invention. As clearly shown in the illustrative embodiments of FIGS. 12 and 12A, the signal display assembly 120 comprises a plurality of display surfaces 121 each having at least one of a plurality of signal indicia 122 affixed thereto. Once again, each of the plurality of signal indicia 122 are affixed to an upper portion 121' of a corresponding one of the plurality of display surfaces 121. As will be appreciated from the illustrative embodiments of FIGS. 12 and 12A, at least one of the plurality of signal indicia 122 affixed to an upper portion 121' of one of the plurality of display surfaces 121 of the present multi-directional signal assembly 100 will be visible from any direction in a field of view which is generally perpendicular to the display surfaces 121.

In at least one embodiment of a multi-directional signal assembly 100 in accordance with the present invention, an operative orientation is at least partially defined by each of a plurality of display surfaces 121 disposed in a substantially upright orientation relative to a surface of a body of water. The operative orientation may be further defined by maintaining the upper portion 121' of each of the plurality of display surfaces 121 substantially above the surface of the body of water, such that the display indicia 122 affixed thereon is readily visible.

Looking again to the illustrative embodiment of FIG. 10, a multi-directional signal assembly 100 in accordance with the present invention comprises an illumination assembly 140. An illumination assembly 140 in accordance with at least one embodiment of the present invention comprises an illumination member housing 144 having a cover 144' disposed over one end. In one embodiment, the cover 144' comprises a light transmissive material of construction, and in one further embodiment, the illumination member housing 144 and cover 144' combine to form a waterproof enclosure, and in one further embodiment, a sealed watertight enclosure.

An illumination assembly 140 in accordance with at least one embodiment of the present invention also includes at least one illumination member 145 and a power supply 141 which may be actuated by a switch or sensor, such as described above. In one embodiment, the power supply 141 comprises one or more rechargeable dry storage batteries. A controller (not shown) may be provided in order to allow preprogrammed operation of one or more illumination member 145, either individually or in combination with one or more sensor or switch.

Figure 16:
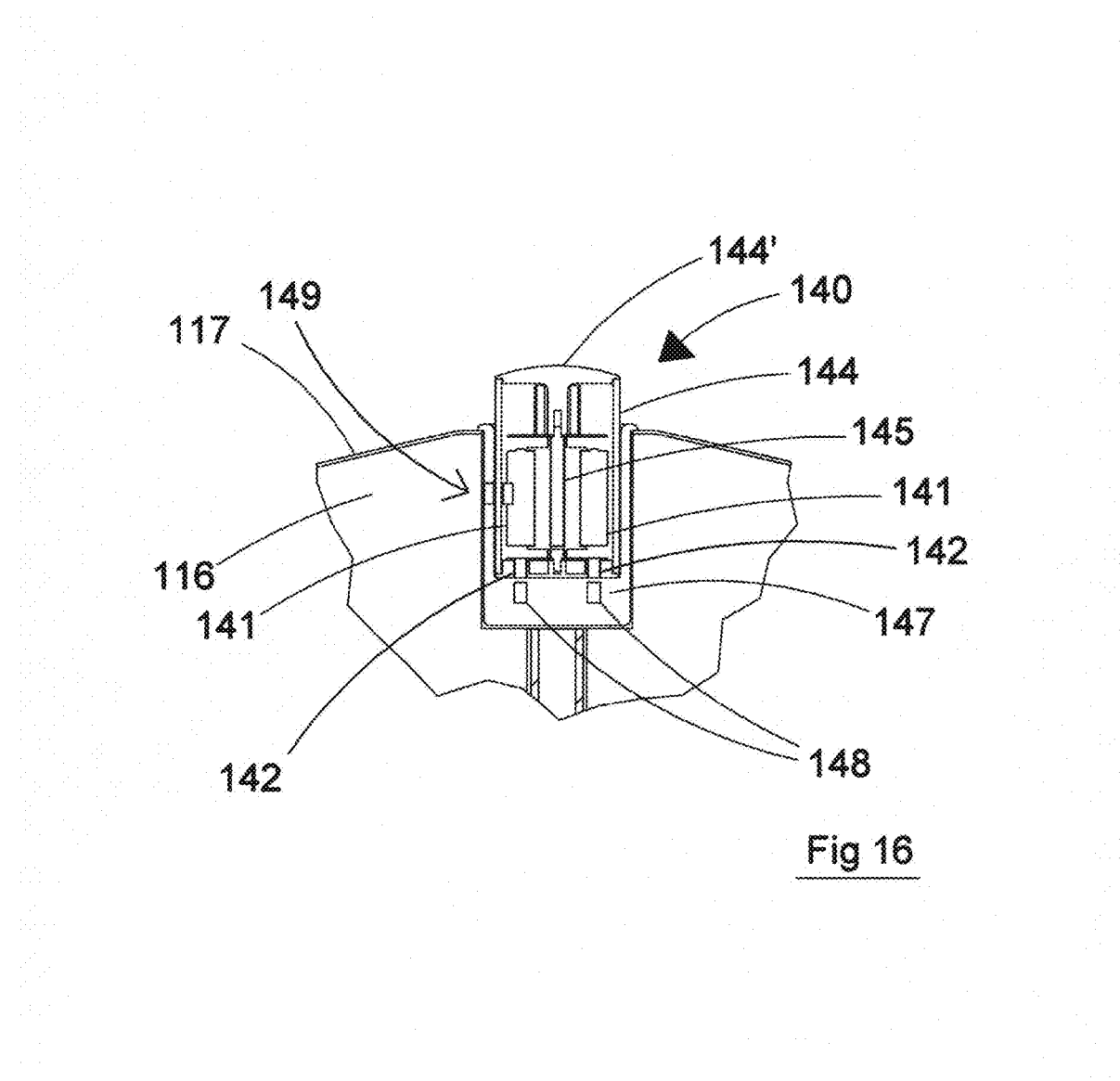
FIG. 16 is a partial cutaway view of one illustrative embodiment of an illumination assembly in accordance with the present invention.

As shown best in the enlarged detail of FIG. 16, an illumination member 145 and power supply 141 are mounted inside of illumination member housing 144 and enclosed therein by cover 144', thereby maintaining these electrical components in a waterproof or watertight environment while the present invention is deployed in a body of water. One or more housing contacts 142 are mounted in the illumination member housing 144. As will be appreciated, in at least one embodiment the housing contacts 142 are mounted adjacent the bottom of the illumination member housing 144. One or more corresponding float assembly contacts 148 are cooperatively positioned within an illumination housing sleeve 147 which is securely mounted in the float body 111, once again, as may be seen best in FIG. 16. One or more of the contacts 142, 148 comprise a magnet or a magnetic material of construction, wherein the magnetic forces between corresponding housing contacts 142 and float assembly contacts 148 are sufficient to retain the illumination member housing 144 in an operative position in the illumination housing sleeve 147 during normal operation of the present invention. The illumination member housing 144 and illumination housing sleeve 147 are cooperatively dimensioned in at least one embodiment so as to create frictional forces between each other while the illumination member housing 144 is positioned in the illumination member sleeve 147, to further facilitate maintaining the illumination member housing 144 in an operative position.

As such, in at least one embodiment, when the illumination member housing 144 is disposed in an operative engagement within the illumination housing sleeve 147, magnetic forces cause the housing contacts 142 to align with the float assembly contacts 148, thereby aligning and actuating a switch assembly 149 and completing an illumination circuit between the illumination member 145 and the power supply 141, and thus, actuating the at least one illumination member 145. In one embodiment, the switch assembly 149 comprises a magnet and a leaf switch which is biased into a closed configuration via magnetic forces. As shown in the illustrative embodiment of FIG. 16, the magnet of switch assembly 149 is mounted in the illumination housing sleeve 147 while the leaf switch member is mounted internally in the illumination member housing 144. Of course, it is understood to be within the scope and intent of the present invention to provide other mechanisms to actuate the illumination system 140 including, by way of example only, a manual switch mechanism actuated by a user, a timer switch mechanism, or a sensor actuation mechanism, such as was described in detail above.

The power supply 141 of the illumination assembly 140 in accordance with at least one embodiment of the present invention may be recharged by way of a charger assembly 150. As may be seen in FIG. 17, a charger assembly 150 includes a charger base 152 comprising a charging surface, such as an induction charger, and in at least one embodiment, a pair of charger contacts 154 are arranged on the charger base 154 which correspond to the housing contacts 142 on the bottom of the illumination member housing 144. As above, in order to maintain the illumination member housing 144 in position, housing contacts 142 and charger contacts 154 in at least one embodiment comprise magnets and/or magnetic materials of construction. Thus, in order to recharge the power supply 141, the illumination member housing 144 is simply placed on the charger base 152 and magnetic forces cause the housing contacts 142 and charger contacts 154 to align. The charger base 152 is plugged into an appropriately rated electrical power outlet, and the power supply 141 is recharged via the charging surface of charger base 152.

As indicated above, in at least one embodiment the illumination assembly 140 further comprises a controller which is programmed to actuate one or more illumination member 145 of the illumination assembly 140. As one example, and as disclosed above, a controller is programmed to actuate one or more illumination member 145 upon detection of at least one environmental parameter. For example, in one embodiment, a flashing or strobe light emitting diode 146 is mounted in the illumination member housing 144, and the controller is programmed to actuate the strobe light emitting diode 146 upon detection of a predetermined level of fog or available ambient light proximate the multi-directional signal assembly 100, via one or more sensor, as described above. In another embodiment, an accelerometer may be employed to detect wave motion, and to actuate or flash one or more illumination member 145 upon detection a crest of a wave, once again, to increase visibility of the multi-directional signal assembly 100 while deployed in a body of water. One or more sensor may be combined with a digital display to indicate one or more environmental parameter including, but not limited to, water temperature, air temperature, wave height, battery capacity, diver depth, depth temperature, etc. A digital display may be mounted directly to the float assembly 110 and/or attached at one end of diver/snorkeler tether to provide an immediate indication of the parameter(s) to the user.

Another alternate embodiment of a multi-directional signal assembly in accordance with the present invention is generally shown as at 200 in the illustrative embodiments of FIGS. 18 through 24. A multi-directional signal assembly 200 in accordance with the present disclosure comprises a float assembly 210 having a float body 211 comprising a buoyant construction. In at least one embodiment, the float body 211 includes an inner core 216 formed of a lightweight material of construction and an outer coating 217 to impart structural integrity to the inner core 216, similar to an exoskeleton, as may be seen in FIGS. 23 and 24.

In at least one embodiment, the inner core 216 comprises a polystyrene foam construction, thereby being inherently buoyant in water. In at least one further embodiment, the inner core 216 comprises a polystyrene foam having a density in a range of about 1.5 pounds per cubic foot to about 2.5 pounds per cubic foot.

Figure 23:
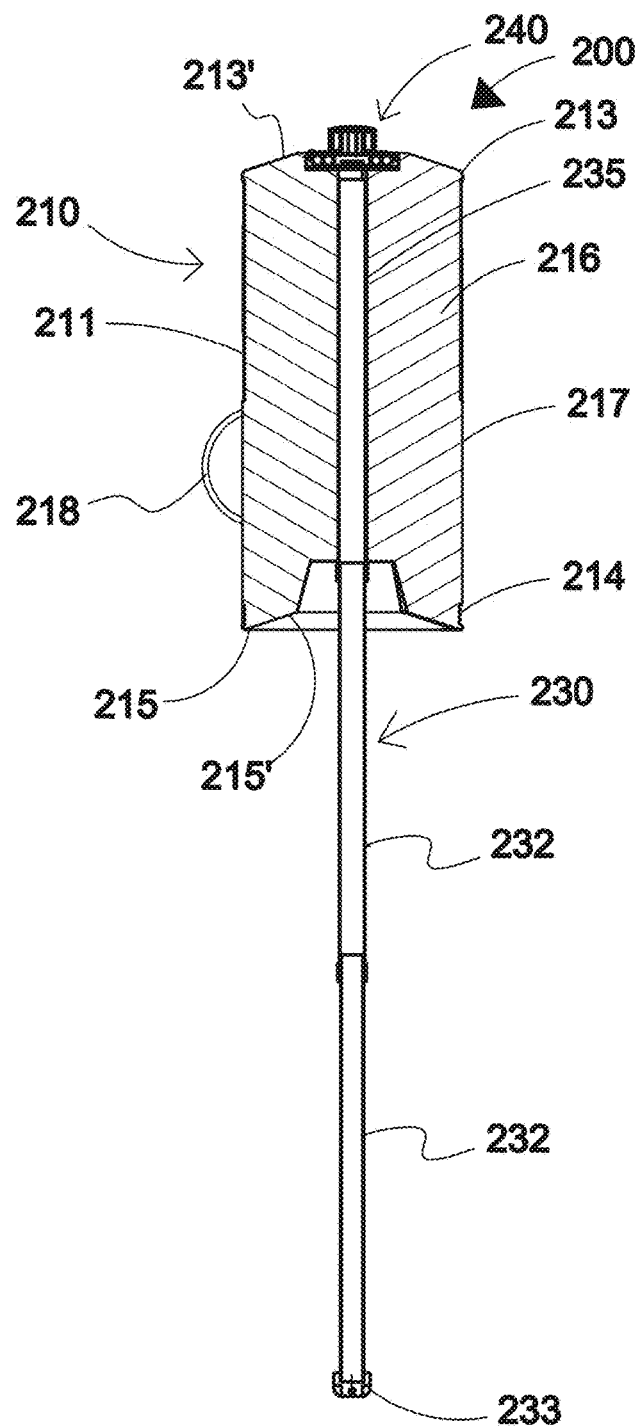
FIG. 23 is a cross-sectional view of the alternate illustrative embodiment of a multi-directional signal assembly of FIG. 18 showing a counterweight mechanism in a deployed orientation.
Figure 24:
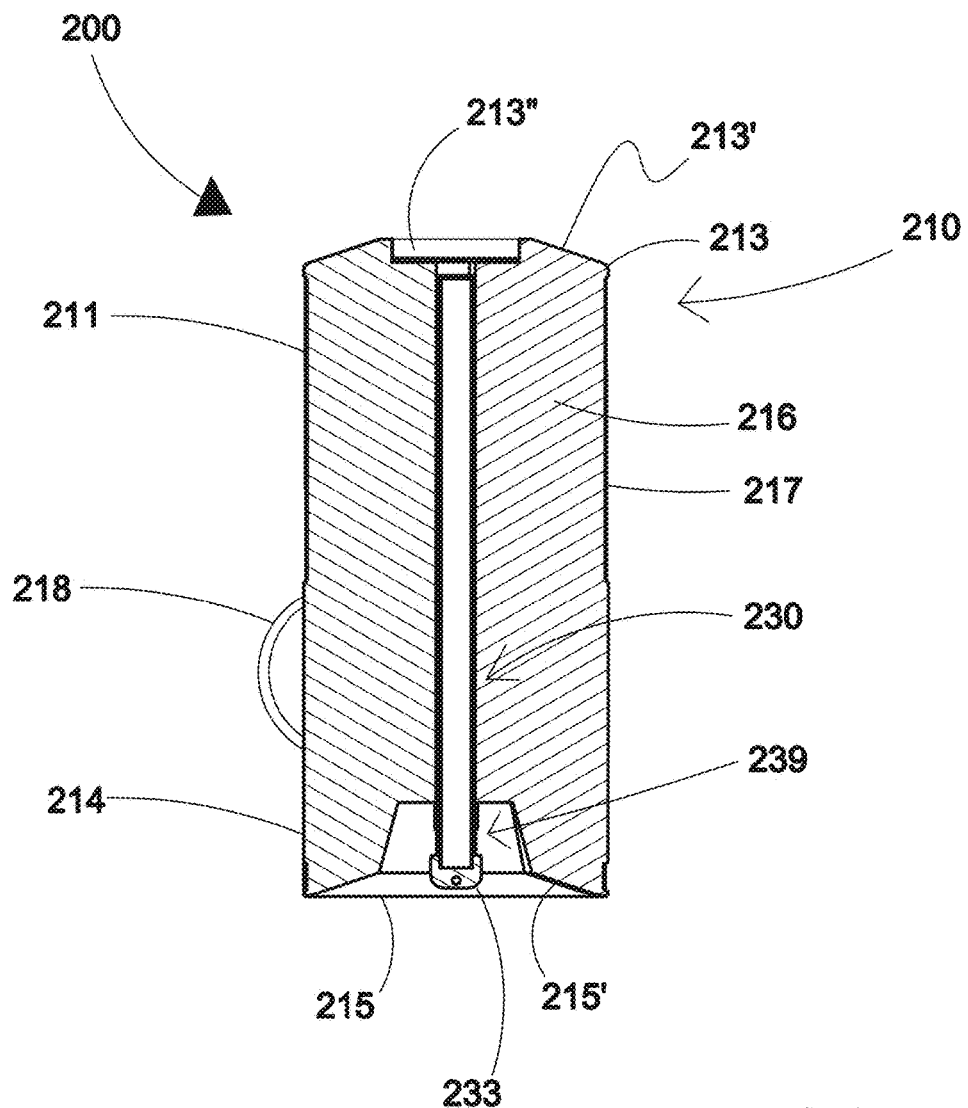
FIG. 24 is a cross-sectional view of the alternate illustrative embodiment of a multi-directional signal assembly of FIG. 18 showing the counterweight mechanism in a retracted orientation.

As previously stated, in at least one embodiment the float assembly 210, and more in particular, the float body 211, comprises an outer coating 217, once again, as shown in FIGS. 23 and 24. In at least one embodiment, the outer coating 217 comprises a layer of polyurea with a top coating aliphatic hydrocarbon, 100% solids, which are sprayed evenly over the inner core 216. In one further embodiment, the outer coating 217 is uniformly applied to a thickness in the range of about 0.03 inches to about 0.05 inches. In at least one further embodiment, the outer coating 217 comprises a Shore A harness in a range of about 88 to 92, and a tensile strength of about 2,200 pounds per square inch. In this configuration, the float assembly 210 comprises a buoyancy of about one hundred pounds force.

Figure 18:
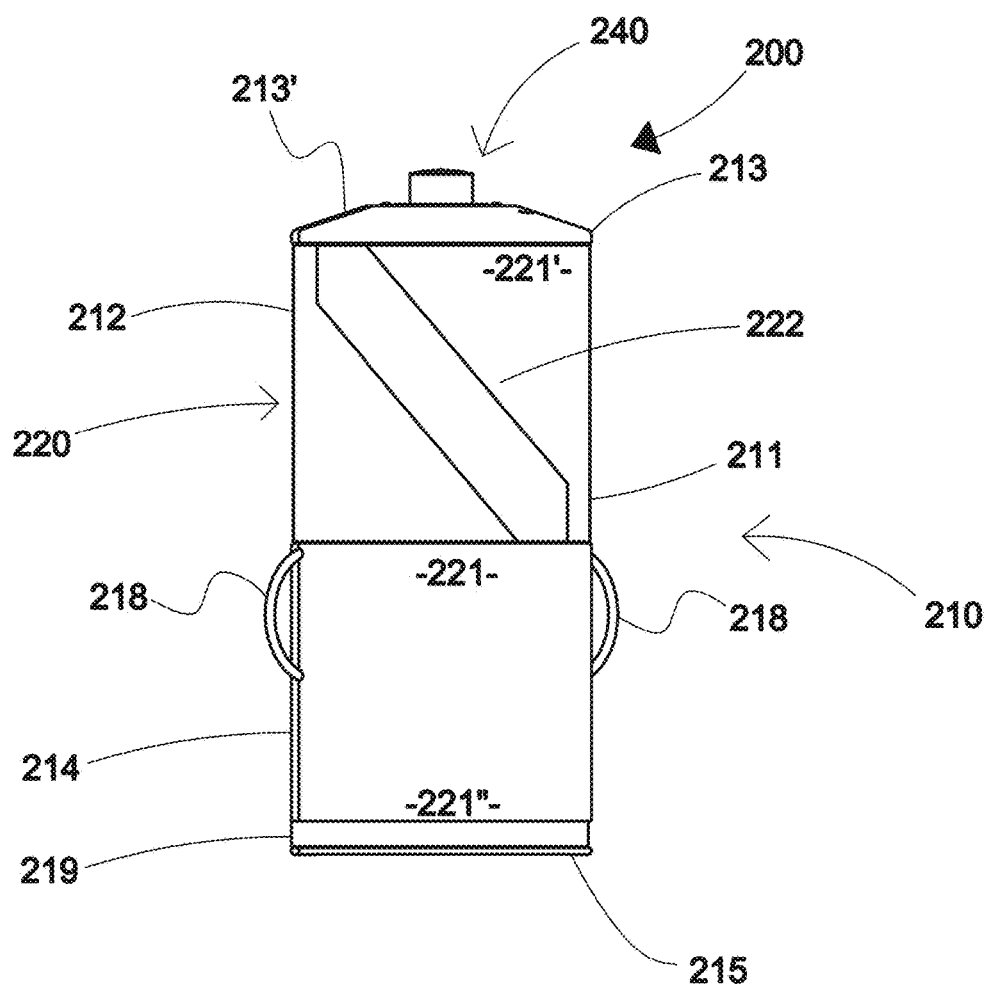
FIG. 18 is an elevation of another alternate illustrative embodiment of a multi-directional signal assembly in accordance with the present invention.

Returning to the illustrative embodiment of a multi-directional signal assembly 200 of FIG. 18, the float body 211 comprises an upper section 212 and a lower section 214. As shown in FIG. 18, the float body 211 comprises a substantially uniform square rectangular cross section over its entire length. Stated otherwise, both the upper section 212 and the lower section 214 of the float body 211 in the embodiment of FIG. 18 have substantially similar outer peripheries or footprints, similar to the embodiments of FIGS. 1 through 9.

Figure 19:
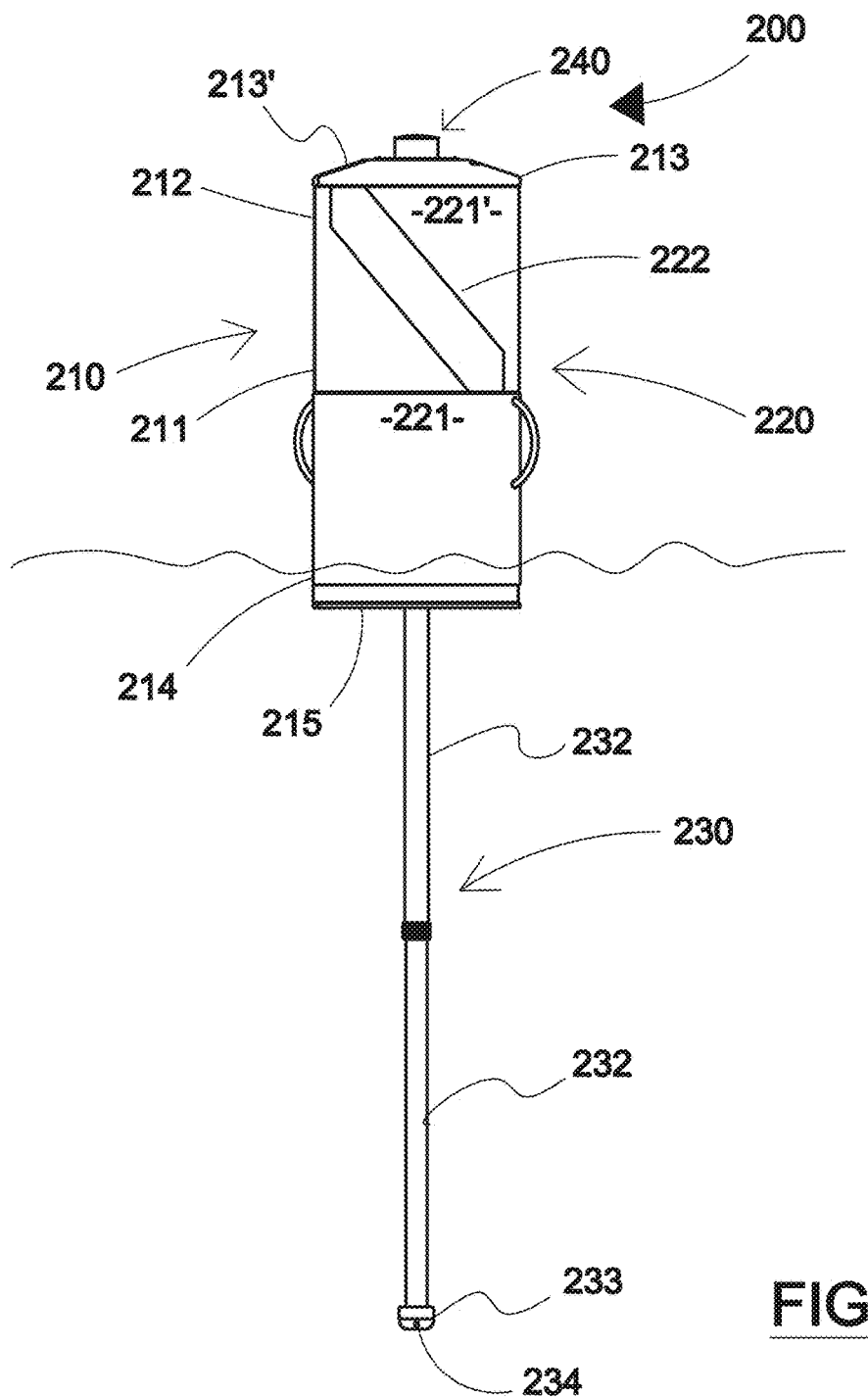
FIG. 19 is a side elevation of the illustrative embodiment of the multi-directional signal assembly of FIG. 18 deployed in a body of water.

FIG. 19 is illustrative of one embodiment of a float assembly 210 deployed on a surface of a body of water, wherein the float body 211 is disposed in an operative orientation, which is at least partially defined by a length of a display surface 221, as is discussed in greater detail below, disposed approximately perpendicular orientation relative to the surface of the body of water, such that the upper section 212 of the float body 211 is disposed above the surface of the body of water.

FIGS. 18 through 24 are further illustrative of one embodiment of a handle member 218 attached to a float assembly 210, and more in particular, to the float body 211. As will be appreciated from FIG. 19, the plurality of handle members 218 serve as hand holds for a swimmer or diver while in the water in order to rest, adjust equipment, etc. Each of the handle members 218 may be constructed from any of a variety of materials including metal or metal alloy tubing, or an engineered plastic tubing, such as, by way of example only, acrylonitrile butadiene styrene ("ABS"), in order to increase buoyancy of the overall multi-directional signal assembly 200 in accordance with the present invention. The handle member(s) 218 must comprise sufficient structural integrity to support the weight of the float assembly 210 while being lifted and moved about out of the water, and to support the weight of a swimmer or diver holding onto a handle member 218 while he or she is in the water.

Figure 20:
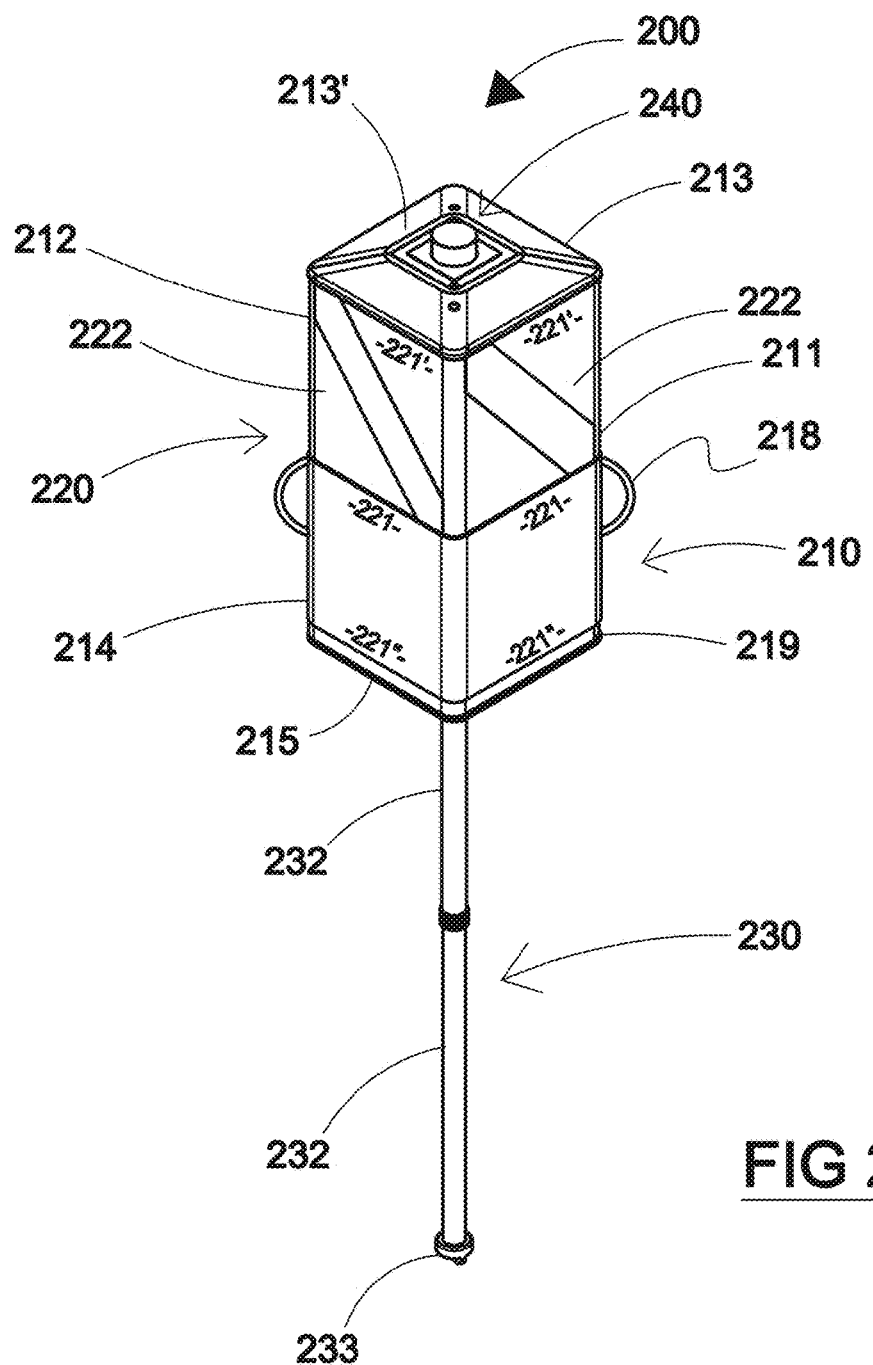
FIG. 20 is a perspective view of the illustrative embodiment of a multi-directional signal assembly of FIG. 18.
Figure 21:
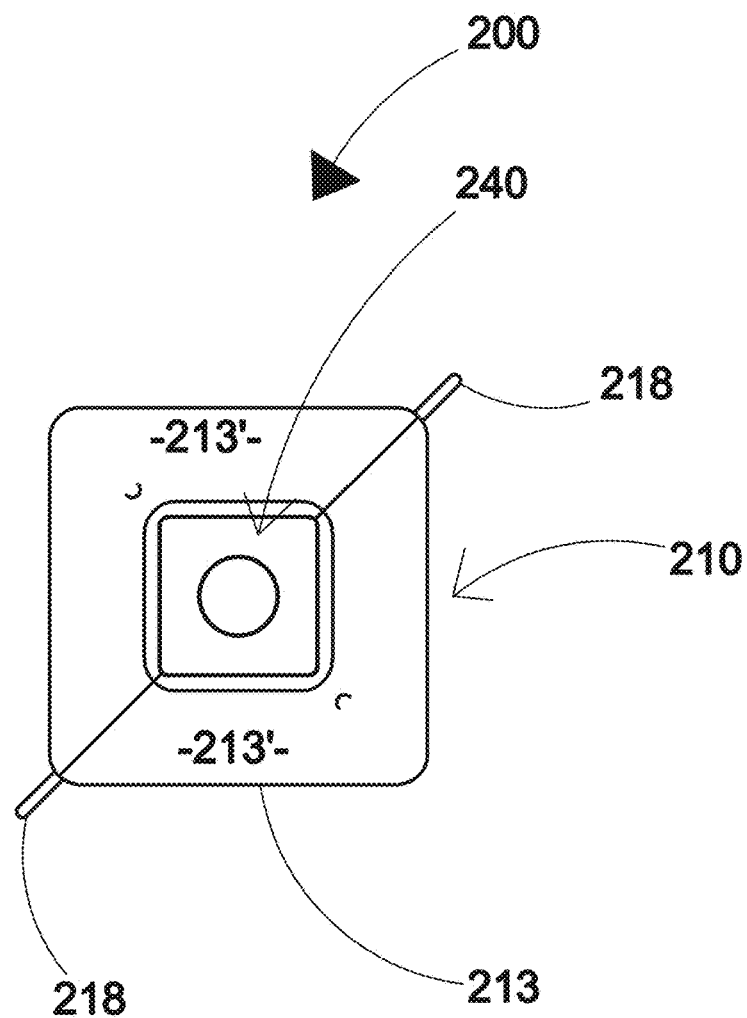
FIG. 21 is a top plan view of the illustrative embodiment of the multi-directional signal assembly of FIG. 18.
Figure 22:
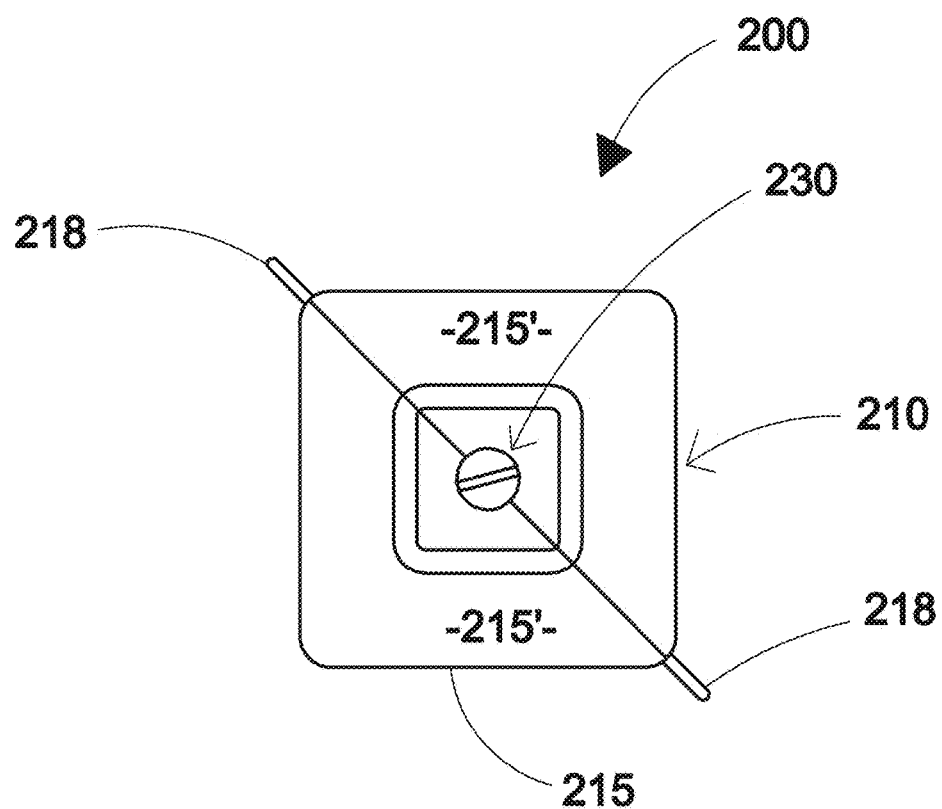
FIG. 22 is a bottom plan view of the illustrative embodiment of the multi-directional signal assembly of FIG. 18.

In at least one embodiment, an accessory band 219 is affixed around the lower section 214 of the float body 211, as shown in FIGS. 18 and 20. One or more utility hooks, rings, clips, etc., are attached to the accessory band 219 to allow a user a place to attach one or more items to the float body 211 while he or she is diving, swimming, spear fishing, etc. In one further embodiment, one or more utility hooks, rings, clips, etc., are mounted directly to a portion of the float body 211.

FIG. 19 illustrates a counterweight assembly 230 including a weight 233 affixed to the bottom of float assembly 210 and having an interconnection eyelet 234 through a portion thereof. As before, the interconnection eyelet 234 allows the multi-directional signal assembly 200 to be attached to a tie line of a water craft or to a tether attached to a user. Alternatively, a weight or anchor line is attached to the interconnection eyelet 234, so as to maintain the multi-directional signal assembly 200 in a particular location when deployed in a body of water. In FIG. 18, the counterweight assembly 230 is not shown as it is disposed in a retracted orientation. FIG. 24 further illustrates a deployment lock mechanism 239 which serves to retain the weight 233 and weight deployment member(s) 232 (not shown) of the counterweight assembly 230 secured in a retracted orientation until released for deployment by a user.

Looking further to FIG. 23, in at least one embodiment, the counterweight assembly 230 includes a deployment member housing 235 which is mounted in the float assembly 210. More in particular, deployment member housing 235 is dimensioned to receive a substantial portion of the weight deployment member(s) 232 therein while the weight deployment member(s) 232 are disposed in a retracted orientation. Thus, the counterweight assembly 230, and more in particular, the weight deployment members 232 are positionable between a retracted orientation, as shown in FIG. 24, and a deployed orientation, as shown by way of example in FIGS. 19, 20, and 23. In at least one embodiment, a weight deployment member 232 includes a stop member (not shown) attached to one end so as to prevent the weight deployment member 232 from being completely removed from the deployment member housing 235.

Looking further to FIG. 19, which again is illustrative of a counterweight assembly 230 in a deployed orientation, a plurality of weight deployment members 232 are fully extended downwardly from the float body 211 thereby positioning the weight 233 a distance below the float body 211, the distance being greater than the overall height of the float body 211 itself. As will be appreciated, in the deployed orientation, the counterweight assembly 230 serves to bias the float assembly 200 into an operative orientation relative to a surface of a body of water, such as is illustrated by way of example in FIG. 19.

FIG. 18 further illustrates a top surface 213 of a float body 211 and a bottom surface 215. As shown in FIGS. 18 through 20, the top surface 213 of the float body 211 comprises a top interface 213'. In at least one embodiment the top interface 213' comprises a tapered surface extending upwardly from the upper section 212 of the flat body 211. As shown in the illustrative embodiment of FIG. 20, the top interface 213' extends upwardly from the upper section 212 of the float body 211 to the periphery of an illumination assembly 240, discussed in further detail below. Looking further to FIGS. 23 and 24, the bottom surface 215 of the float body 211 further comprises a bottom interface 215'. More in particular, the bottom interface 215' extends upwardly and inwardly from the lower section 214 of the float body 211 towards counterweight assembly 230.

As also illustrated best in FIGS. 23 and 24, the top interface 213' and the bottom interface 215' comprise complimentary interlocking surfaces. As such, and as illustrated in FIG. 24, upon disposition of the deployment assembly 230 into a retracted orientation and removal of the light assembly 240 (not shown), the bottom surface 215 of one multi-directional signal assembly 200 in accordance with the present invention is positionable onto the top surface 213 of another multi-directional signal assembly 200 in a supported and at least partially interlocked orientation. In this manner, a plurality of multi-directional signal assemblies 200 in accordance with the present invention can be stacked on top of one another for storage and/or transport in a manner similar to that shown in FIG. 32, which is discussed in greater detail below.

In at least one embodiment, the lower section 214 of the float body 211 comprises a contoured lower edge around its lower periphery to facilitate movement of the float assembly 210 along and across the surface of a body of water, such as while in tow by a swimmer, diver, etc.

As in the previously disclosed embodiments, a multi-directional signal assembly 200 in accordance with the present invention comprises a signal display assembly 220 having a plurality of display surfaces 221, wherein at least one of said plurality of display surfaces 221 is visible from any point along a circle circumscribed around a vertical axis through a float assembly 210 and planar with the plurality of display surfaces 221. Stated otherwise, at least one of the plurality of display surfaces 221 of the signal display assembly 220 of the present multi-directional signal assembly 200, and more importantly, at least one of the signal indicia 222 displayed thereon, is visible from any direction which is generally perpendicular to the display surfaces 221, as is apparent from the perspective view of the illustrative embodiment of FIG. 20.

Looking again to FIG. 18, which is illustrative of one alternate embodiment of a multi-directional signal assembly 200 in accordance with the present disclosure, and more in particular, FIG. 18 presents an elevation of one alternate embodiment of a multi-directional signal assembly 200 comprising a signal assembly 220 affixed to an upper section 212 of a float assembly 210, and more in particular to an upper section 212 of a float body 211. As may be seen from the illustrative embodiment of FIG. 18, the signal display assembly 220 comprises a display surface 221 having a signal indicia 222 affixed to an upper portion 221' thereof. Display surface 221, in at least one embodiment, comprises a substantially rectangular configuration having a length and a width, wherein the length of the display surface 221 is aligned with a vertical axis through the center of the float assembly 210.

Signal indicia 222, in accordance with at least one embodiment of the present disclosure, comprises a Unites States dive flag, which is a widely known and readily recognizable signal indicating that a diver or snorkeler is in the water in the vicinity of the dive flag. The U.S. dive flag is crucial to mark the location of divers or snorkelers in the water, so that boats know to steer clear of the area for obvious safety reasons. The U.S. dive flag consists of a bright red or orange square having a broad white band running diagonally there through from the upper left corner to the lower right corner, such as is shown, by way of example, in the illustrative embodiments of FIGS. 18 through 20.

In one embodiment, the signal indicia 222 comprises a U.S. Coast Guard ("USCG") approved reflective tape. As one example, an orange 3M™ Marine Grade USCG High Intensity Reflective Adhesive Tape, Product No. 3M USCGFP-34, manufactured by 3M Company, St. Paul, Minn., is utilized to form the square portion of the U.S. dive flag on an upper portion 221' of a corresponding display surface 221. In a further embodiment, a white 3M™ Marine Grade USCG High Intensity Reflective Adhesive Tape, Product No. 3M USCGFP-30, once again, manufactured by 3M Company, St. Paul, Minn., is utilized to form the diagonal band through the orange square of the U.S. dive flag. In at least one embodiment, signal indicia 222 comprises a U.S. dive flag having a substantially square configuration and being approximately twelve inches by twelve inches.

In yet one further embodiment in accordance with the present disclosure, white 3M™ SOLAS Marine Grade USCG High Intensity Reflective Adhesive Tape, Product No. 3M USCGFP-30, is affixed to the lower portion 221" of each display surface 221, to provide further overall visibility to the signal display assembly 220 while the multi-directional signal assembly 200 is deployed in a body of water. Alternatively, a white marine paint may be applied to the lower portion 221" of each display surface 221.

FIG. 19 presents an elevation of another side of the illustrative embodiment of FIG. 18, showing another of the plurality of display surfaces 221 of the signal display assembly 220. FIG. 19 is further illustrative of another of the plurality of signal indicia 222 affixed to an upper portion 221' of corresponding display surface 221.

FIG. 20 is a perspective view of the alternate embodiment of a multi-directional signal assembly 200 in accordance with the present invention. As clearly shown in the illustrative embodiment of FIG. 20, the signal display assembly 220 comprises a plurality of display surfaces 221 each having at least one of a plurality of signal indicia 222 affixed thereto. Once again, each of the plurality of signal indicia 222 are affixed to an upper portion 221' of a corresponding one of the plurality of display surfaces 221. As will be appreciated from the illustrative embodiment of FIG. 20, and as stated above, at least one of the plurality of signal indicia 222 affixed to an upper portion 221' of one of the plurality of display surfaces 221 of the present multi-directional signal assembly 200 will be visible from any direction in a field of view which is generally perpendicular to the display surfaces 221.

In at least one embodiment of a multi-directional signal assembly 200 in accordance with the present invention, an operative orientation is at least partially defined by each of a plurality of display surfaces 221 disposed in a substantially upright orientation relative to a surface of a body of water. The operative orientation may be further defined by maintaining the upper portion 221' of each of the plurality of display surfaces 221 substantially above the surface of the body of water, such that the display indicia 222 affixed thereon is readily visible, such as is illustrated, by way of example, in FIG. 20.

Looking again to the illustrative embodiment of FIG. 18, a multi-directional signal assembly 200 in accordance with the present invention comprises an illumination assembly 240. An illumination assembly 240 in accordance with at least one embodiment of the present invention comprises an illumination unit 245 which is enclosed within an illumination unit housing 244 which, in at least one embodiment, comprises a cover 244' disposed over one end. In one embodiment, the illumination unit housing 244 and cover 244' are cooperatively constructed to form a watertight enclosure, and in one further embodiment, a sealed waterproof enclosure. In at least one embodiment, the illumination unit housing 244 and/or the cover 244' comprise a light transmissive material of construction, and in one further embodiment, the illumination unit housing 244 and/or the cover 244' comprise a thermoplastic polycarbonate material of construction, such as LEXAN®.

An illumination assembly 240 in accordance with at least one embodiment of the present invention also includes a power supply 241 enclosed within the illumination unit housing 244, which is actuated by a switch or sensor, such as, by way of example only, switch assembly 149 described above. In one embodiment, the power supply 241 comprises one or more rechargeable dry storage batteries. A controller (not shown) may be provided in order to allow preprogrammed operation of the illumination unit 245, and more in particular, one or more illumination members 246, either individually or in combination with one or more sensor or switch.

Figure 25:
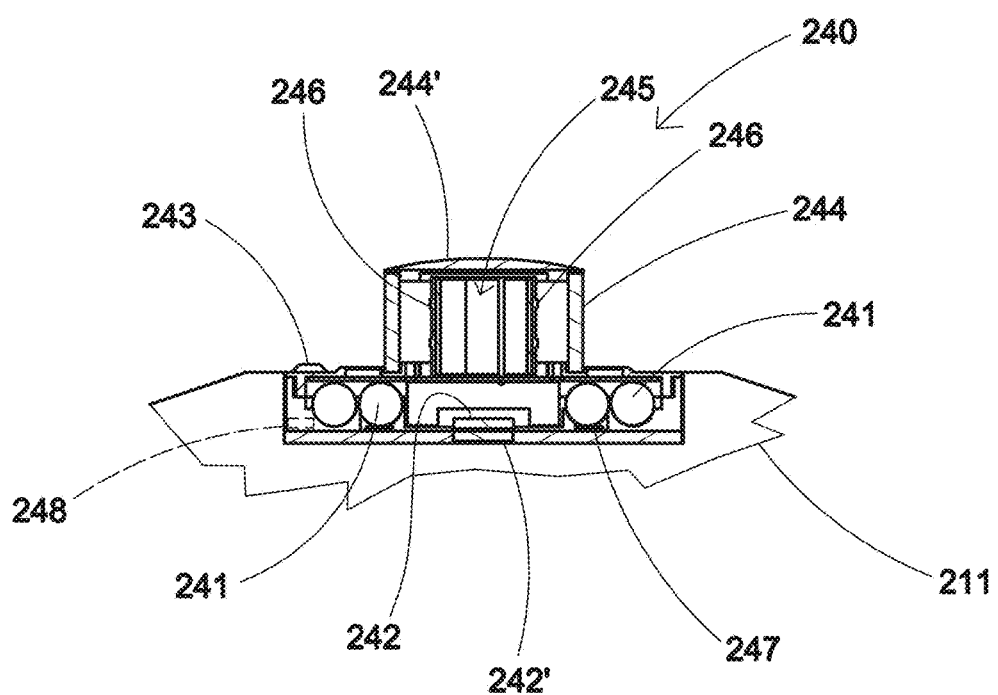
FIG. 25 is a cross-sectional view of one illustrative alternate embodiment of an illumination assembly in accordance with the present invention.
Figure 25A:
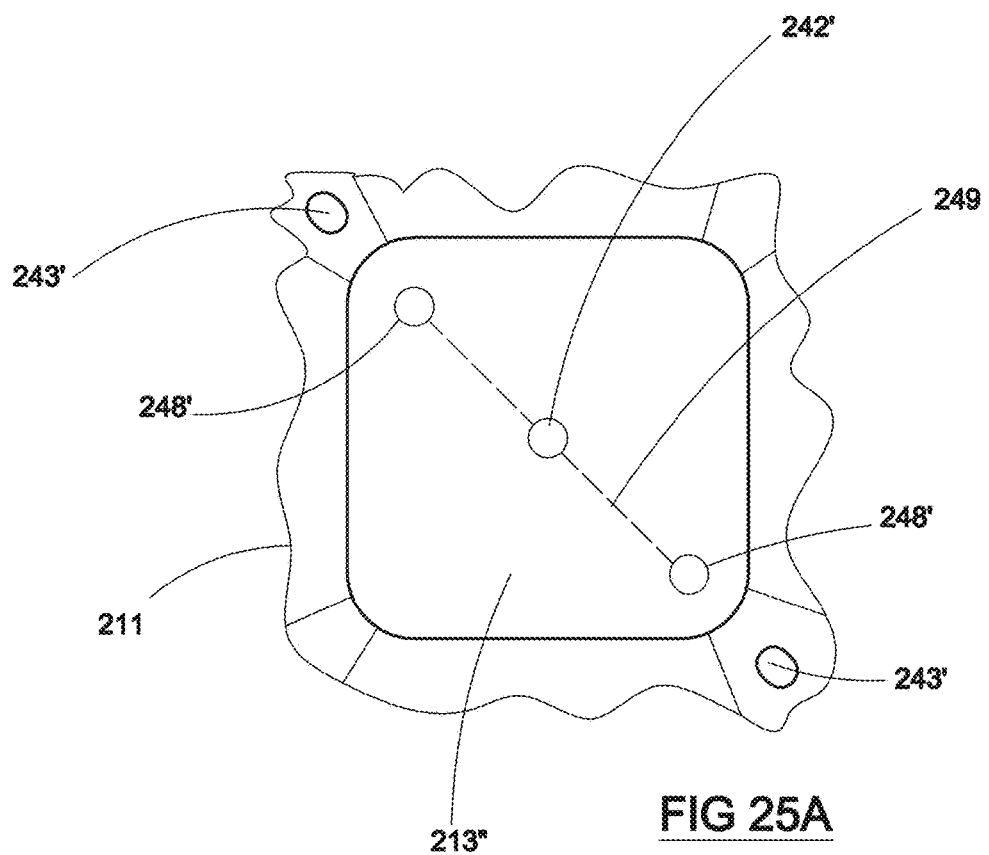
FIG. 25A is partial top plan view of one illustrative embodiment of an illumination assembly mount in accordance with the present invention.
Figure 27:
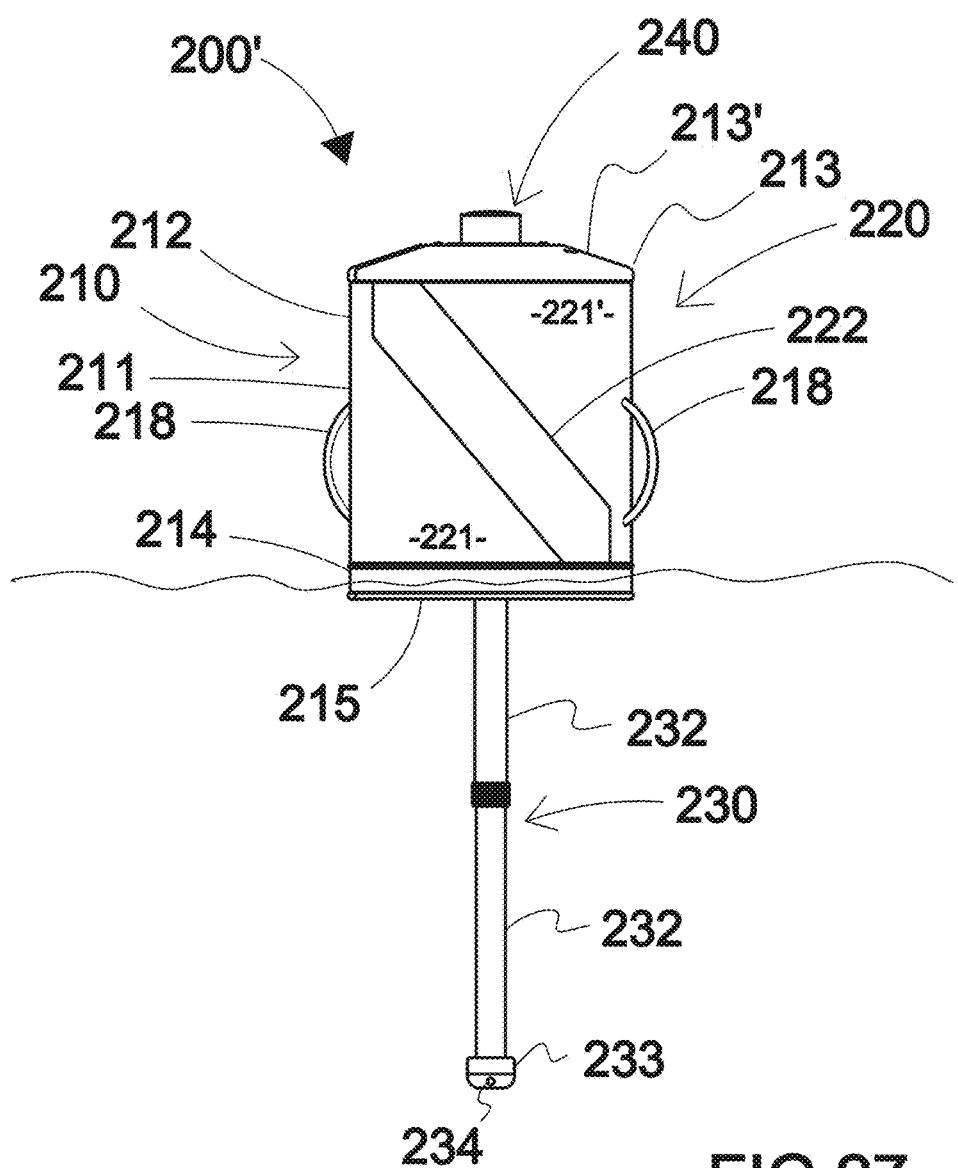
FIG. 27 is a side elevation of the illustrative embodiment of the multi-directional signal assembly of FIG. 26 deployed in a body of water.

As shown best in the cross-sectional view of FIG. 25, the illumination unit 245 and power supply 241 are mounted inside of illumination unit housing 244 and enclosed therein by cover 244', thereby maintaining the electrical components in a waterproof or watertight environment while the present invention is deployed in a body of water. The illumination unit housing 244 further comprises at least one housing interconnect 242 which releasably secures the illumination assembly 240 to the float assembly 210 via a corresponding float interconnect 242'. In at least one embodiment, the housing interconnect 242 is mounted inside of the illumination unit housing 244, as is shown in FIG. 25, and the float interconnect 242' is mounted in the illumination assembly mount 213", as shown in FIG. 25A. In at least one further embodiment, the housing interconnect 242 and/or the float interconnect 242' comprise one or more magnets which generate sufficient magnetic force to releasably retain the illumination assembly 240 in the illumination assembly mount 213" of the float assembly 210 during normal operation of the multi-directional signal assembly 200 of the present invention while deployed in a body of water, such as is shown in FIGS. 19 and 27.

The illumination member housing 244 and the illumination assembly mount 213" are cooperatively dimensioned in at least one embodiment so as to create frictional forces between each other while the illumination member housing 244 is positioned in the illumination assembly mount 213", to further facilitate releasably retaining the illumination assembly 240 in an operative position in the illumination assembly mount 213".

One or more housing circuit contacts 248 are mounted in the illumination unit housing 244 and are disposed in electrical communication with the power supply 241 and the illumination unit 245, such as, by way of example, via electrically conductive wires. As will be appreciated, in at least one embodiment the housing circuit contacts 248 are mounted adjacent the bottom of the illumination unit housing 244. As further illustrated in FIGS. 25 and 28, a housing alignment indicia 243 is disposed on an upper surface of the illumination assembly 240 indicating the presence of a housing circuit contact 248 proximate thereto. The housing alignment indicia 243 may comprise a protrusion or indentation in the material of the top surface of the illumination assembly 240 itself, and/or a different color marking thereon.

One or more corresponding float circuit contacts 248' are cooperatively positioned within the illumination assembly mount 213" in the float body 211, as may be seen best in FIG. 25A. Similar to the housing circuit contacts 248, one or more float alignment indicia 243' are disposed in the top surface 213 of the float body 211 indicating the proximity of a corresponding float circuit contact 248' thereto. Also similar to the housing alignment indicia 242, the float alignment indicia 243' may comprise a protrusion or indentation in the material of the top surface of the illumination assembly 240 itself, and/or a different color marking thereon.

As further illustrated in FIG. 25A, a float switch circuit 249 is formed between the float circuit contacts 248' in the illumination assembly mount 213" wherein, in at least one embodiment, the float switch circuit 249 comprises an electrically conductive wire connected between the float circuit contacts 248'. In at least one embodiment, one or more of the circuit contacts 248, 248' comprise a magnet or a magnetic material of construction, wherein the magnetic forces between corresponding housing circuit contacts 248 and float circuit contacts 248' are sufficient to complete an illumination circuit between the power supply 242 and the illumination unit 245, thereby actuating the same.

Figure 28:
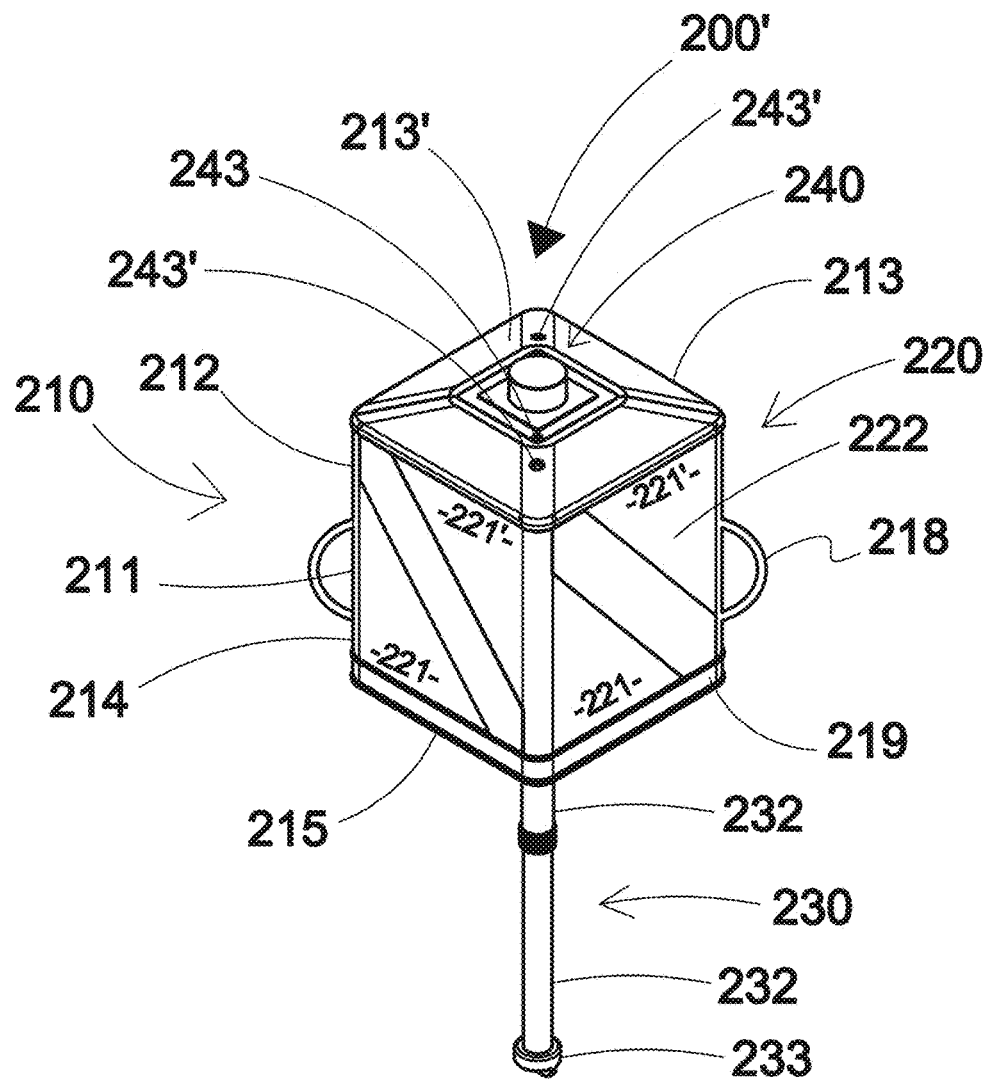
FIG. 28 is a perspective view of the illustrative embodiment of a multi-directional signal assembly of FIG. 26.
Figure 29:
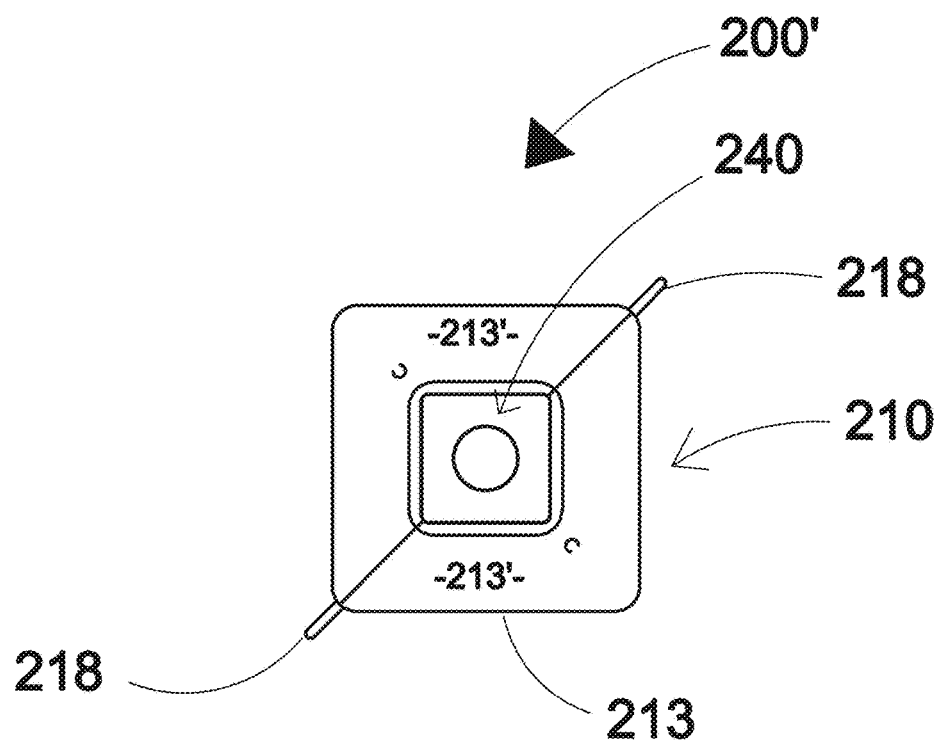
FIG. 29 is a top plan view of the illustrative embodiment of the multi-directional signal assembly of FIG. 26.
Figure 30:
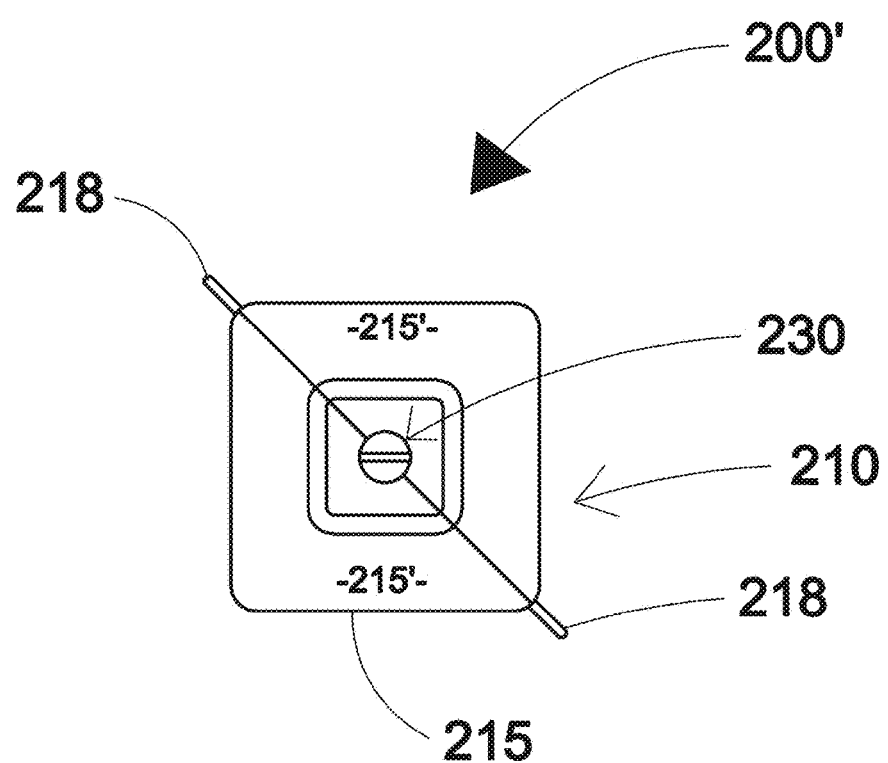
FIG. 30 is a bottom plan view of the illustrative embodiment of the multi-directional signal assembly of FIG. 26.

More in particular, in at least one embodiment, when the illumination member housing 244 is disposed in an operative position relative to the illumination assembly mount 213", magnetic forces cause the housing interconnect 242 to align with the float interconnect 242', thereby releasably securing the illumination assembly 240 in the illumination assembly mount 213". Further, when the illumination unit housing 244 is disposed in an operative position in the illumination assembly mount 213", and the housing alignment indicia 243 and the float alignment indicia 243' are proximate one another, such as in the same corner as illustrated in FIG. 28, the housing circuit contacts 248 and float circuit contacts 248' are disposed in an operative alignment with one another, thereby completing the illumination circuit between the illumination member 245 and the power supply 241 and actuating at least one illumination member 246, such as, by way of example, a light emitting diode. Alternatively, when the illumination unit housing 244 is disposed in an operative position in the illumination assembly mount 213", and the housing alignment indicia 243 and the float alignment indicia 243' are disposed apart from one another, such as in opposite corners, the housing circuit contacts 248 and float circuit contacts 248' are not in an operative alignment with one another, the illumination circuit is broken, and the illumination unit 245 will not be actuated. Of course, it is understood to be within the scope and intent of the present invention to provide other mechanisms to actuate the illumination system 140 including, by way of example only, a manual switch mechanism actuated by a user, such as switch assembly 149 disclosed above, a timer switch mechanism, or a sensor actuation mechanism, such as was described in detail above.

As indicated above, in at least one embodiment the illumination assembly 240 further comprises a controller (not shown) which is programmed to actuate one or more illumination members 246 of the illumination unit 245. As one example, and as disclosed above, a controller is programmed to actuate one or more illumination members 246 upon detection of at least one environmental parameter. For example, in one embodiment, a flashing or strobe light emitting diode 246 is mounted in the illumination unit housing 244, and the controller is programmed to actuate the strobe light emitting diode 246 upon detection of a predetermined level of fog or available ambient light proximate the multi-directional signal assembly 200, via one or more sensor, as described above. In another embodiment, an accelerometer may be employed to detect wave motion, and to actuate or flash one or more illumination members 246 upon detection a crest of a wave, once again, to increase visibility of the multi-directional signal assembly 200 while deployed in a body of water. One or more sensors may be combined with a digital display to indicate one or more environmental parameters including, but not limited to, water temperature, air temperature, wave height, battery capacity, diver depth, depth temperature, etc. A digital display may be mounted directly to the float assembly 210 and/or attached at one end of diver/snorkeler tether to provide an immediate indication of the parameter(s) to the user.

Figure 17:
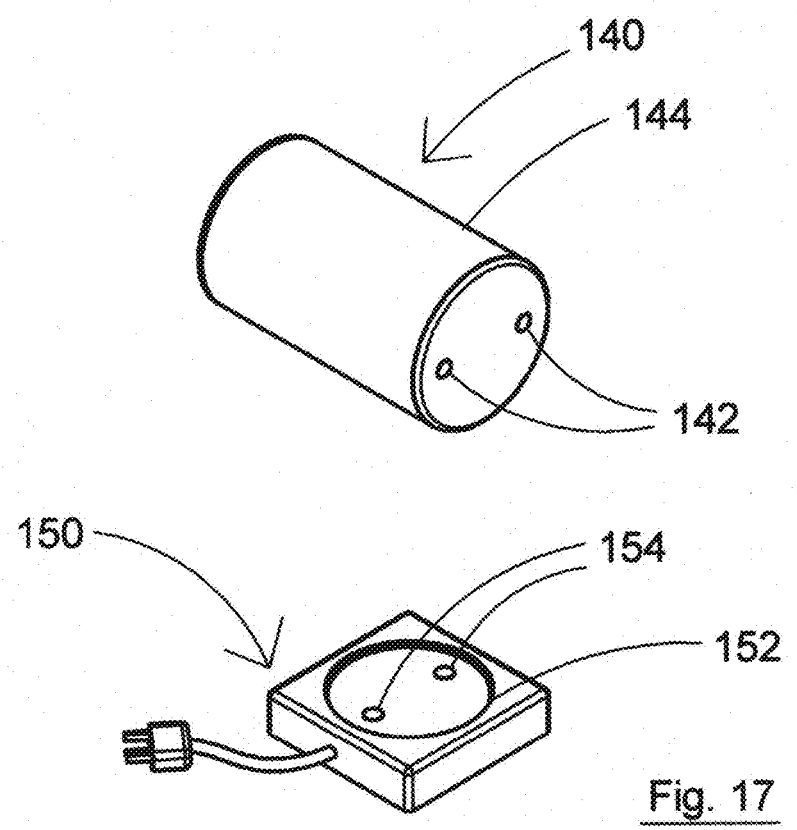
FIG. 17 is a perspective view of one illustrative embodiment of an illumination assembly and a charger assembly in accordance with one embodiment of the present invention.

The power supply 241 of the illumination assembly 240 in accordance with at least one embodiment of the present invention may be recharged by way of an induction charger. In at least one embodiment, a charger assembly 150 similar to that shown in FIG. 17 is utilized. More in particular, the charger assembly 150 includes a charger base 152 comprising a charging surface and a pair of charger contacts 154 arranged on the charger base 154 which correspond to the housing circuit contacts 242 on the bottom of the illuminations unit housing 244. Alignment of the housing circuit contacts 242 with the charger contacts 154 activates the charger assembly 150, and the power supply 241 is recharged via an induction charging coil 247, such as is illustrated in FIG. 25, disposed in electrical communication therewith. Thus, to recharge the power supply 241, the illumination assembly 240 is simply placed on the charger base 152, the charger base 152 is plugged into an appropriately rated electrical power outlet, and the power supply 241 is recharged via induction charging coil 247 in proximity to the charging surface of charger base 152. As will be appreciated from the foregoing, the charging base 152 of the charger assembly 150 can be configured to accept the substantially square configuration of the illumination assembly 240 as illustrated throughout the figures, without altering the operative components of either.

FIGS. 26 through 31 present one further alternate embodiment of a multi-directional signal assembly 200' in accordance with the present invention. As before, the multi-directional signal assembly 200' in accordance with the present disclosure comprises a float assembly 210 having a float body 211 comprising a buoyant construction. As is readily apparent from the illustrative embodiment of FIGS. 26 through 28, a float assembly 210, and more specifically, a float body 211 in accordance with the present invention comprises a substantially cubic configuration. More in particular, each of the plurality of display surfaces 221 of the embodiment of FIG. 26 through 28 comprises a substantially square geometry.

Figure 31:
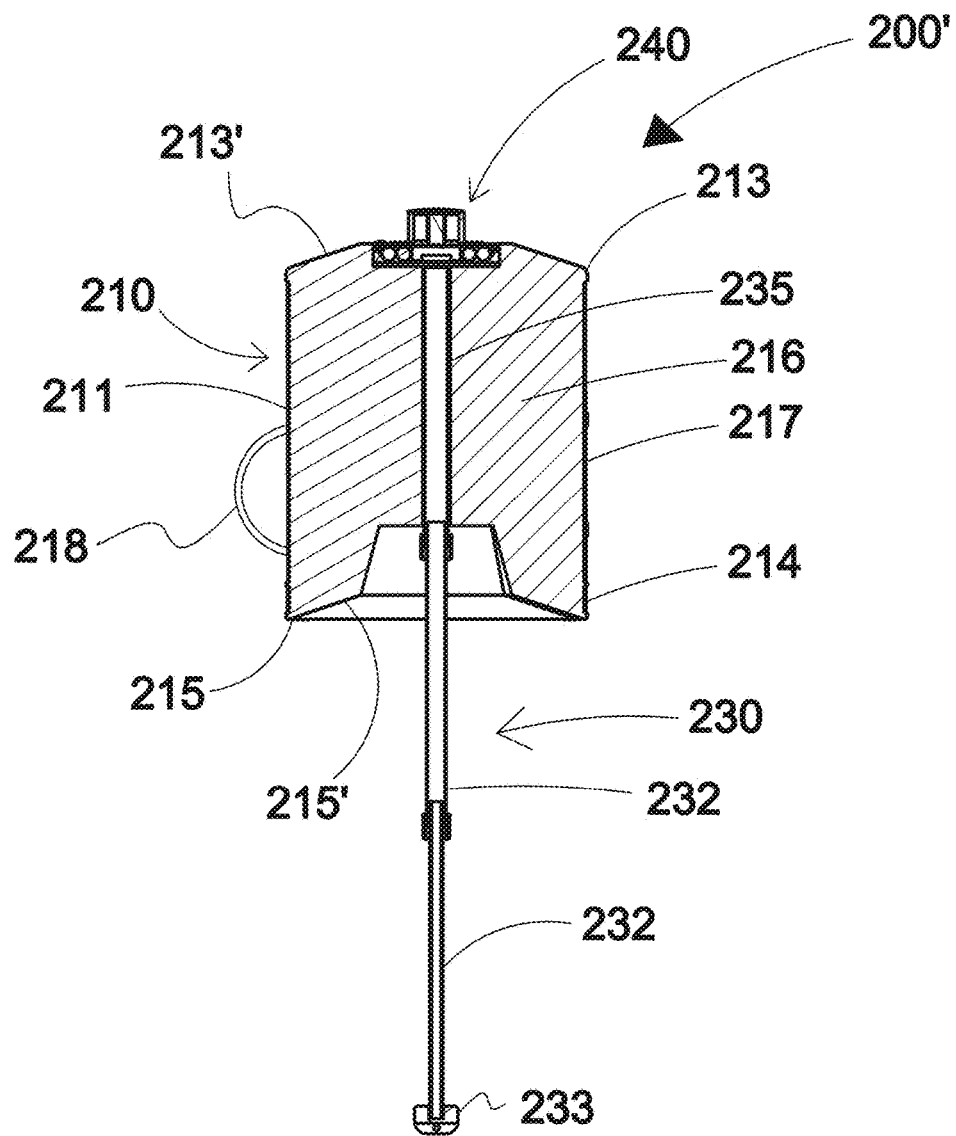
FIG. 31 is a cross-sectional view of the alternate illustrative embodiment of a multi-directional signal assembly of FIG. 26 showing a counterweight mechanism in a deployed orientation.

As before, in at least one embodiment, the float body 211 includes an inner core 216 formed of a lightweight material of construction and an outer coating 217 to impart structural integrity to the inner core 216, similar to an exoskeleton, as may be seen in FIG. 31. Once again, in at least one embodiment, the inner core 216 comprises a polystyrene foam construction, thereby being inherently buoyant in water. In at least one further embodiment, the inner core 216 comprises a polystyrene foam having a density in a range of about 1.5 pounds per cubic foot to about 2.5 pounds per cubic foot.

Additionally, and as previously stated, in at least one embodiment the float assembly 210, and more in particular, the float body 211, comprises an outer coating 217, once again, as shown in FIG. 31. In at least one embodiment, the outer coating 217 comprises a layer of polyurea with a top coating aliphatic hydrocarbon, 100% solids, which are sprayed evenly over the inner core 216. In one further embodiment, the outer coating 217 is uniformly applied to a thickness in the range of about 0.03 inches to about 0.05 inches. In at least one further embodiment, the outer coating 217 comprises a Shore A harness in a range of about 88 to 92, and a tensile strength of about 2,200 pounds per square inch. In this configuration, the float assembly 210 comprises a buoyancy of about one hundred pounds force.

Figure 26:
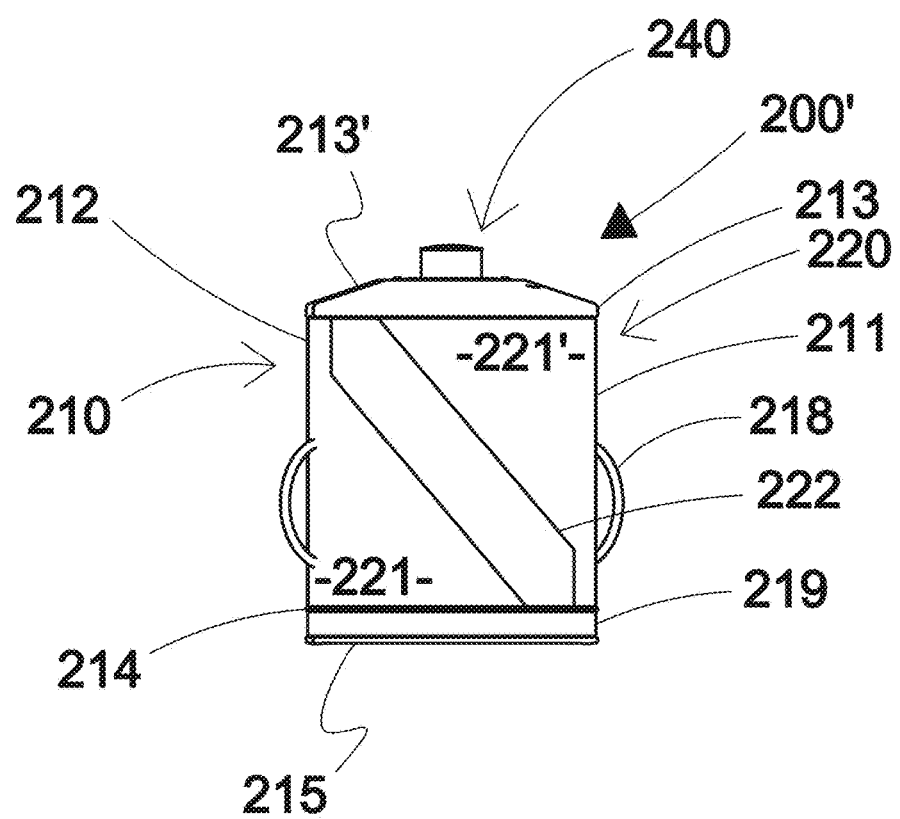
FIG. 26 is an elevation of a further alternate illustrative embodiment of a multi-directional signal assembly in accordance with the present invention.

Returning to the illustrative embodiment of a multi-directional signal assembly 200' of FIG. 26, the float body 211 comprises an upper section 212 and a lower section 214. As shown in FIGS. 26 through 28, and as noted above, the float body 211 comprises a substantially cubic configuration, and both the upper section 212 and the lower section 214 of the float body 211 in the embodiment of FIGS. 26 through 28 have substantially similar outer peripheries or footprints, similar to the embodiments of FIGS. 1 through 9 and the embodiments of 18 through 24.

FIG. 27 is illustrative of one embodiment of a float assembly 210 deployed on a surface of a body of water, wherein the float body 211 is disposed in an operative orientation, which is at least partially defined by the upper section 212 disposed above the surface of the body of water such that a display surface 221, as is discussed in greater detail below, is also disposed above the surface of the body of water.

FIGS. 26 through 31 are further illustrative of one embodiment of a multi-directional signal assembly 200' comprising at least one handle member 218 attached to a float assembly 210, and more in particular, to the float body 211. As will be appreciated from FIG. 27, the plurality of handle members 218 serve as hand holds for a swimmer or diver while in the water in order to rest, adjust equipment, etc. Each of the handle members 218 may be constructed from any of a variety of materials including metal or metal alloy tubing, or an engineered plastic tubing, such as, by way of example only, acrylonitrile butadiene styrene ("ABS"), in order to increase buoyancy of the overall multi-directional signal assembly 200' in accordance with the present invention. Each handle member 218 must comprise sufficient structural integrity to support the weight of the float assembly 210 while being lifted and moved about out of the water, and to support the weight of a swimmer or diver holding onto a handle member 218 while he or she is in the water.

As in the embodiments of FIGS. 18 though 20, an accessory band 219 is affixed around the lower section 214 of the float body 211 as shown in the embodiments of FIGS. 26 and 28. One or more utility hooks, rings, clips, etc., are attached to the accessory band 219 to allow a user a place to attach one or more items to the float body 211 while he or she is diving, swimming, spear fishing, etc. In one further embodiment, one or more utility hooks, rings, clips, etc., are mounted directly to a portion of the float body 211.

FIG. 27 also illustrates a counterweight assembly 230 including a weight 233 affixed to the bottom of float assembly 210 and having an interconnection eyelet 234 through a portion thereof. As before, the interconnection eyelet 234 allows the multi-directional signal assembly 200' to be attached to a tie line of a water craft or to a tether attached to a user. Alternatively, a weight or anchor line is attached to the interconnection eyelet 234, so as to maintain the multi-directional signal assembly 200' in a particular location when deployed in a body of water. In FIG. 26, the counterweight assembly 230 is not shown as it is disposed in a retracted orientation.

Looking further to FIG. 31, in at least one embodiment, the counterweight assembly 230 includes a deployment member housing 235 which is mounted in the float assembly 210. More in particular, deployment member housing 235 is dimensioned to receive a substantial portion of the weight deployment member(s) 232 therein while the weight deployment member(s) 232 are disposed in a retracted orientation. Thus, the counterweight assembly 230, and more in particular, the weight deployment members 232 are positionable between a retracted orientation, as shown in FIG. 26, and a deployed orientation, as shown by way of example in FIGS. 27, 28, and 31. In at least one embodiment, a weight deployment member 232 includes a stop member (not shown) attached to one end so as to prevent the weight deployment member 232 from being completely removed from the deployment member housing 235.

Looking further to FIG. 27, which again is illustrative of a counterweight assembly 230 in a deployed orientation, a plurality of weight deployment members 232 are fully extended downwardly from the float body 211 thereby positioning the weight 233 a distance below the float body 211, the distance being greater than the overall height of the float body 211 itself. As will be appreciated, in the deployed orientation, the counterweight assembly 230 serves to bias the float assembly 200' into an operative orientation relative to a surface of a body of water, such as is illustrated by way of example in FIG. 27.

FIG. 26 further illustrates a top surface 213 of a float body 211 and a bottom surface 215. As shown in FIGS. 26 through 28, the top surface 213 of the float body 211 comprises a top interface 213'. In at least one embodiment the top interface 213' comprises a tapered surface extending upwardly from the upper section 212 of the flat body 211. As shown in the illustrative embodiment of FIG. 26, the top interface 213' extends upwardly from the upper section 212 of the float body 211 to the periphery of an illumination assembly 240, discussed in further detail below. Looking further to FIG. 31, the bottom surface 215 of the float body 211 further comprises a bottom interface 215'. More in particular, the bottom interface 215' extends upwardly and inwardly from the lower section 214 of the float body 211 towards counterweight assembly 230.

Figure 32:
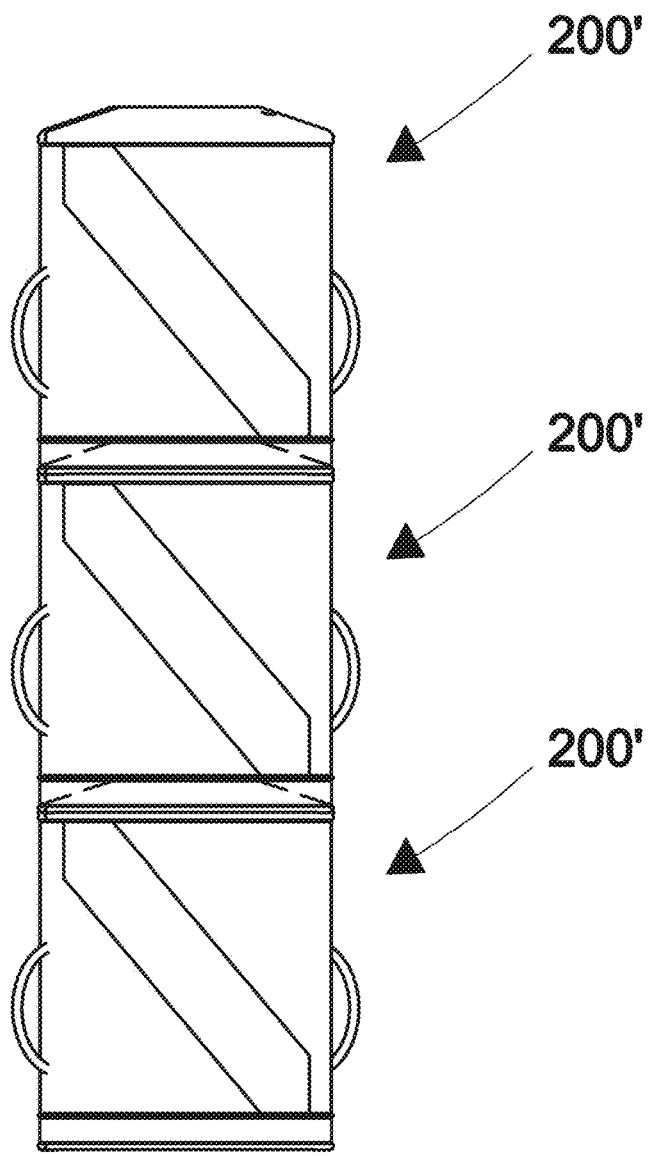
FIG. 32 is illustrative of a plurality of multi-directional signal assemblies in accordance with the present invention stacked on top of one another in a supported and interlocked relation.

As also illustrated in FIG. 31, the top interface 213' and the bottom interface 215' comprise complimentary interlocking surfaces. As such, and once again as may be seen from FIG. 31, upon disposition of the deployment assembly 230 into a retracted orientation and removal of the light assembly 240, the bottom surface 215 of one multi-directional signal assembly 200' in accordance with the present invention is positionable into a supported and interlocked relation onto the top surface 213 of another multi-directional signal assembly 200'. In this manner, a plurality of multi-directional signal assemblies 200' in accordance with the present invention can be stacked on top of another in a supported and interlocked relation for storage and/or during transport as is shown in FIG. 32.

As in previously disclosed embodiments, the lower section 214 of the float body 211 may comprise a contoured lower edge around its lower periphery to facilitate movement of the float assembly 210 along and across the surface of a body of water, such as while in tow by a swimmer, diver, etc.

With reference once again to the illustrative embodiments of FIGS. 26 though 28, a multi-directional signal assembly 200' in accordance with the present invention comprises a signal display assembly 220 having a plurality of display surfaces 221, wherein at least one of said plurality of display surfaces 221 is visible from any point along a circle circumscribed around a vertical axis through a float assembly 210 and planar with the plurality of display surfaces 221. Stated otherwise, at least one of the plurality of display surfaces 221 of the signal display assembly 220 of the present multi-directional signal assembly 200', and more importantly, at least one of the signal indicia 222 displayed thereon, is visible from any direction which is generally perpendicular to the display surfaces 221, as is apparent and as shown best in the perspective view of the illustrative embodiment of FIG. 28.

FIG. 26 is illustrative of one further alternate embodiment of a multi-directional signal assembly 200' in accordance with the present invention, and more in particular, FIG. 26 presents an elevation of one alternate embodiment of a multi-directional signal assembly 200' comprising a signal assembly 220 affixed to an upper section 212 of a float assembly 210, and more in particular to an upper section 212 of a float body 211. As may be seen from the illustrative embodiment of FIG. 26, the signal display assembly 220 comprises a display surface 221 having a signal indicia 222 affixed to an upper portion 221' thereof. Display surface 221, as shown in the illustrative embodiments of FIGS. 26 and 27 comprises a substantially square configuration, and wherein the display surface 221 is aligned with a vertical axis through the center of the float assembly 210.

Signal indicia 222, in accordance with at least one embodiment of the present invention, comprises a Unites States dive flag, which is a widely known and readily recognizable signal indicating that a diver or snorkeler is in the water in the vicinity of the dive flag. The U.S. dive flag is crucial to mark the location of divers or snorkelers in the water, so that boats know to steer clear of the area for obvious safety reasons. The U.S. dive flag consists of a bright red or orange square having a broad white band running diagonally there through from the upper left corner to the lower right corner, such as is shown, by way of example, in the illustrative embodiments of FIGS. 26 through 28.

In one embodiment, the signal indicia 222 comprises a U.S. Coast Guard ("USCG") approved reflective tape. As one example, an orange 3M™ Marine Grade USCG High Intensity Reflective Adhesive Tape, Product No. 3M USCGFP-34, manufactured by 3M Company, St. Paul, Minn., is utilized to form the square portion of the U.S. dive flag on an upper portion 221' of a corresponding display surface 221. In a further embodiment, a white 3M™ Marine Grade USCG High Intensity Reflective Adhesive Tape, Product No. 3M USCGFP-30, once again, manufactured by 3M Company, St. Paul, Minn., is utilized to form the diagonal band through the orange square of the U.S. dive flag. In at least one embodiment, signal indicia 222 comprises a U.S. dive flag having a substantially square configuration and being approximately twelve inches by twelve inches.

FIG. 27 presents an elevation of another side of the illustrative embodiment of FIG. 26, showing another of the plurality of display surfaces 221 of the signal display assembly 220. FIG. 27 is further illustrative of another of the plurality of signal indicia 222 affixed to an upper portion 221' of corresponding display surface 221.

FIG. 28 is a perspective view of the alternate embodiment of a multi-directional signal assembly 200' in accordance with the present invention. As clearly shown in the illustrative embodiment of FIG. 28, the signal display assembly 220 comprises a plurality of display surfaces 221 each having at least one of a plurality of signal indicia 222 affixed thereto. Once again, each of the plurality of signal indicia 222 are affixed to an upper portion 221' of a corresponding one of the plurality of display surfaces 221. As will be appreciated from the illustrative embodiment of FIG. 28, and as stated above, at least one of the plurality of signal indicia 222 affixed to an upper portion 221' of one of the plurality of display surfaces 221 of the present multi-directional signal assembly 200' will be visible from any direction in a field of view which is generally perpendicular to the display surfaces 221.

In at least one embodiment of a multi-directional signal assembly 200' in accordance with the present invention, an operative orientation is at least partially defined by each of a plurality of display surfaces 221 disposed in a substantially upright orientation relative to a surface of a body of water. The operative orientation may be further defined by maintaining the upper portion 221' of each of the plurality of display surfaces 221 substantially above the surface of the body of water, such that the display indicia 222 affixed thereon is readily visible, such as is illustrated, by way of example, in FIG. 27.

Looking again to the illustrative embodiments in FIGS. 26 through 31, a multi-directional signal assembly 200' in accordance with the present invention comprises an illumination assembly 240 as described and disclosed above with reference to FIGS. 18 through 25A. As before, the illumination assembly 240 is releasably secured to the float assembly 210 of the multi-directional signal assembly 200'.

Figure 33:
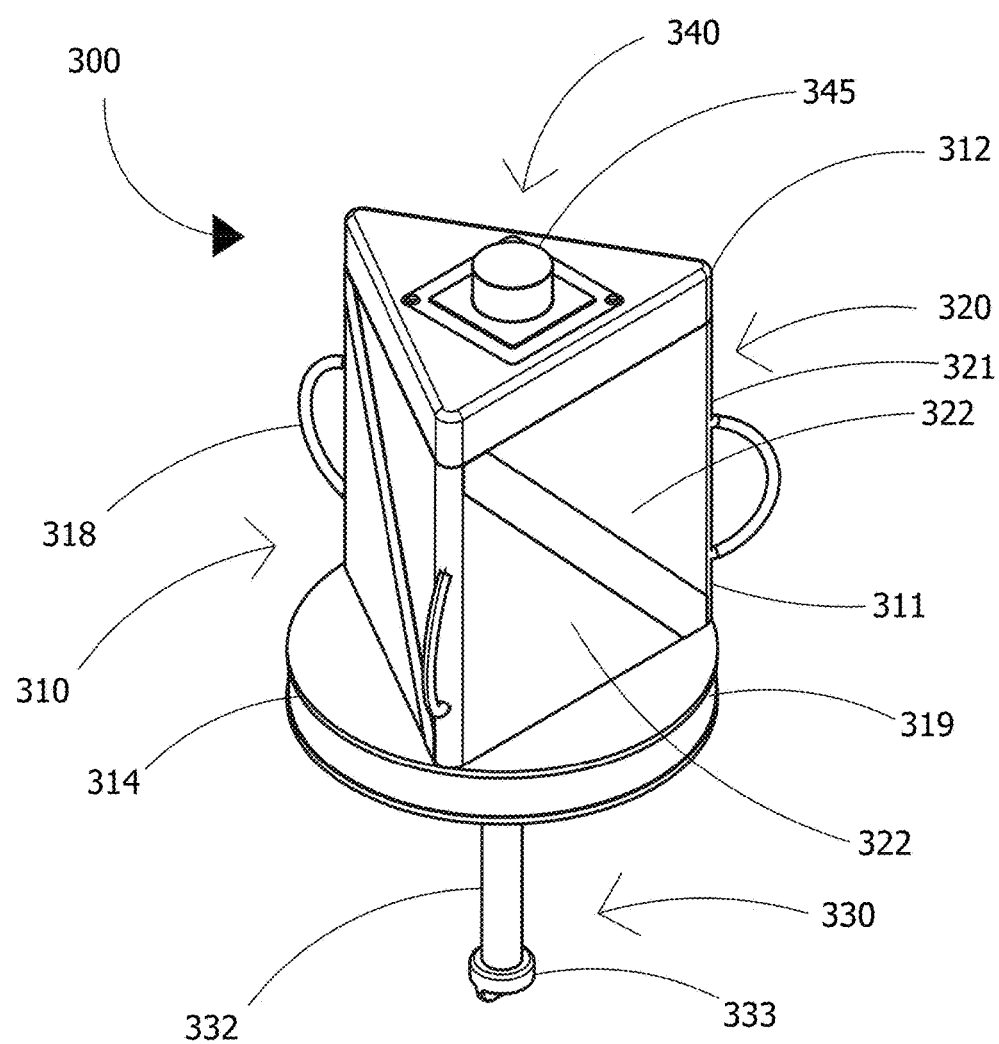
FIG. 33 is a perspective view of yet another alternate illustrative embodiment of a multi-directional signal assembly in accordance with the present invention.
Figure 34:
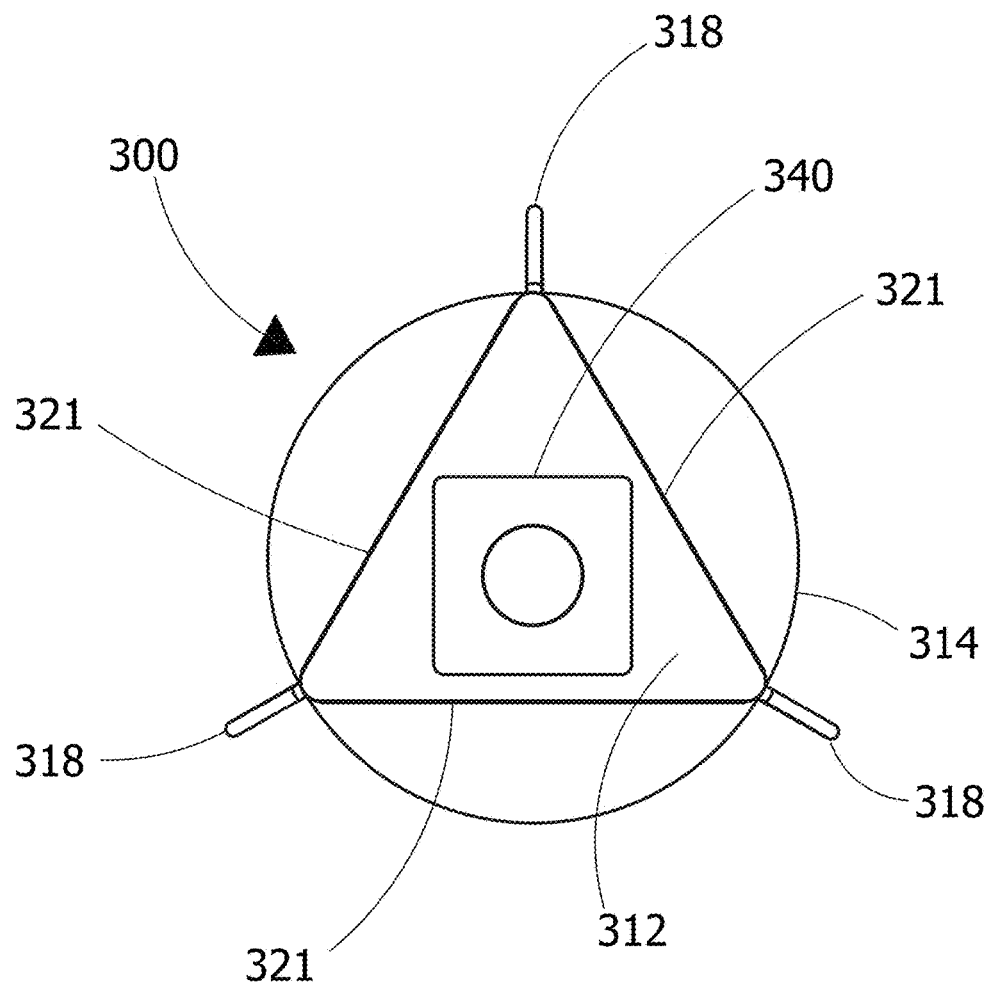
FIG. 34 is a top plan view of the alternate illustrative embodiment of the multi-directional signal assembly of FIG. 33.

FIGS. 33 and 34 present yet another alternate embodiment of a multi-directional signal assembly 300 in accordance with the present invention. As before, the multi-directional signal assembly 300 comprises a float assembly 310 having a float body 311 comprising a buoyant construction. As is readily apparent from the illustrative embodiment of FIG. 33, a float assembly 310, and more specifically, a float body 311 in accordance with the present invention comprises a three-sided configuration. Correspondingly, a signal display assembly 320 of the present multi-directional signal assembly 300 comprises three display surfaces 321 disposed on the float body 311, wherein the three display surfaces 321 are disposed relative to one another so as to form a triangular prism configuration, as is shown in FIGS. 33 and 34. In at least one embodiment, each of the three display surfaces comprises a substantially square geometry.

In at least one embodiment, and as disclosed in detail above with respect to other embodiments of the present invention, the float body 311 includes an inner core (not shown) formed of a lightweight material of construction and an outer coating (not shown) to impart structural integrity to the inner core, similar to an exoskeleton. In at least one embodiment, the inner core comprises a polystyrene foam construction, thereby being inherently buoyant in water, and in at least one further embodiment, the inner core comprises a polystyrene foam having a density in a range of about 1.5 pounds per cubic foot to about 2.5 pounds per cubic foot.

Further, and once again, as disclosed above with respect to other embodiments of the present invention, the float body 311 has an outer coating which in at least one embodiment comprises a layer of polyurea with a top coating aliphatic hydrocarbon, 100% solids, which are sprayed evenly over the inner core. In one further embodiment, the outer coating is uniformly applied to a thickness in the range of about 0.03 inches to about 0.05 inches. In at least one further embodiment, the outer coating comprises a Shore A harness in a range of about 88 to 92, and a tensile strength of about 2,200 pounds per square inch.

Returning to the illustrative embodiment of a multi-directional signal assembly 300 of FIG. 33, the float body 311 comprises an upper section 312 and a lower section 314. As shown in FIGS. 33 and 34, and as noted above, upper section 312 comprises a substantially triangular prism configuration, however, lower section 314 in the embodiment of FIGS. 33 and 34 comprises a substantially cylindrical periphery or footprint. Of course, it will be appreciated by those of skill in the art that the upper section and the lower section a float assembly in accordance with the present invention can comprise substantially similar triangular or cylindrical footprints or peripheries.

FIG. 33 is further illustrative of an embodiment of a multi-directional signal assembly 300 in accordance with the present invention comprising a plurality of handle members 318 attached to a float assembly 310, and more in particular, to the float body 311. As before, the plurality of handle members 318 serve as hand holds for a swimmer or diver while in the water in order to rest, adjust equipment, etc. As before, each of the handle members 318 may be constructed from any of a variety of materials including metal or metal alloy tubing, or an engineered plastic tubing, such as, by way of example only, acrylonitrile butadiene styrene ("ABS"), in order to increase buoyancy of the overall multi-directional signal assembly 300 in accordance with the present invention. Also as before, each handle member 318 must comprise sufficient structural integrity to support the weight of the float assembly 310 while being lifted and moved about out of the water, and to support the weight of a swimmer or diver holding onto a handle member 318 while he or she is in the water.

As shown in FIG. 33, the lower section 314 of the float body 311 comprises an accessory band 319 disposed therearound. Once again, one or more utility hooks, rings, clips, etc., are attached to the accessory band 319 to allow a user a place to attach one or more items to the float body 311 while he or she is diving, swimming, spear fishing, etc. In one further embodiment, one or more utility hooks, rings, clips, etc., are mounted directly to a portion of the float body 311.

FIG. 33 also illustrates a counterweight assembly 330 including a weight 333 affixed to the bottom of float assembly 310 and having an interconnection eyelet (not shown) through a portion thereof. As before, the interconnection eyelet allows the multi-directional signal assembly 300 to be attached to a tie line of a water craft or to a tether attached to a user. Alternatively, a weight or anchor line is attached to the interconnection eyelet, so as to maintain the multi-directional signal assembly 300 in a particular location when deployed in a body of water. FIG. 33 is illustrative of a counterweight assembly 330 in a deployed orientation having a weight deployment member 332 extending downwardly from the float body 311 thereby positioning the weight 333 a distance below the float body 311. As will be appreciated, in the deployed orientation, the counterweight assembly 330 serves to bias the float assembly 300 into an operative orientation relative to a surface of a body of water.

In at least one embodiment of a multi-directional signal assembly 300 in accordance with the present invention, an operative orientation is at least partially defined by each of a plurality of display surfaces 321 disposed in a substantially upright orientation relative to a surface of a body of water. The operative orientation may be further defined by maintaining each of the plurality of display surfaces 321 substantially above the surface of the body of water, such that the display indicia 322 affixed thereon is readily visible, such as is illustrated, by way of example, in FIG. 33.

With reference once again to the illustrative embodiments of FIGS. 33 and 34, a multi-directional signal assembly 300 in accordance with the present invention comprises a signal display assembly 320 having a plurality of display surfaces 321, wherein at least one of said plurality of display surfaces 321 is visible from any point along a circle circumscribed around a vertical axis through a float assembly 310 and planar with the plurality of display surfaces 321. Stated otherwise, at least one of the plurality of display surfaces 321 of the signal display assembly 320 of the present multi-directional signal assembly 300, and more importantly, at least one of the signal indicia 322 displayed thereon, is visible from any direction which is generally perpendicular to the display surfaces 321, as is apparent and as shown in the illustrative embodiments of FIGS. 33 and 34.

Signal indicia 322, in accordance with at least one embodiment of the present invention, comprises a Unites States dive flag, which is a widely known and readily recognizable signal indicating that a diver or snorkeler is in the water in the vicinity of the dive flag. The U.S. dive flag is crucial to mark the location of divers or snorkelers in the water, so that boats know to steer clear of the area for obvious safety reasons. The U.S. dive flag consists of a bright red or orange square having a broad white band running diagonally there through from the upper left corner to the lower right corner, such as is shown, by way of example, in the illustrative embodiment of FIG. 33.

In one embodiment, the signal indicia 322 comprises a U.S. Coast Guard ("USCG") approved reflective tape. As one example, an orange 3M™ Marine Grade USCG High Intensity Reflective Adhesive Tape, Product No. 3M USCGFP-34, manufactured by 3M Company, St. Paul, Minn., is utilized to form the square portion of the U.S. dive flag on a corresponding display surface 321. In a further embodiment, a white 3M™ Marine Grade USCG High Intensity Reflective Adhesive Tape, Product No. 3M USCGFP-30, once again, manufactured by 3M Company, St. Paul, Minn., is utilized to form the diagonal band through the orange square of the U.S. dive flag. In at least one embodiment, signal indicia 322 comprises a U.S. dive flag having a substantially square configuration and being approximately twelve inches by twelve inches.

FIG. 33 is a perspective view of the alternate embodiment of a multi-directional signal assembly 300 in accordance with the present invention. As clearly shown in the illustrative embodiment of FIG. 33, the signal display assembly 320 comprises a plurality of display surfaces 321 each having at least one of a plurality of signal indicia 32 affixed thereto. Once again, each of the plurality of signal indicia 322 are affixed to a corresponding one of the plurality of display surfaces 321. As will be appreciated from the illustrative embodiment of FIG. 33, and as stated above, at least one of the plurality of signal indicia 322 affixed to one of the plurality of display surfaces 321 of the present multi-directional signal assembly 300 will be visible from any direction in a field of view which is generally perpendicular to the display surfaces 321.

Looking again to the illustrative embodiments in FIGS. 33 and 34, a multi-directional signal assembly 300 in accordance with the present invention comprises an illumination assembly 340 as described and disclosed above with reference to FIGS. 18 through 25A. As before, the illumination assembly 340 is releasably secured to the float assembly 310 of the multi-directional signal assembly 300. Also as before, the illumination assembly 340 comprises an illumination unit 345 which may be automatically or manually actuated so as to further enhance the visibility of the multi-directional signal assembly 300, and much more importantly, to alert boaters to the presence of swimmers, snorkelers or divers in the vicinity thereof, in accordance with the present invention.

Figure 35:
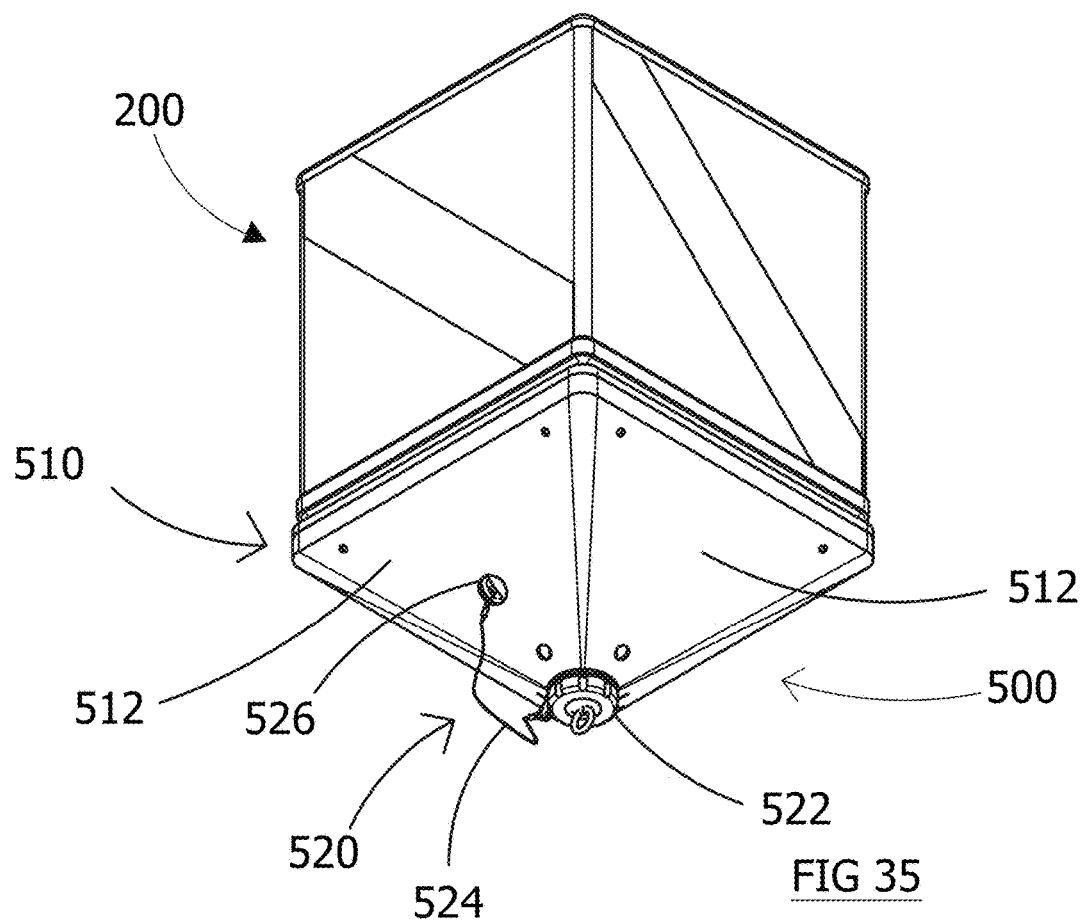
FIG. 35 is a perspective view of one illustrative embodiment of a multi-directional signal assembly having a resistance deflector assembly mounted thereto in accordance with the present invention.
Figure 36:
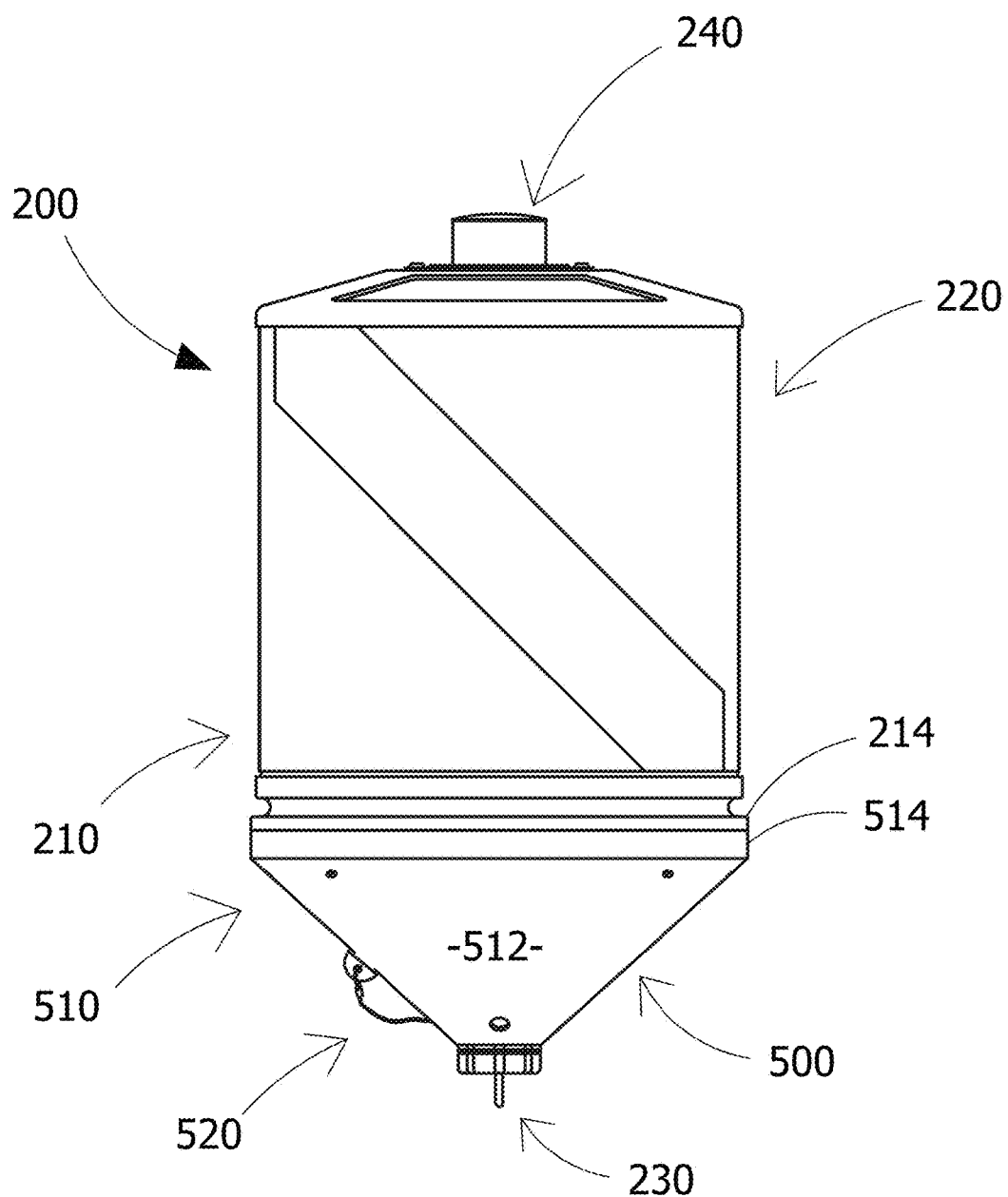
FIG. 36 is an elevation of the embodiment of FIG. 35 of the multi-directional signal assembly having the resistance deflector assembly mounted thereto.
Figure 37:
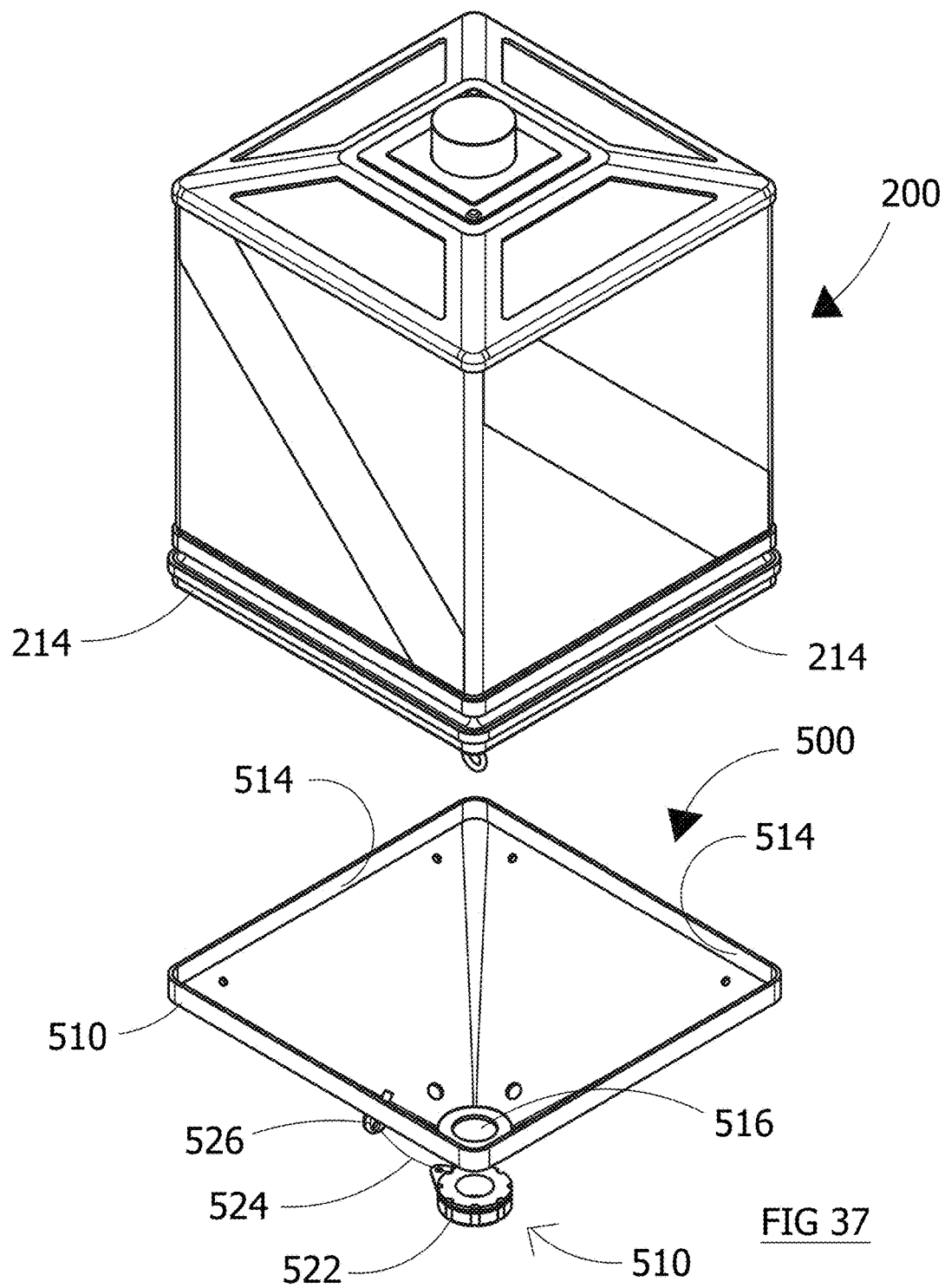
FIG. 37 is a partially exploded perspective view of an illustrative embodiment of a multi-directional signal assembly and a resistance deflector assembly in accordance with the present invention.

FIGS. 35 through 38 present one illustrative embodiment of a multi-directional signal assembly 200, such as disclosed above, in combination with a resistance deflector assembly 500. As shown in FIG. 35 the resistance deflector assembly 500 is operatively mounted to lower section 214 of float assembly 210. More in particular, the resistance deflector assembly 500 comprises a deflector body 510 having a mounting flange 514 which is positioned around lower section 214 of the float assembly 210, as shown best in FIGS. 36 through 38. FIG. 37 presents a partially exploded view of a multi-directional signal assembly 200 and a resistance deflector assembly 500. As may be seen from FIG. 37, the deflector body 510 comprises a mounting flange 514 which extends substantially around an upper portion thereof. Of course, it would be appreciated, that a mounting flange 514 does not extend entirely around the periphery of the upper portion of the deflector body 510, but rather, may comprise one or more tabs extending upwardly in order to facilitate mounting of deflector body 510 to float assembly 210 of a multi-directional signal assembly 200. Looking next to FIG. 38, a cross-sectional view of a multi-directional signal assembly 200 having a resistance deflector 500, and more in particular, a deflector body 510, mounted thereto. As can be seen from FIG. 38, the mounting flange 514 of deflector body 510 overlies a portion of the lower section 214 of the multi-directional signal assembly 200.

Figure 38:
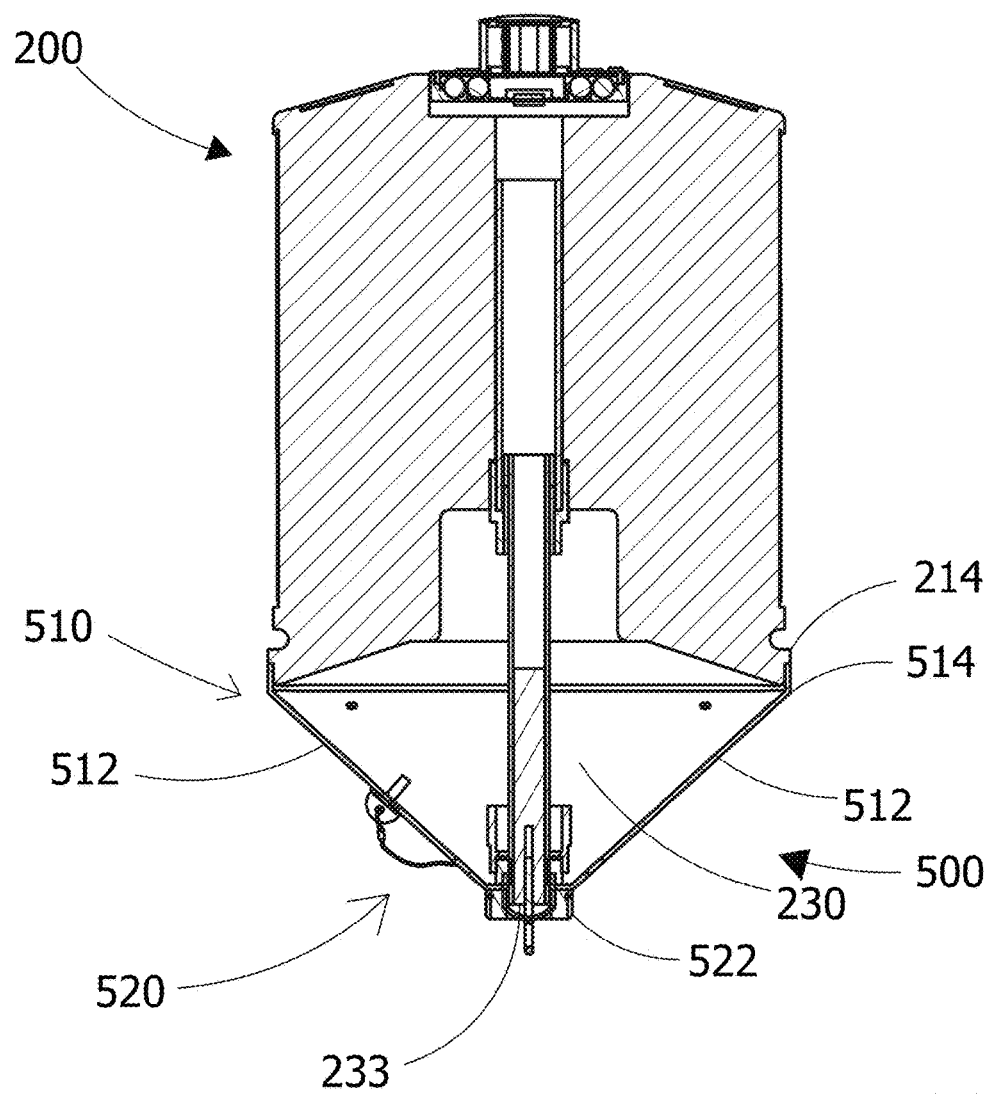
FIG. 38 is cross-sectional view of the embodiment of FIG. 36 of the multi-directional signal assembly having the resistance deflector assembly mounted thereto.

FIGS. 36 and 38 further illustrate a deflector body 510 comprising a plurality of deflection surfaces 512. The figures also illustrate that each deflection surface 512 extends downwardly and inwardly relative to the lower section 214 of float assembly 210. As such, when a float assembly 210 of a multi-directional signal assembly 200 in accordance with the present invention is pulled, towed, or otherwise moved across a body of water, one or more of deflection surfaces 512 will serve to smoothly transition and divert the flow of water under and around the deflector body 510, thereby reducing the resistance forces which are encountered as the multi-directional signal assembly 200 is moved across the surface of a body of water.

Table 1 presented in FIG. 39 is illustrative of towing resistance testing results which were obtained while towing a "large" multi-directional signal assembly 200 and a "small" multi-directional signal assembly 200', both as previously disclosed and shown in the figures, as well as a traditional diver down flag mounted to a small spherical buoy. The results presented in Table 1 are representative of testing conducted in relatively calm seas at slow, medium and fast towing speeds by a swimmer or diver, where a slow speed is in a range of approximately 0.75 feet per second, medium speed is in a range of approximately 1.5 fee per second, and fast speed is in the range of approximately 3.0 feet per second. In addition, the surface tests were conducted by a swimmer swimming along the surface and towing each of the units, individually, at each speed, while the submerged tests were performed by a diver towing each unit, again, individually, at each speed while the diver was at a depth of about fifteen feet below the surface of the water.

As may be seen from the results in Table 1, with the exception of the submerged towing resistance of the "small" multi-directional signal assembly 200' and the surface towing resistance of both the "large" multi-directional signal assembly 200 and "small" multi-directional signal assembly 200', the towing resistance, as measured in newtons, was reduced approximately fifty percent or more for both "large" and "small" multi-directional signal assemblies 200, 200', while a resistance deflector assembly 500 was operatively mounted thereto.

Thus, it is apparent form the result in Table 1 that mounting a resistance deflector assembly 500 to a multi-directional signal assembly in accordance with the present invention, such as is shown by way of example only at 200 and 200', can substantially reduce the restive forces against which a snorkeler or diver must overcome in order to move freely through the water while towing the multi-directional signal assembly 200, 200'.

Turning once again to FIG. 37, the deflector body 510 further comprises a counterweight seat 516 which includes an aperture disposed through the lower most portion of deflector body 510. The counterweight seat 516 is dimensioned to receive at least a portion of the counterweight assembly, such as 230, therein, while a deflector body 510 is mounted to a lower section 214 of a float body 210 of a multi-directional signal assembly 200, and counterweight assembly 230 is disposed in a deployed orientation, such as is shown best in the cross-section view of FIG. 38.

As further shown in FIGS. 36 and 38, in at least one embodiment, a resistance deflector assembly 500 further comprises a deflector mounting assembly 520. More in particular, deflector mounting assembly 520 comprises a retention member 522 which is structured to operatively interconnect to at least a portion of a counterweight assembly 230 disposed in counterweight seat 516 in order to maintain deflector body 510 of the resistance deflector assembly 500 operatively mounted to lower section 214 of float assembly 310. As shown in the illustrative embodiment of FIG. 38, retention member 522 comprises a threaded interconnection which operatively interconnects to a portion of the weight 233 of counterweight assembly 230. Of course, it will be appreciated by those of skill in the art that other types of removable interconnects may be utilized to interconnect retention member 532 to a portion of a counterweight assembly 230, such as, but not limited to, quick-connect fitting, clamps, pin and slot, etc. A retention member tether 524 is provided in at least one embodiment to attach retention member 522 to a tether mount 526 attached to a portion of a deflector body 510, so as to prevent the loss of retention member 522 while the deflector body 510 is removed from the float assembly 210.

Figure 61:
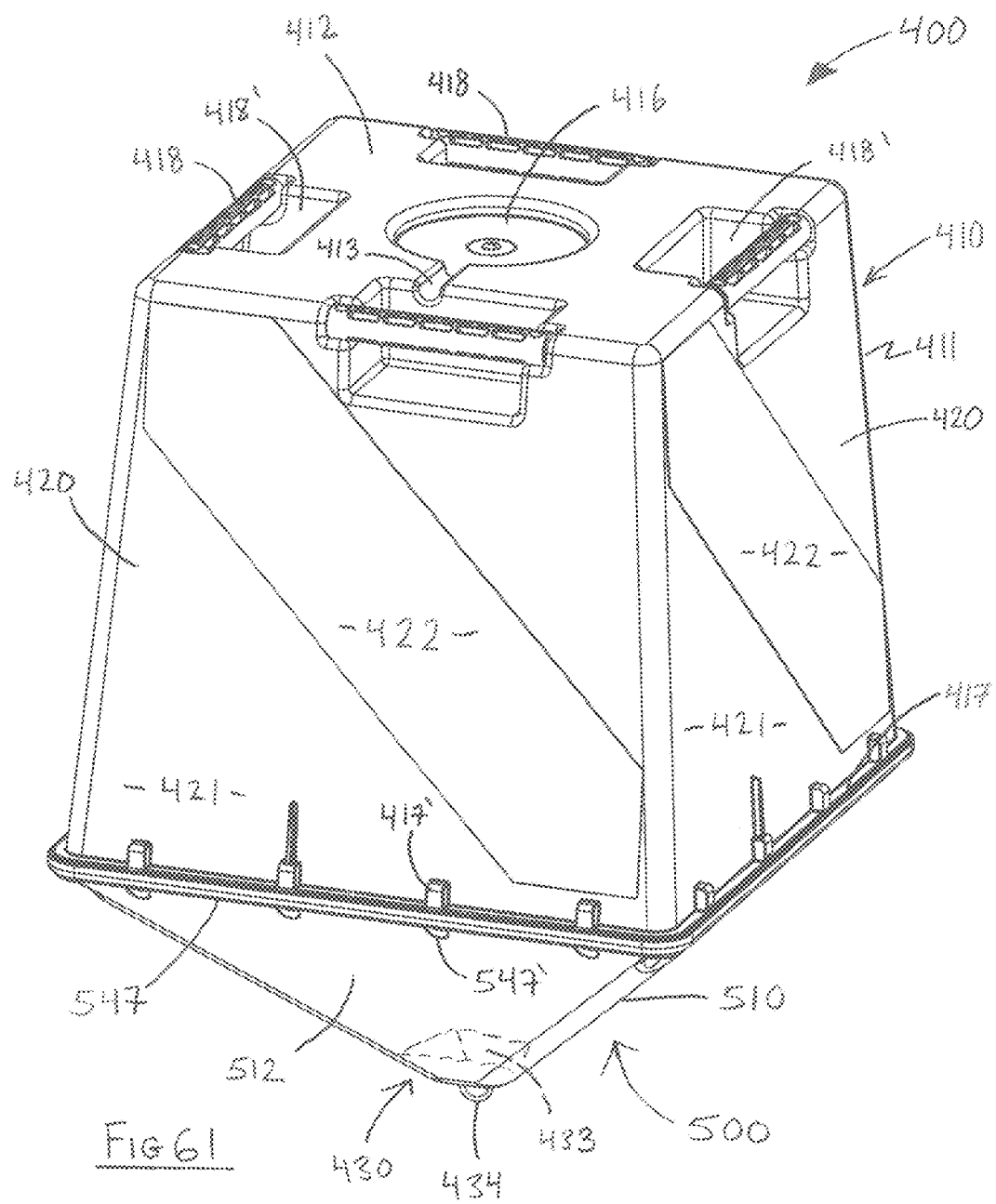
FIG. 61 is a perspective view of another illustrative embodiment of a multi-directional signal assembly having a resistance deflector assembly in accordance with the present invention.
Figure 62:
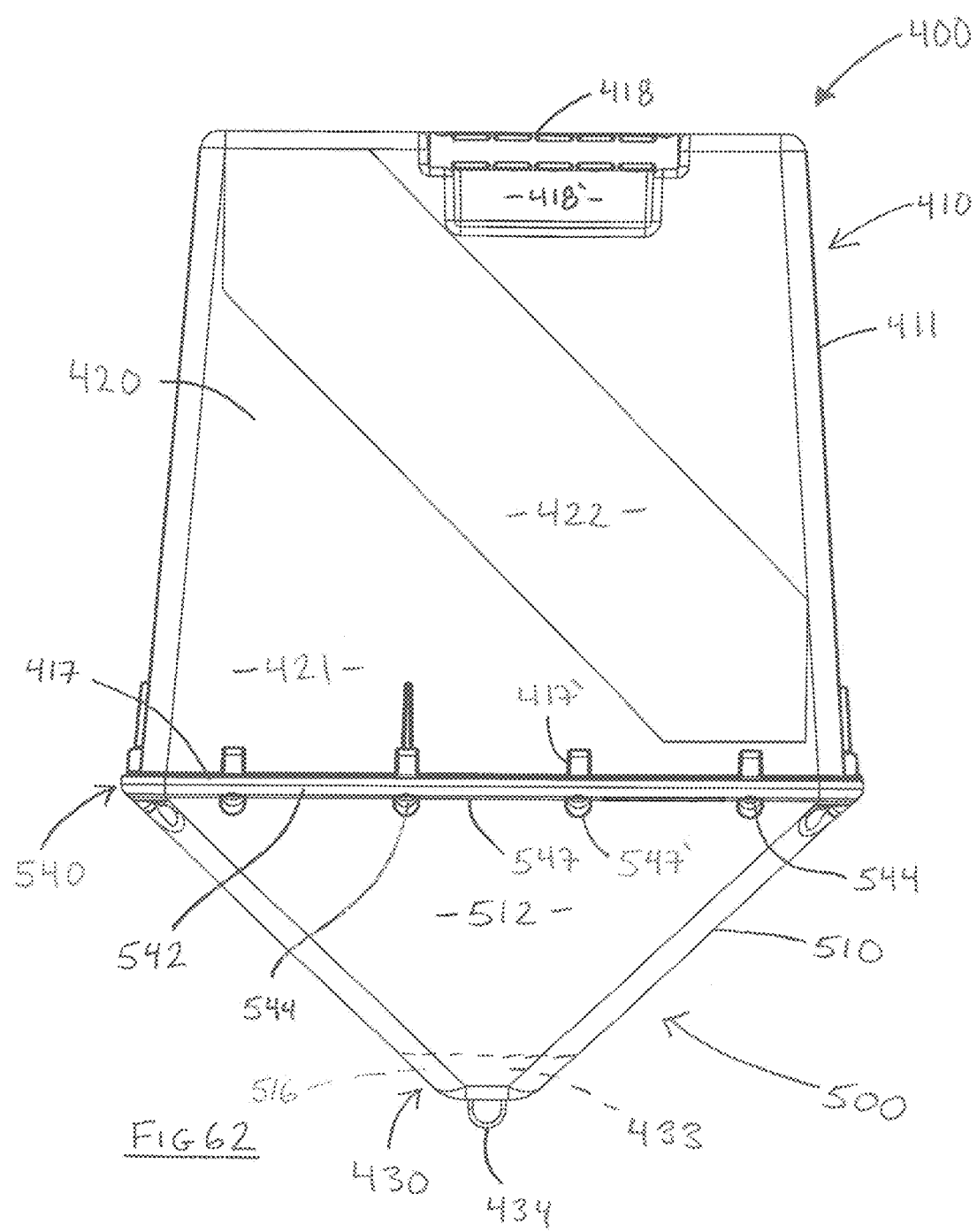
FIG. 62 is an elevation of the illustrative embodiment of the multi-directional signal assembly of FIG. 61.
Figure 63:
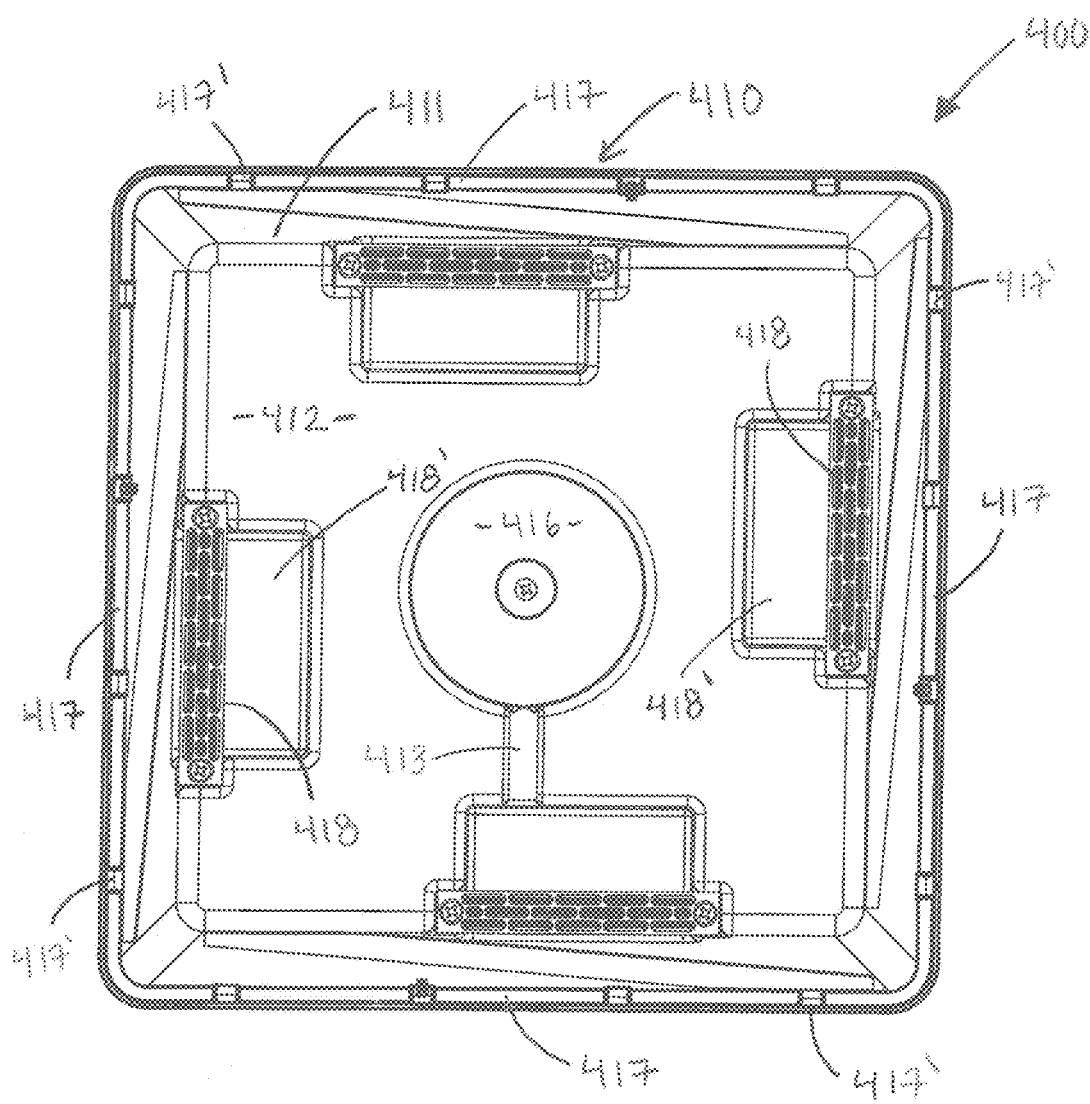
FIG. 63 is top plan view of the illustrative embodiment of the multi-directional signal assembly of FIG. 61.

FIGS. 61 through 63 present another illustrative embodiment of a multi-directional signal assembly 400 having a resistance deflector assembly 500. Similar to previously disclosed embodiments, the multi-directional signal display assembly 400 comprises a float assembly 410 having a float body 411 comprising a buoyant construction. Further, the multi-directional signal display assembly 400 comprises a signal display assembly 420 having a plurality of display surfaces 421, wherein one or more of the plurality of display surfaces 421 has a signal indicia 422 affixed thereto, such as is shown in the illustrative embodiment of FIGS. 61 and 62.

Signal indicia 422, in accordance with at least one embodiment of the present invention, comprises a Unites States dive flag, which is a widely known and readily recognizable signal indicating that a diver or snorkeler is in the water in the vicinity of the dive flag. The U.S. dive flag is crucial to mark the location of divers or snorkelers in the water, so that boats know to steer clear of the area for obvious safety reasons. The U.S. dive flag consists of a bright red or orange square having a broad white band running diagonally there through from the upper left corner to the lower right corner, such as is shown, by way of example, in the illustrative embodiments of FIGS. 61 and 62.

In one further embodiment, signal indicia 422 may be in the form of an International Alpha Dive Flag, which the International Code of Signals has established to mean "I have a diver down; keep well clear at slow speed." The familiar International Alpha Dive Flag comprises an overall rectangular shape divided into two parts. The first part is a vertical rectangular portion which is white in color and is closest to the flagpole, flagstaff, or other support. The second part is a blue swallow-tail portion immediately adjacent the first part. It will be appreciated by those of skill in the art that the signal indicia in conjunction with any of the disclosed embodiments a multi-directional single assembly in accordance with the present invention may be in the form of the International Alpha Dive Flag.

Further, and as shown best in FIG. 63, the multi-directional signal display assembly 400 includes an illumination assembly mount 416 on the top 412 of the float body 411 to facilitate mounting an illumination assembly (not shown) thereto. A drainage channel 413 may be formed the top 412 of the float body 411 to direct any excess water off of the float assembly 410. The illustrative embodiments of FIGS. 61 through 63 further illustrates a plurality of handle members 418 disposed around the periphery of the top 412. FIGS. 61 and 63 also illustrate a corresponding plurality of hand-hold recesses 418' corresponding to each handle member 418 to allow a user to comfortable place his or her hand around one or more handle member 418.

As shown in FIG. 61, the resistance deflector assembly 500 comprises a deflector body 510 which is operatively mounted to a float body 411 of float assembly 410. More in particular, the resistance deflector assembly 500 comprises a deflector body 510 and a deflector mounting assembly 540 having a deflector mounting flange 547 which is positioned around an upper periphery of the deflector body 510, as shown in FIGS. 61 and 62. The figures further illustrate a float mounting flange 417 positioned around a lower periphery of the float body 411. As shown in FIGS. 61 through 63, the deflector mounting flange 547 and the float mounting flange 417 extend substantially around the upper and lower peripheries of the deflector body 510 and float body 411, respectively. Of course, it will be appreciated by those of skill in the art that deflector mounting flange 547 and/or float mounting flange 417 need not extend entirely around the corresponding upper or lower periphery, but rather, may comprise one or more tabs extending outwardly therefrom in order to facilitate mounting the deflector body 510 to the float assembly 410 of a multi-directional signal assembly 400.

Looking further to FIGS. 61 and 62, the float mounting flange 417 comprises a plurality of float mounting apertures 417', and the deflector mounting flange 547 comprises a plurality of deflector mounting apertures 547'. As further shown in the figures, the float mounting flange 417 and the deflector mounting flange 547 are cooperatively structured such that the plurality of float mounting apertures 417' align with corresponding ones of the plurality of deflector mounting apertures 547' when the resistance deflector assembly 500 is disposed in an operative orientation relative to said float assembly 410 to facilitate mounting thereto, such as via a plurality of fasteners 544.

In one embodiment, a deflector mounting assembly 540 further comprises a sealing member 542 which is disposed between the deflector mounting flange 547 and the float mounting flange 417, as shown in the illustrative embodiment of FIG. 62. A sealing member 542 in accordance with the present invention comprises a substantially water resistant construction. In one embodiment, sealing member 542 comprises a gasket like member which extends along and between the deflector mounting flange 547 and the float mounting flange 417, and provides a water resistant seal between the float body 411 and the deflector body 410. However, in at least one further embodiment, float body 411 comprises an open lower end, and sealing member 524 comprises a solid piece which extends across the entire lower open end of the float body 411 so as to assure that float assembly 410 remains substantially watertight and buoyant.

As in the illustrative embodiment of FIGS. 36 and 38, FIGS. 61 and 62 illustrate a deflector body 510 comprising a plurality of deflection surfaces 512. These figures further illustrate that each deflection surface 512 extends downwardly and inwardly relative to the float assembly 410. As such, when a float assembly 410 of a multi-directional signal assembly 400 in accordance with the present invention is pulled, towed, or otherwise moved across a body of water, one or more of deflection surfaces 512 will serve to smoothly transition and divert the flow of water under and around the deflector body 510, thereby reducing the resistance forces which are encountered as the multi-directional signal assembly 400 is moved across the surface of a body of water.

In at least one embodiment, the deflector body 510 further comprises a counterweight seat 516 disposed at the lower most portion of deflector body 510. The counterweight seat 516 is dimensioned to receive at least a portion of a counterweight assembly 430 therein. As before, counterweight assembly 430 biases the float assembly 410 into an operative orientation relative to the surface of the body of water. The operative orientation of the float assembly 410 is at least partially defined by each of the plurality of display surfaces 421 being disposed in a substantially upright orientation relative to the surface of the body of water.

More in particular, in at least one embodiment, a counterweight assembly 430 comprises a weight 433 configured to be mounted in the counterweight seat 516. The weight 433 may be made of lead, steel, iron, etc., so as to provide sufficient weight to bias the float assembly 410 into an operative orientation relative to the surface of the body of water. As shown in the illustrative embodiment of FIGS. 61 and 62, the weight 433 comprises an interconnection eyelet 434 which extends through the bottom of the deflector body 510 which, as before, allows a user to connect a tow line, anchor line, catch or accessory bag, etc., to the multi-directional signal assembly 400. In at least one embodiment, a fastener 435 is utilized to secure the interconnection eyelet 434 to the weight 433, and in one further embodiment, the fastener 435 facilitates secure mounting the weight 433 in position in the counterweight seat 516. Of course, interconnection eyelet 434 may be formed integral with the weight 433 such that fastener 435 is unnecessary.

Figure 64:
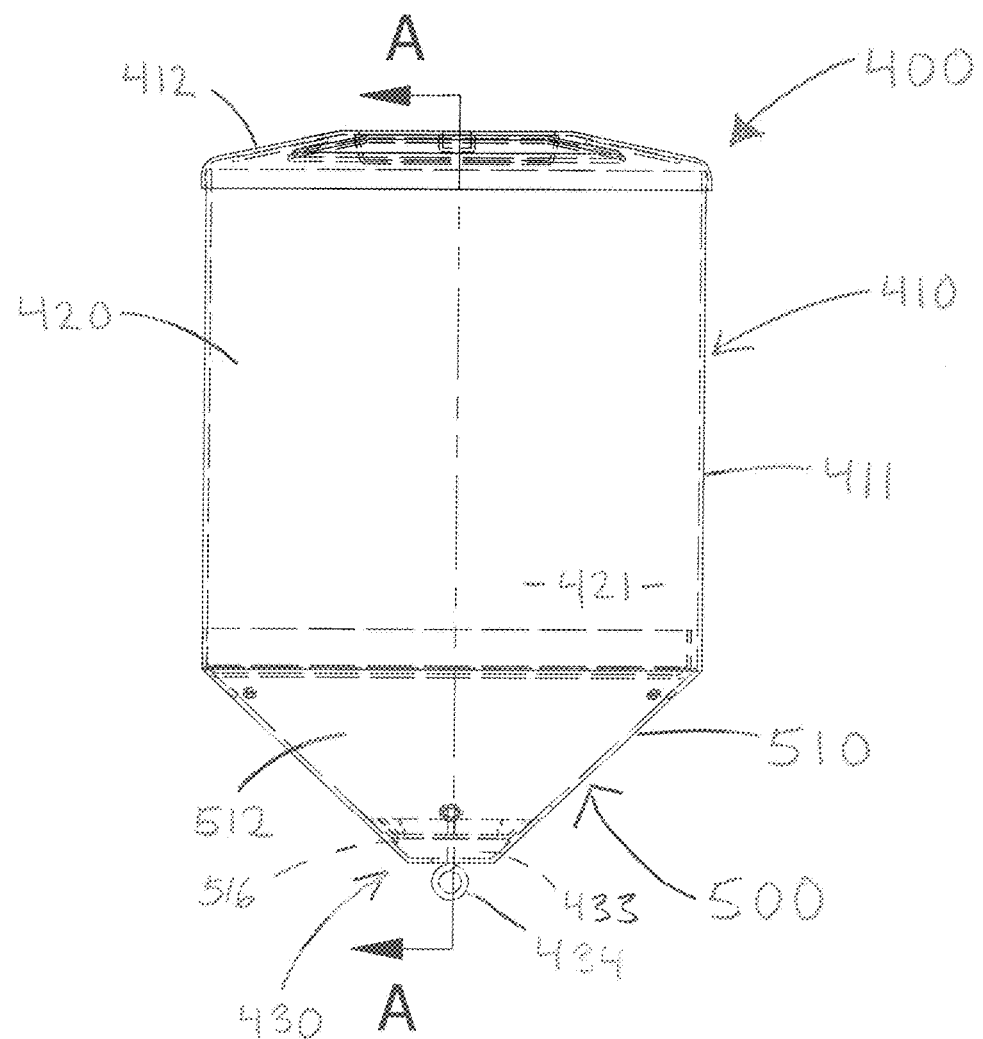
FIG. 64 is a perspective view of yet another illustrative embodiment of a multi-directional signal assembly having a resistance deflector assembly in accordance with the present invention.
Figure 65:
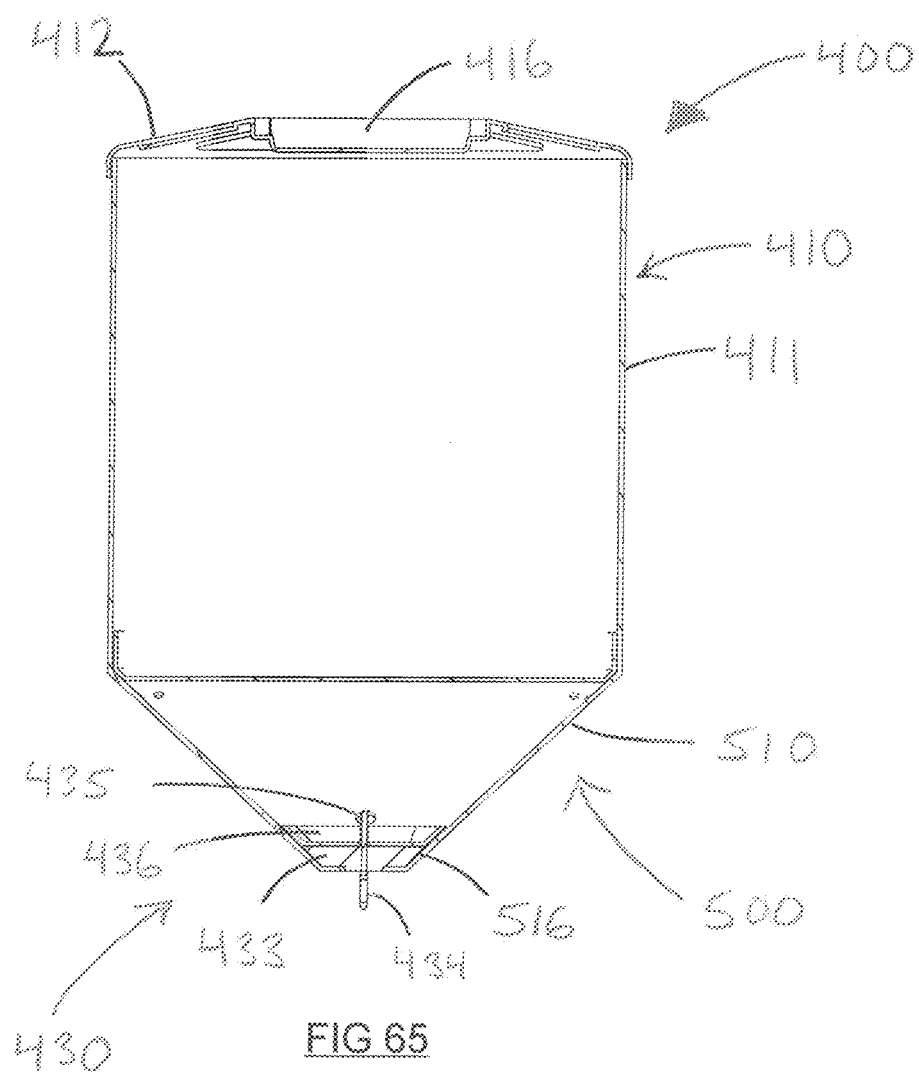
FIG. 65 is a cross section of the illustrative embodiment of the multi-directional signal assembly of FIG. 64 along lines A-A.

As shown best in the further illustrative embodiment of a multi-directional signal assembly 400 comprising a resistance deflector assembly 500 of FIGS. 64 and 65, weight 433 is configured to conform to a geometric configuration of counterweight seat 516. As further shown in FIG. 65, in at least one embodiment, a counterweight assembly 430 comprises a retainer 436 to further facilitate secure mounting of the weight 433 in the counterweight seat 516 of the deflector body 510. As will be further appreciated from the embodiment of FIGS. 64 and 65, both the weight 433 and the retainer 436 are configured to conform to the geometric configuration of the counterweight seat 516, and, the retainer 536 is further configured to conform to the geometric configuration of the weight 433.

In at least one further embodiment, a counterweight assembly 430 comprises a weight 433 having a dense plastic or similar material of construction. In one further embodiment, the weight 433 has a pair of apertures extending therethrough to allow opposite ends of a U-shaped cable to pass through. Clamps, crimps, etc. are affixed to each of the loose ends of the cable after they pass through the weight 433, and are of sufficient size to prevent the loose ends of the cable from passing back through the apertures in the weight 433, thereby movably securing the U-shaped cable to the weight 433. The U-shaped cable provides a place to secure an anchor line, tow line, etc., while the multi-directional signal display assembly 400 is deployed in a body of water, much as interconnection eyelet 434 disclosed above.

As will be appreciated for the foregoing, because the cable is movably secured to the weight 433, when the multi-directional signal display assembly 400 is placed on a solid surface, the U-shaped cable can retract upwardly through the weight 433 to prevent deformation thereof, and to allow the assembly 400 to be more or less free standing on the solid surface. In at least one further embodiment, the bottom of the resistance deflector assembly 500 comprise an aperture of sufficient diameter to permit the U-shaped cable to completely pass through, such that when the multi-directional signal display assembly 400 is placed on a solid surface, the U-shaped cable retracts up through the aperture and then moves the weight 433 upward into the resistance deflector assembly 500 a sufficient distance to further facilitate disposition of the assembly 400 in a free standing position on the solid surface. As will be appreciated by those of skill in the art, when the assembly 400 is lifted up from the solid surface, the weight 433 will drop down into position and the U-shaped cable will drop down through the weight 433 and the aperture in the bottom of the resistance deflector assembly 500, and into an operative position for connection thereto by an anchor line, tow rope, etc.

Figure 66:
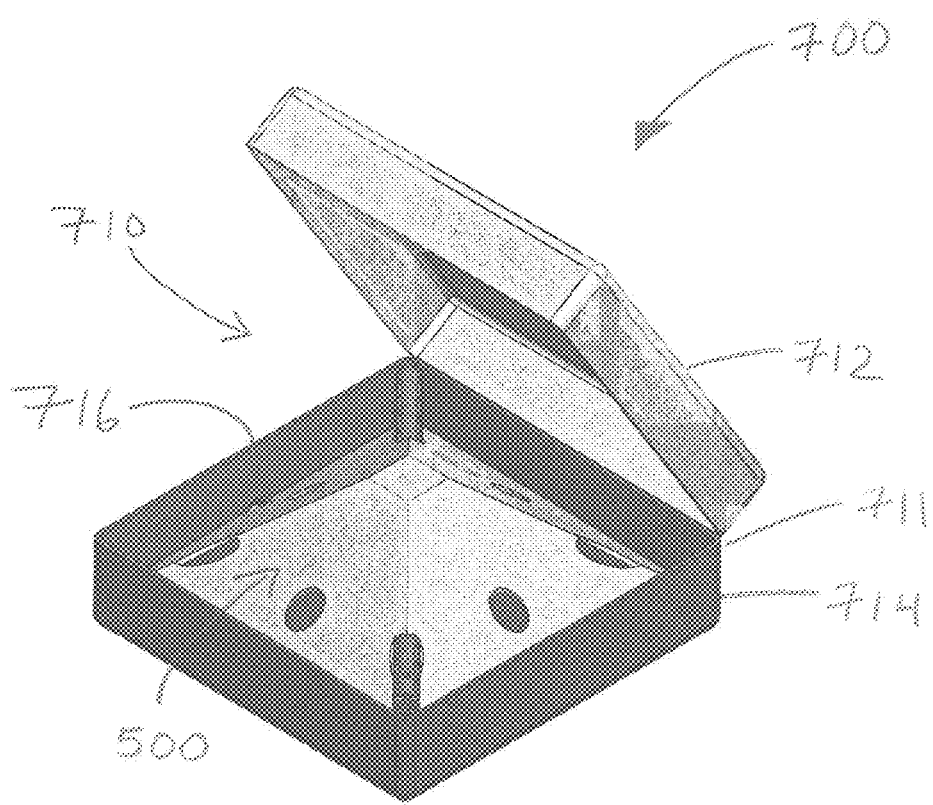
FIG. 66 is a perspective view of yet another illustrative embodiment of a multi-directional signal assembly disposed in a partially stowed configuration in accordance with the present invention.
Figure 67:
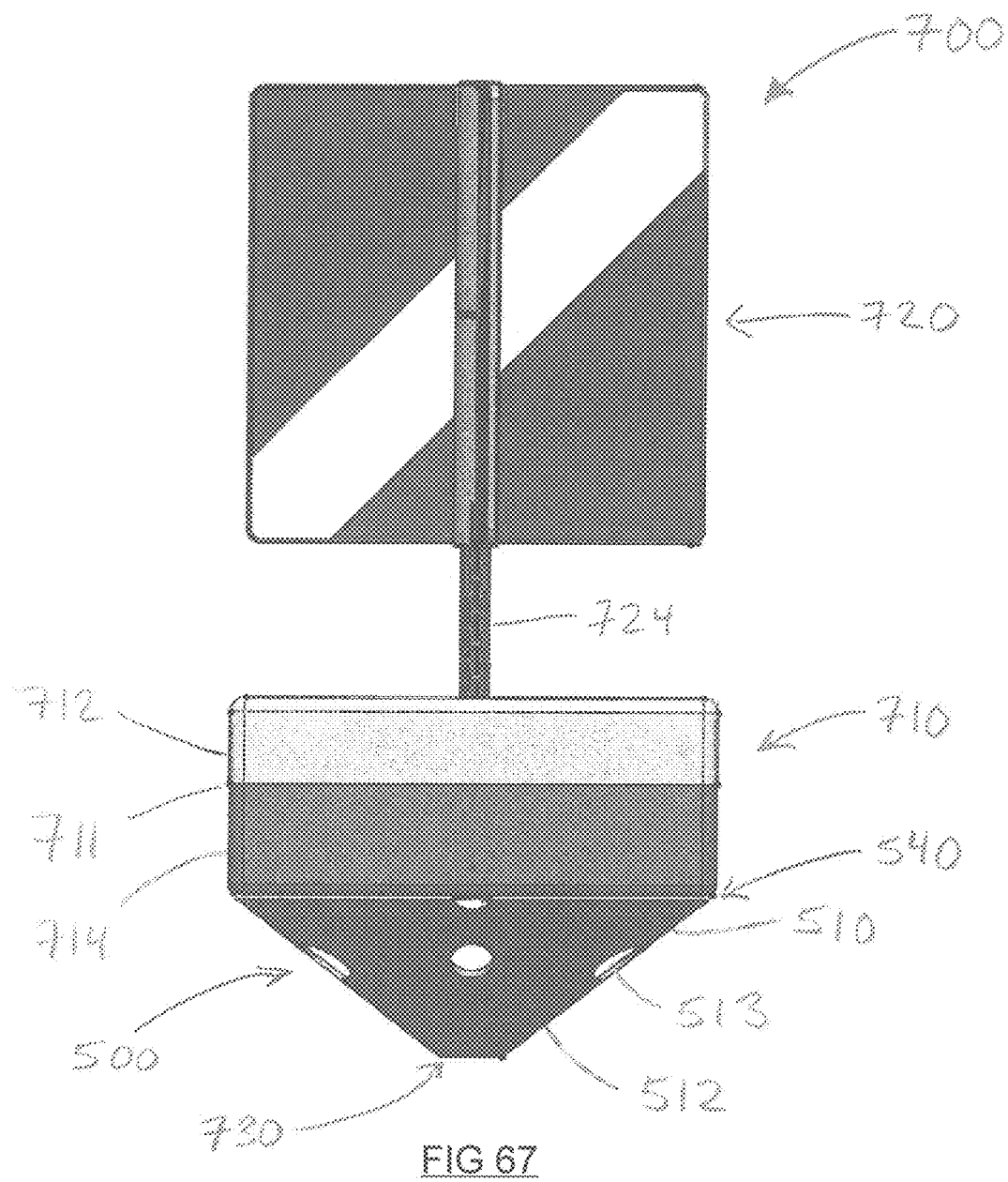
FIG. 67 is an elevation of the illustrative embodiment of the multi-directional signal assembly of FIG. 66 disposed in a fully deployed configuration.
Figure 68:
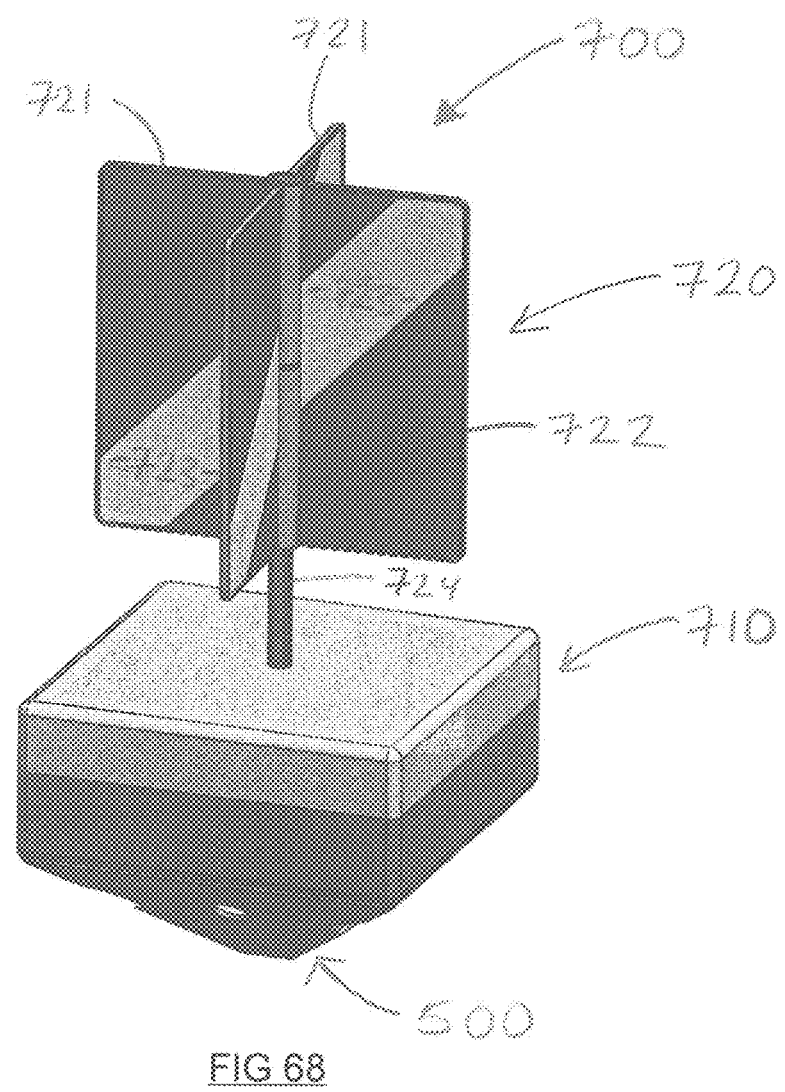
FIG. 68 is a perspective view of the illustrative embodiment of the multi-directional signal assembly of FIG. 67 disposed in the fully deployed configuration.

FIGS. 66 through 68 are illustrative of one further embodiment of a multi-directional signal assembly 700 in accordance with the present invention. Once again, the multi-directional signal display assembly 700 comprises a float assembly 710 having a float body 711 comprising a buoyant construction. As shown best in FIG. 66, float assembly 710 comprises an upper section 712 and a lower section 714. As further shown in FIG. 66, upper portion 712 and lower portion 714 are at least partially separable from one another to permit access to an internal storage compartment 716, which may be utilized to store a resistance deflector assembly 500 and a collapsible signal display assembly 720 (not shown) while disposed in a stowed configuration. FIGS. 67 and 68 illustrate the float body 710 disposed in an operative closed orientation, wherein the float body 710 is buoyant and will float on the surface of a body of water.

As noted above, the multi-directional signal display assembly 700 further comprises a collapsible signal display assembly 720. A collapsible signal display assembly 720 in accordance with at least one embodiment of the present invention, such as is shown in FIGS. 67 and 68, comprises a plurality of display panels 721 each having at least one display surface 722 thereon. Similar to previously disclosed embodiments, a signal indicia 723 is affixed onto one or more of the plurality of display surfaces 722, once again, as shown in the illustrative embodiment of FIGS. 67 and 68. As will be further appreciated from FIGS. 67 and 68, the display panels 721 are disposed in a deployed configuration about support 724, which serves to support the collapsible display assembly 720 in an operative orientation on float assembly 710. In the illustrative embodiment of FIGS. 67 and 68, display panels 721 are positioned in a partially interlocked orientation perpendicular to one another while disposed in a deployed configuration. As will be further appreciated from the figures, when display panels 721 are disconnected from one another and support 724, they may be stored flat one on top of another so as to permit stowage in the internal storage compartment 716 of the float body 710.

As before, signal indicia 722, in accordance with at least one embodiment of the present invention, comprises a Unites States dive flag, which is a widely known and readily recognizable signal indicating that a diver or snorkeler is in the water in the vicinity of the dive flag. The U.S. dive flag consists of a bright red or orange square having a broad white band running diagonally there through from the upper left corner to the lower right corner, such as is shown, by way of example, in the illustrative embodiments of FIGS. 67 and 68.

Looking again to the illustrative embodiment of FIG. 67, the resistance deflector assembly 500 comprises a deflector body 510 having a plurality of deflection surfaces 512. The figures further illustrate that the deflection surfaces 512 extend downwardly and inwardly relative to the float assembly 710. As such, when a float assembly 710 of a multi-directional signal assembly 700 in accordance with the present invention is pulled, towed, or otherwise moved across a body of water, one or more of deflection surfaces 512 will serve to smoothly transition and divert the flow of water under and around the deflector body 510, thereby reducing the resistance forces which are encountered as the multi-directional signal assembly 700 is moved across the surface of a body of water. FIG. 67 further illustrates a plurality of ports 513 through portions of detection surfaces 512, which allows water to flow through deflector body 510, thereby further reducing the overall resistive forces encountered.

In at least one embodiment, a multi-directional signal display assembly 700 in accordance with the present invention further comprises a counterweight assembly 730. As before, the counterweight assembly 730 is mounted to a lower portion of the resistance deflector assembly 500. Also as before, counterweight assembly 430 biases the float assembly 710 into an operative orientation relative to the surface of the body of water. The operative orientation of the float assembly 710 is at least partially defined by each of the plurality of display surfaces 722 being disposed in a substantially upright orientation relative to the surface of the body of water.

Figure 40:
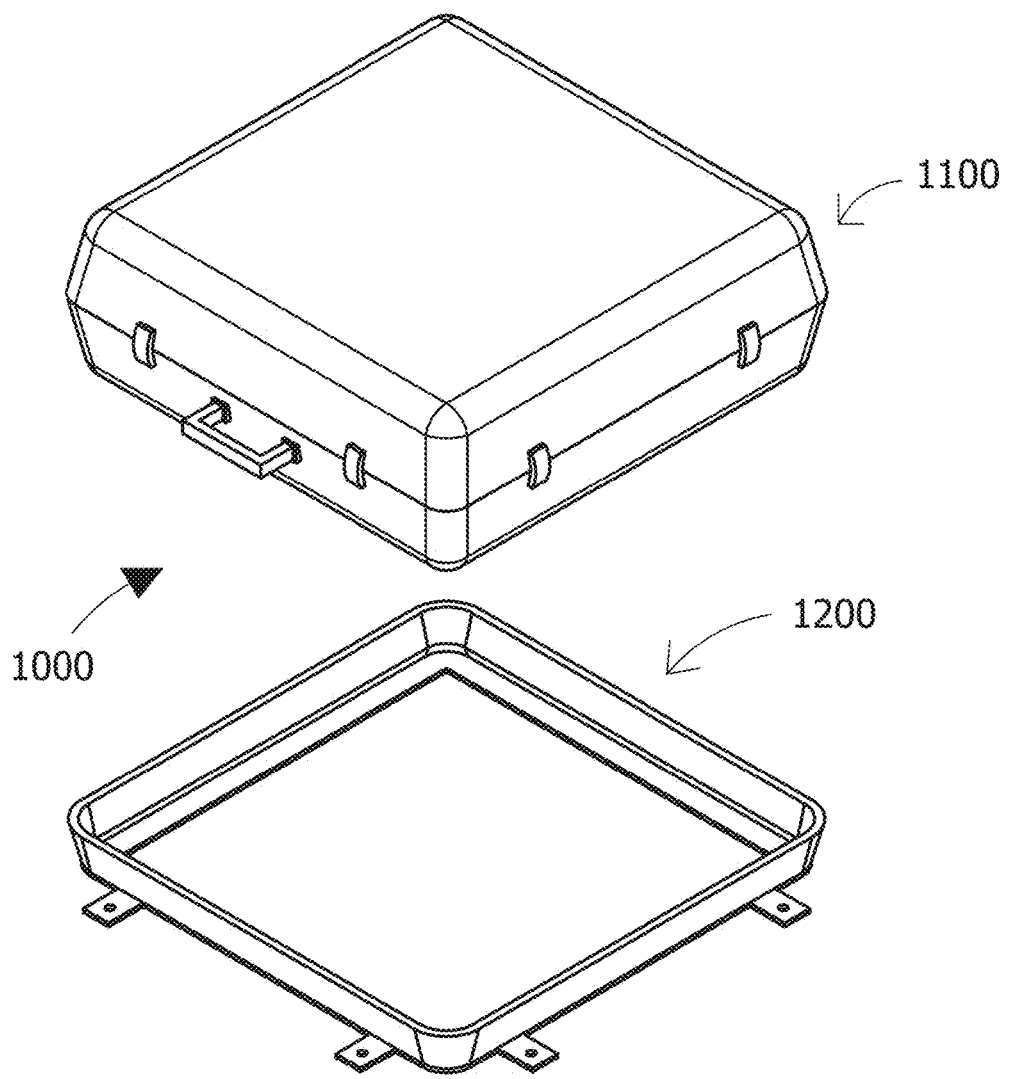
FIG. 40 is a partially exploded perspective view of one illustrative embodiment of a vessel mounted multi-directional signal assembly in accordance with the present invention disposed in a closed configuration.
Figure 41:
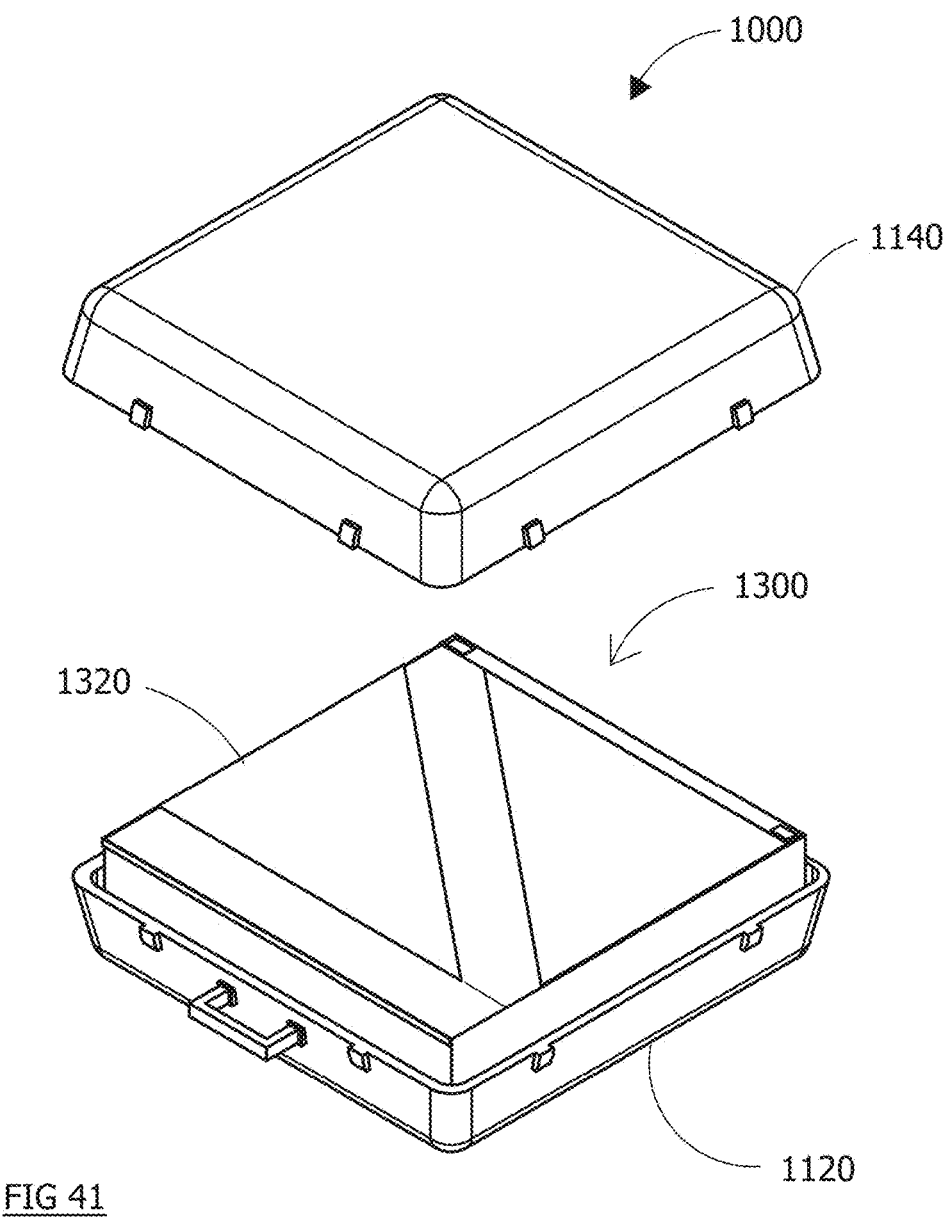
FIG. 41 is a further partially exploded perspective view of the illustrative embodiment of the vessel mounted multi-directional signal assembly of FIG. 40 showing a plurality of signal display panels disposed in a closed orientation.
Figure 42:
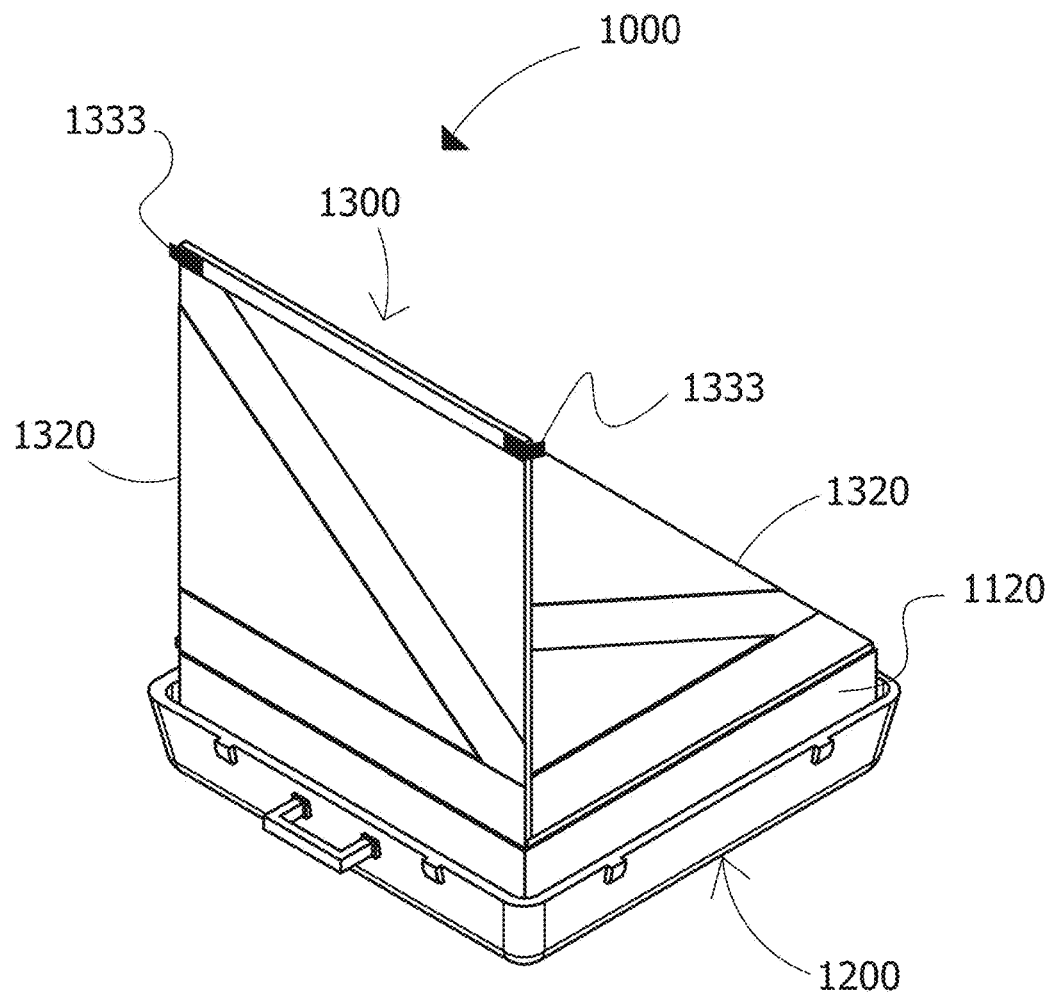
FIG. 42 is a perspective view of the illustrative embodiment of the vessel mounted multi-directional signal assembly of FIG. 40 showing the plurality of signal display panels partially deployed into an operative display orientation.

FIGS. 40 through 45 are illustrative of one embodiment of a vessel mounted multi-directional signal assembly generally as shown at 1000 throughout the figures. FIG. 40 illustrates a case 1100 and a mount 1200 of one embodiment of a vessel mounted multi-directional signal assembly 100 in accordance with one embodiment of the present invention, wherein a collapsible multi-directional signal assembly (not shown) is stored in a closed configuration within the case 1100. Turning to FIG. 41, the cover 1140 is removed from the base 1120 of the case 1100, showing the collapsible multi-directional signal assembly 1300 stored in the base 1120.

In at least one embodiment, a vessel mounted multi-directional signal assembly 1000 in accordance with the present invention includes a collapsible multi-directional signal assembly 1300 comprising a plurality of signal display panels 1320. As shown in the illustrative embodiment of FIG. 42, at least one of the plurality of signal display panels 1320 of the collapsible multi-directional signal assembly 1300 is disposed in an operative display orientation, while others of the plurality of signal display panels 1320 remain disposed in substantially horizontal closed orientation within the case 1120.

Figure 43:
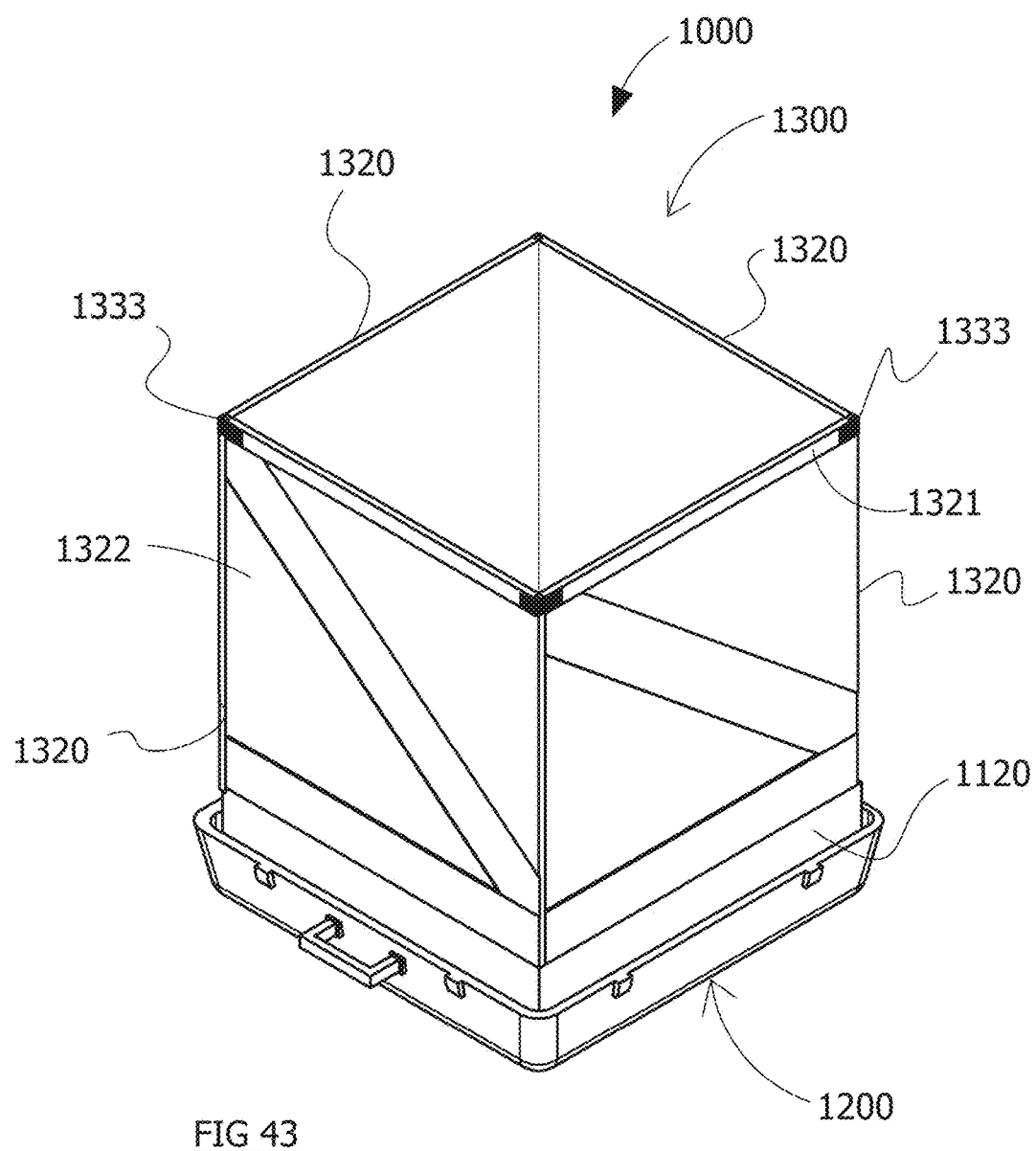
FIG. 43 is a perspective view of the illustrative embodiment of the vessel mounted multi-directional signal assembly of FIG. 40 showing the plurality of signal display panels fully deployed into an operative display orientation.

FIG. 43 presents one illustrative embodiment of a collapsible signal display assembly 1300 comprising a plurality of signal display panels 1320 each fully deployed into an operative display orientation. As shown in FIG. 43, the operative display orientation is at least partially defined by each of the plurality of signal display panels 1320 being disposed in a substantial vertical orientation. More in particular, in the illustrative embodiment of FIG. 43, each of the plurality of signal display panels 1320 is disposed in a substantially vertical orientation relative to the base 1120, which is disposed within mount 1200 of the vessel mounted multi-directional signal assembly 1000. The mount 1200 may be attached to a vessel in any location such that the plurality of signal display panels 1320 are clearly visible to other vessels in the vicinity when the signal display panels 1320 are fully deployed into an operative display orientation, and the base 1120 is disposed in the mount 1200.

As further shown in the illustrative embodiment of FIG. 43, each of the plurality of signal display panels 1320 comprises a display surface 1321. Also as shown in the embodiment of FIG. 43, each display surface 1321 of each of the plurality of signal display panels 1320 includes at least one signal indicia 1322 disposed thereon. As before, in at least one embodiment, signal indicia 1322 comprises a U.S. dive flag.

The illustrative embodiment of the collapsible multi-directional signal assembly 1300 of FIG. 43 further illustrates a plurality of panel interconnects 1333. More specifically, each of the plurality of panel interconnects 1333 is positioned and disposed to retain adjacent ones of the plurality of signal display panels 1320 in an operative display orientation, once again, as shown best in FIG. 43. In at least one embodiment, the panel interconnects 1333 may comprise hook and loop type fasteners cooperatively affixed to corresponding adjacent ones of a plurality of signal display panels 1320. Of course, it will be understood and appreciated by those in the art that any of a variety of mechanical type fasteners may be utilized as panel interconnects 1333 in order to retain adjacent ones of the plurality of signal display panels 1320 in an operative display orientation, in accordance with the present invention.

While disposed in a closed orientation, each of the plurality of signal display panels 1320 of the collapsible multi-directional signal assembly 1300 are disposed in a substantially horizontal orientation relative to the base 1120, and in an overlying or overlapping orientation relative to one another, once again, as illustrated in FIG. 41.

Figure 44:
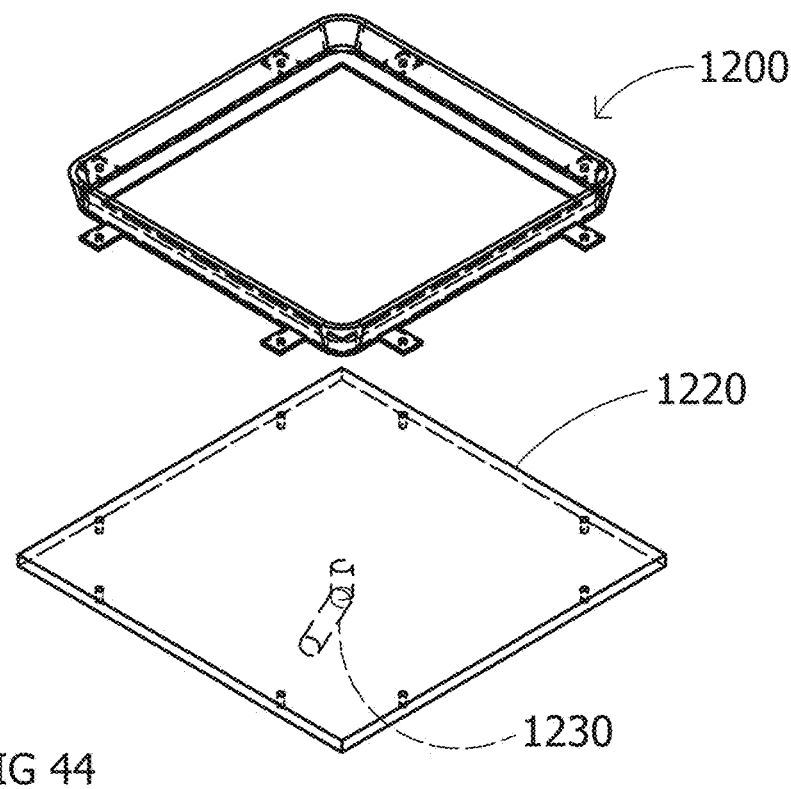
FIG. 44 is a perspective view of one illustrative embodiment of a mount and a mount adapter for a vessel mounted multi-directional signal assembly in accordance with the present invention.
Figure 45:
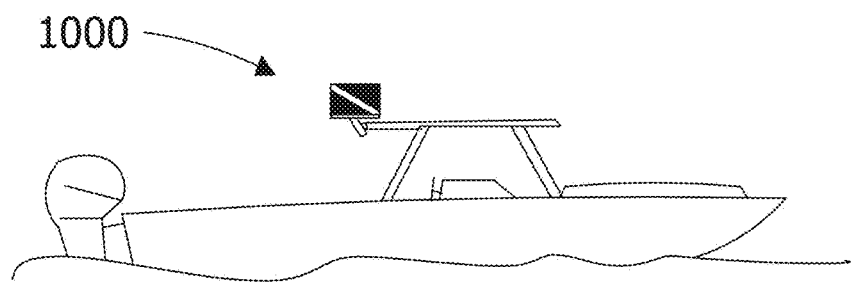
FIG. 45 is an elevation of one illustrative embodiment of a vessel mounted multi-directional signal assembly in accordance with the present invention mounted to a vessel.

FIG. 44 is illustrative of one embodiment of a mount adapter 1220 which may be utilized to facilitate positioning of a vessel mounted multi-directional signal assembly 1000 into an operative orientation on a vessel. More in particular, mount adapter 1220, to which mount 1200 may be attached as illustrated in FIG. 44, as well as by other known mechanical fastening means, comprises a rod holder insert 1230 extending downwardly from the underside thereof. More in particular, the rod holder insert 1230 is dimensioned and configured to be received in a standard rod holder that is common on most modern vessels. As one example, FIG. 45 is illustrative of a vessel mounted multi-directional signal assembly 1000 in accordance with the present invention which is operatively mounted on a vessel by placing a rod holder insert 1230 (not shown) into a rod holder installed in or adjacent a canopy of the vessel itself. As further illustrated in FIG. 45, while the vessel mounted multi-directional signal assembly 1000 is mounted in an operative orientation on the vessel, each of the signal display panels in disposed in a substantial vertical orientation relative to the body of water in which the vessel is disposed.

FIGS. 46 through 58 are illustrative of another embodiment of a vessel mounted multi-directional signal assembly generally as shown at 2000 throughout the figures.

Figure 46:
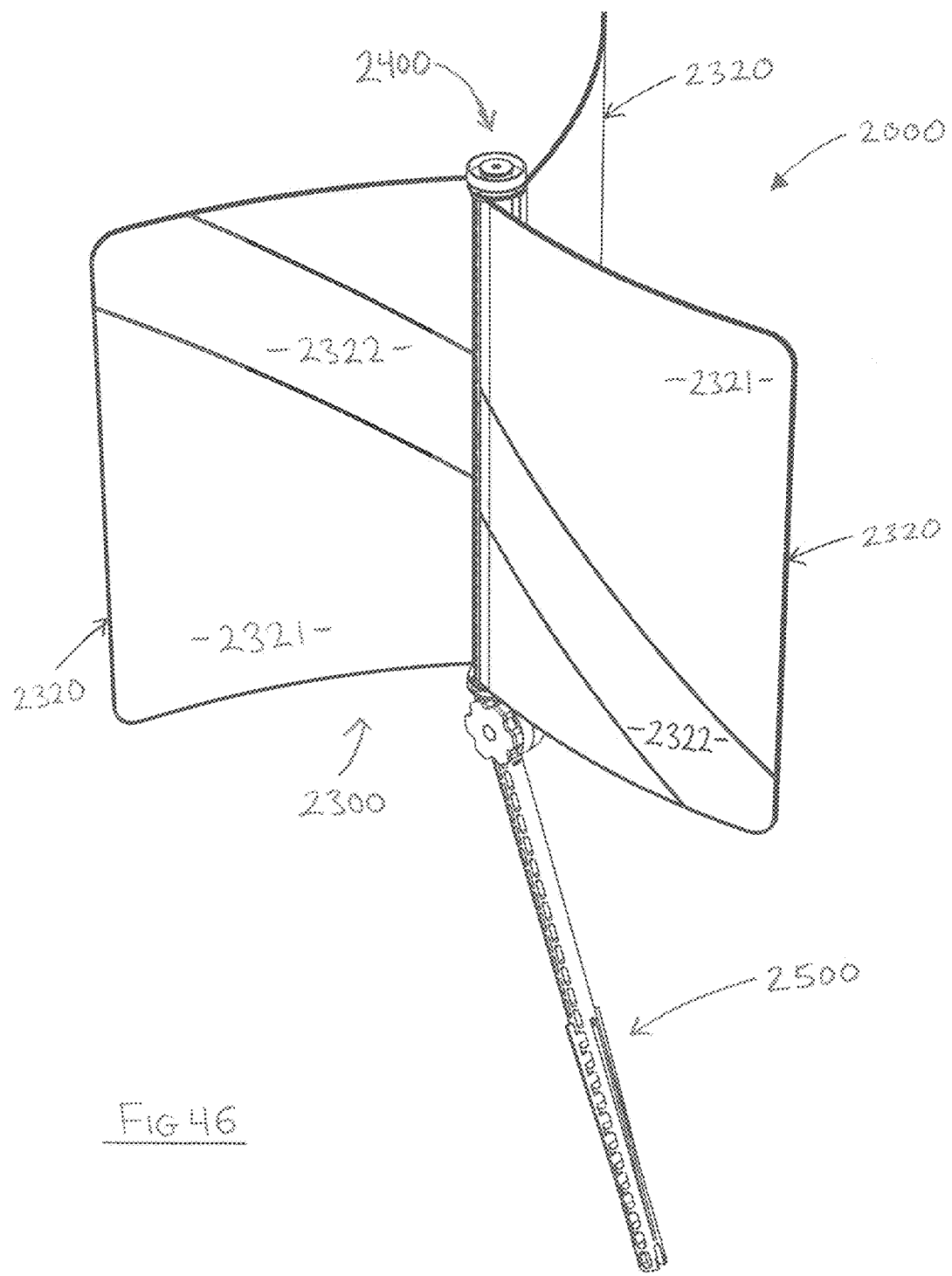
FIG. 46 is a perspective view of another illustrative embodiment of vessel mounted multi-directional signal assembly in a deployed orientation in accordance with the present invention.
Figure 47:
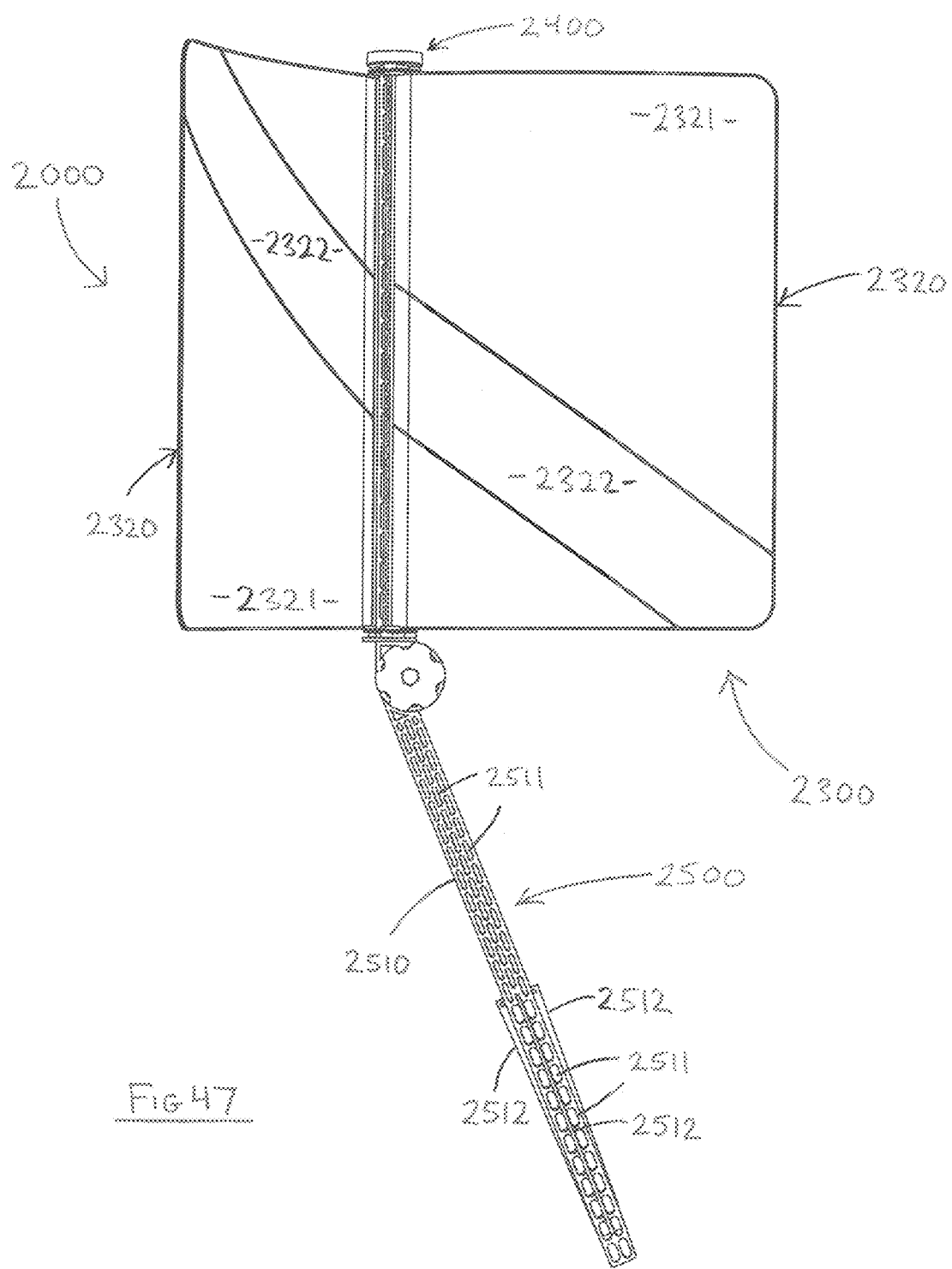
FIG. 47 is left side elevation of the illustrative embodiment of the vessel mounted multi-directional signal assembly of FIG. 46.
Figure 48:
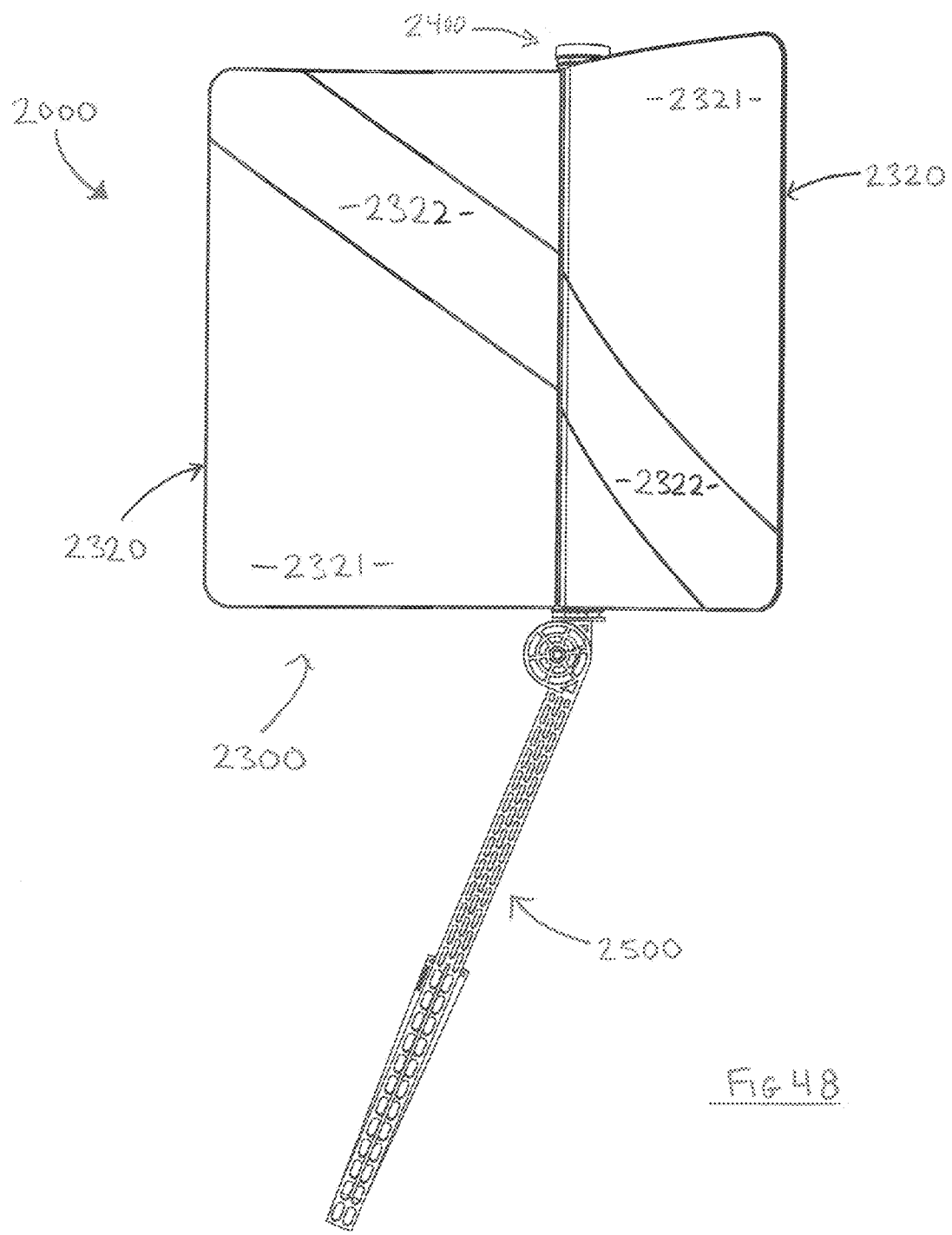
FIG. 48 is right side elevation of the illustrative embodiment of the vessel mounted multi-directional signal assembly of FIG. 46.
Figure 49:
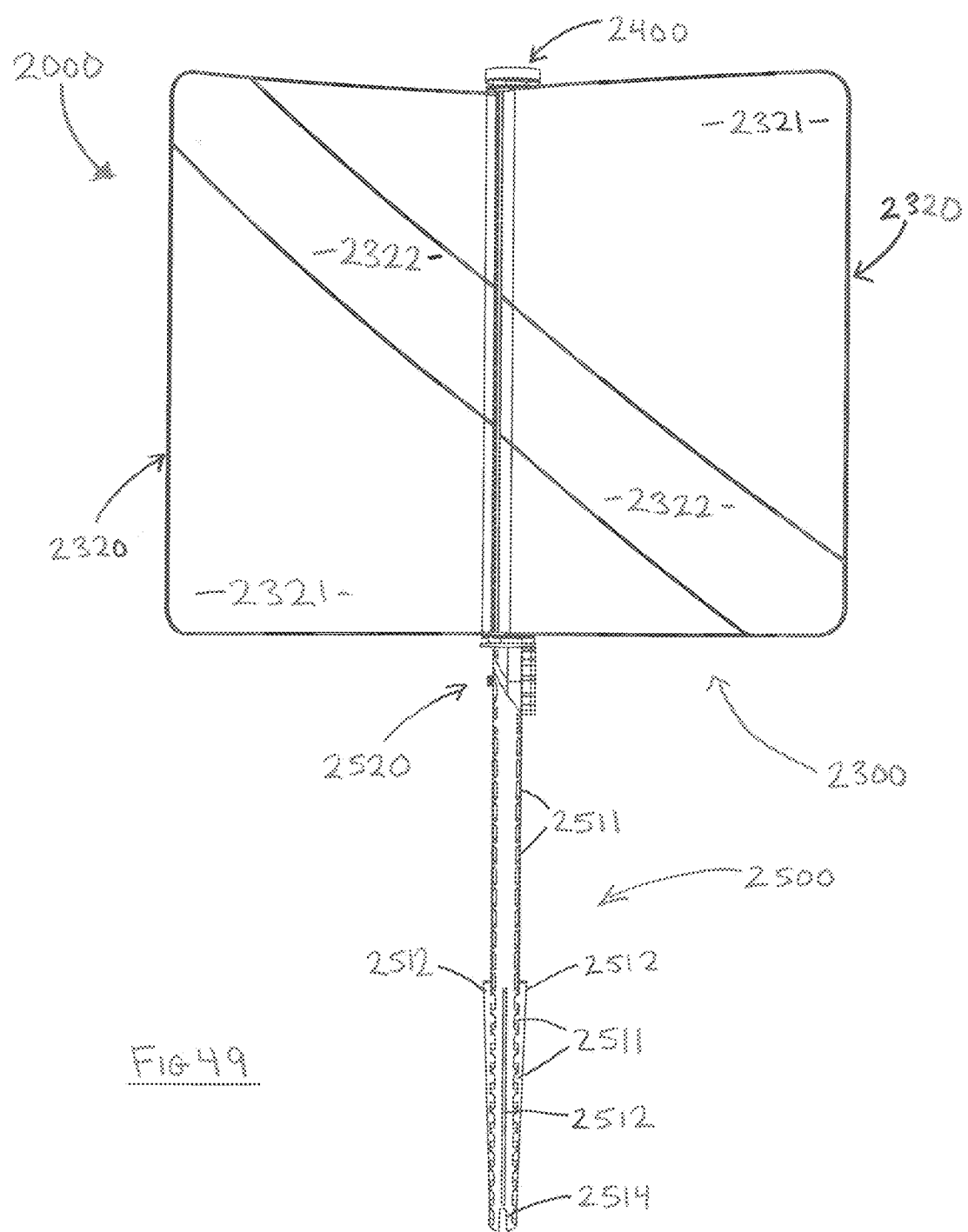
FIG. 49 is front elevation of the illustrative embodiment of the vessel mounted multi-directional signal assembly of FIG. 46.
Figure 50:
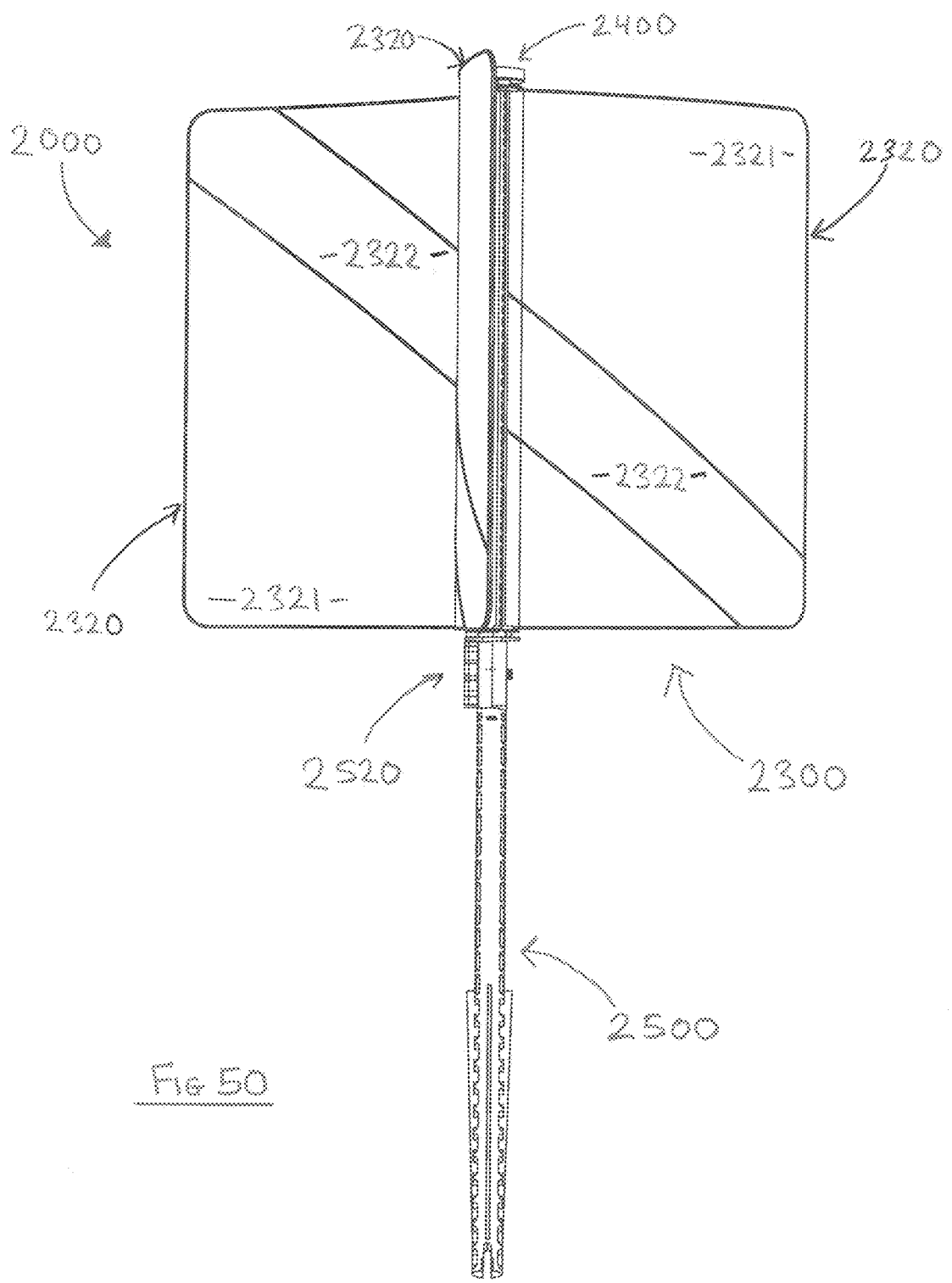
FIG. 50 is rear elevation of the illustrative embodiment of the vessel mounted multi-directional signal assembly of FIG. 46.

To begin, FIG. 46 is a perspective view of one illustrative embodiment of a vessel mounted multi-directional signal assembly 2000 in accordance with the present invention. As may be seen from the illustrative embodiment of FIGS. 46 through 50, a vessel mounted multi-directional signal assembly 2000 includes a multi-directional signal assembly 2300. The illustrative embodiment of FIGS. 46 through 50 further show a vessel mounted multi-directional signal assembly 2000 comprising a signal support assembly 2400, to which a multi-directional signal assembly 2300 is mounted. Additionally, in at least one embodiment, a vessel mount assembly 2500 is operatively interconnected to a signal support assembly 2400, once again, as may be seen from the illustrative embodiments of FIG. 46.

As shown in the illustrative embodiment of FIG. 46, the multi-directional signal assembly 2300 comprises a plurality of signal display panels 2320. As is further shown in the illustrative embodiments of FIGS. 46 through 50, each of the plurality of the signal display panels 2320 includes at least one display surface 2321 having a signal indicia 2322 affixed thereto and displayed thereon. Display panels 2320 in accordance with the present invention may be constructed from any of a variety of rigid or semi-rigid materials of construction, such as, but in no manner limited to wood, metal, e.g., aluminum, metal alloys, plastic, fiberglass, etc.

As will also be appreciated from the illustrative embodiments of FIGS. 46 through 50, each signal indicia 2322 comprises a portion of an indicia representative of a U.S. dive flag. As one example, an orange 3M™ Marine Grade USCG High Intensity Reflective Adhesive Tape, Product No. 3M USCGFP-34, manufactured by 3M Company, St. Paul, Minn., is utilized to form the square portion of the U.S. dive flag. In a further embodiment, a white 3M™ Marine Grade USCG High Intensity Reflective Adhesive Tape, Product No. 3M USCGFP-30, once again, manufactured by 3M Company, St. Paul, Minn., is utilized to form the diagonal band through the orange square of the U.S. dive flag. In at least one embodiment, signal indicia 2322 comprises a U.S. dive flag molded directly onto display surface 2321 of display panels 2320.

Furthermore, as shown in the illustrative embodiments of FIGS. 46 through 50, signal indicia 2322 affixed on display surfaces 2321 of adjacent ones of the plurality of signal display panels 2320 are complimentary with one another so that when viewed in combination, each complimentary pair of signal indicia 2322 form a single indicia representative of a U.S. dive flag displayed across corresponding adjacent ones of said plurality of signal display panels 2320.

In at least one further embodiment, a pair of interlocking rectangular signal display panels are provided, wherein a portion of each rectangular signal panel comprises a portion of an indicia representative of a U.S. dive flag. Further, a portion of signal indicia affixed on adjacent display surfaces of the interlocking rectangular signal display panels are complimentary with one another so that when viewed in combination, each complimentary pair of signal indicia form a single indicia representative of a U.S. dive flag displayed across corresponding adjacent display surfaces of the interlocking rectangular signal display panels, such as is shown in the figures of Applicant's U.S. Provisional Patent Application No. 62/072,148, which is incorporated herein by reference in its entirely.

Of course, and although the complimentary signal indicia 2322 as shown throughout the figures form a single indicia representative of a U.S. dive flag, it will be understood and appreciated by those of skill in the art that complimentary signal indicia 2322 may form a single indicia representative of other types of warnings, distress signals, or any of a variety of other messages to be displayed on a vessel and visible to others in viewing range of said vessel.

It will further be understood and appreciated that while disclosed herein in conjunction with mounting on a vessel, a multi-directional signal assembly in accordance with the present invention is useful in other environments as well. Just a few examples of other applications where the present multi-directional signal assembly may be used to provide messages, signals, and/or warnings to persons within viewing range of the same include roadway signs positioned in a median strip, adjacent a curb lane or both, advertisements for a business, a gathering, or to announce restricted access information, just to name a few. The multi-directional nature of the present multi-directional signal assembly eliminates the need for duplicative roadway signage to display the same message in different directions. Further, the rotational nature of at least one embodiment of the present multi-directional signal assembly of the present invention, described in further detail below, serves as an attractant to increase the likelihood that the message displayed thereon is noticed by the persons it is directed to which, as will be appreciated, is particularly beneficial when the message is a warning intended to protect persons in the area from some form of harm, or when utilized for advertisement purposes.

Figure 60:
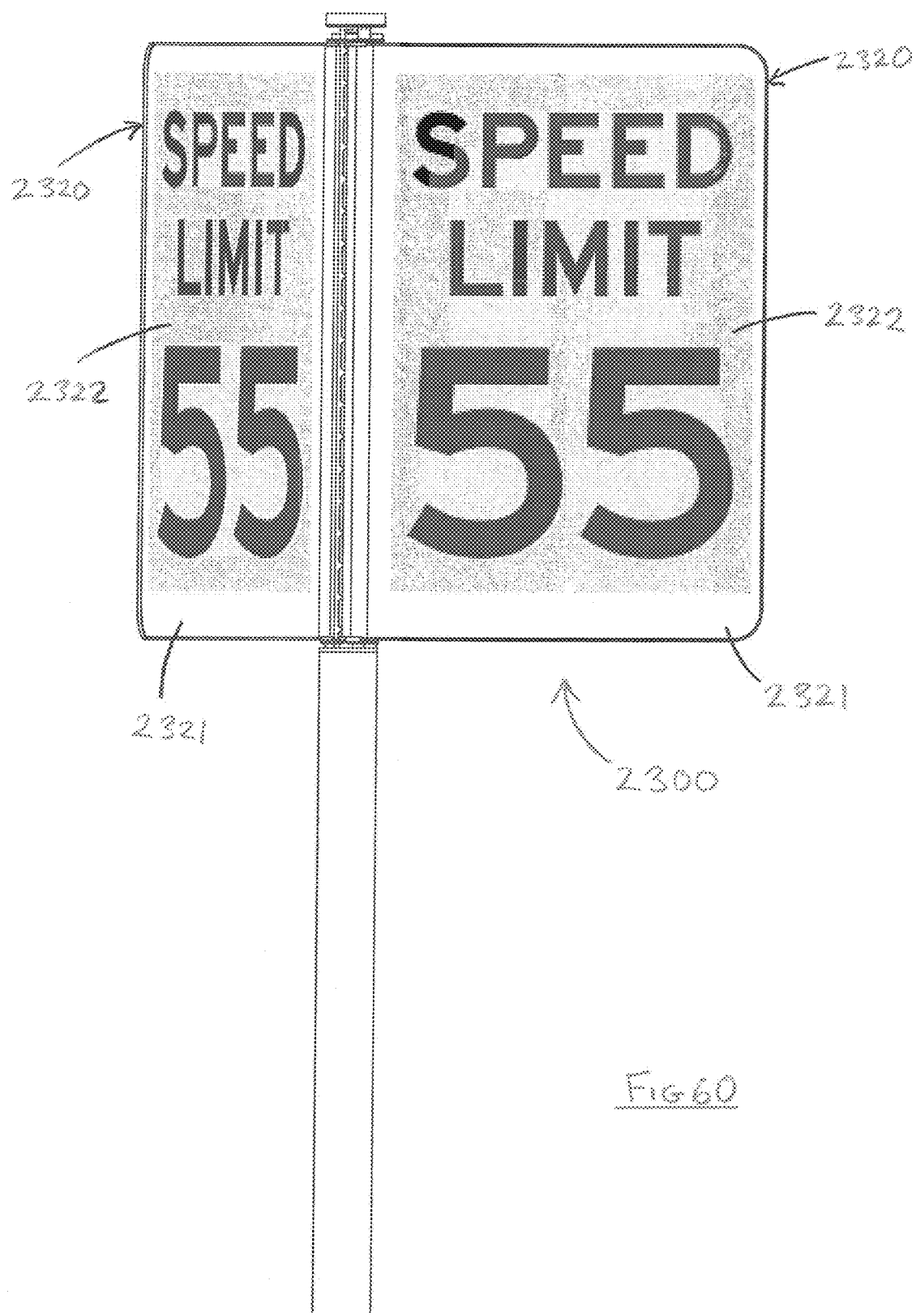
FIG. 60 is illustrative of one further illustrative embodiment of a multi-directional signal assembly in accordance with the present invention.

FIG. 60 is illustrative of one embodiment of a multi-directional signal assembly 2300 in accordance with the present invention utilized to display indicia 2322 of a speed limit which, as noted above, may be installed in a median area such that the need for signage in each direction is eliminated. As before, the multi-directional signal assembly 2300 of the illustrative embodiment of FIG. 60 comprises a plurality of display panels 2320 each having at least one display surface 2321 onto which an indicia 2322 is affixed.

Figure 53:
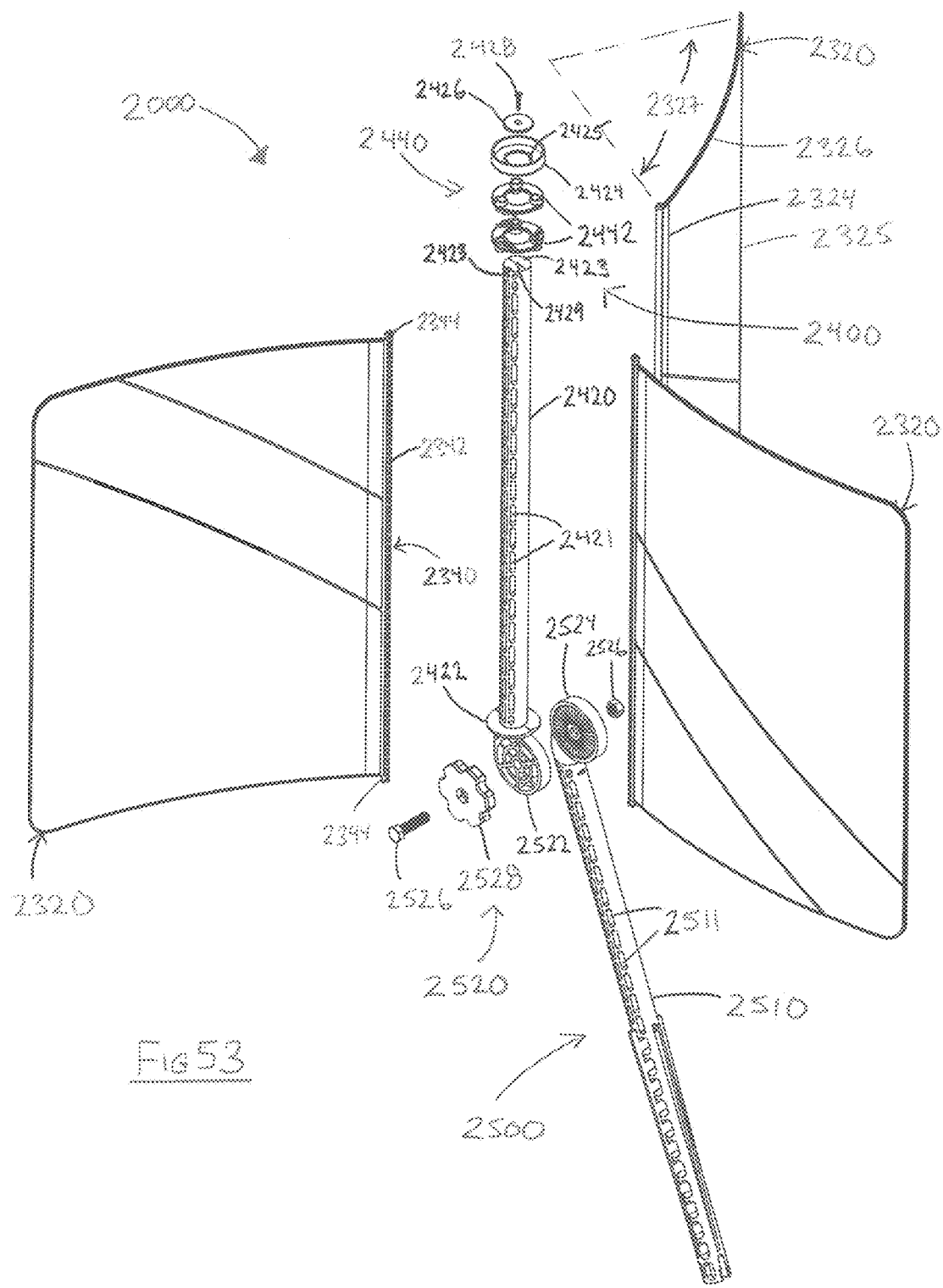
FIG. 53 is an exploded perspective view of the illustrative embodiment of the vessel mounted multi-directional signal assembly of FIG. 46.

FIG. 53 presents an exploded perspective view of one illustrative embodiment of a vessel mounted multi-directional signal assembly 2000 in accordance with the present invention. As previously stated, in at least one embodiment, a vessel mounted multi-directional signal assembly 2000 comprises a signal support assembly 2400. As may be seen best in the illustrative embodiment of FIG. 53, a signal support assembly 2400 comprises a support member 2420. The support member 2420 may be constructed of any of a variety of rigid or semi-rigid materials including but in no manner limited to wood, metal, e.g., aluminum, metal alloys, plastic, fiberglass, etc. In at least one embodiment, a support member 2420 comprises a plurality of construction apertures 2421 which extend at least partially therethrough, however, in at least some embodiments, a plurality of construction apertures 2421 extend completely through support member 2420. The plurality of construction apertures 2421 are strategically positioned in an array so as to optimize the benefits of reduced materials of construction, thereby reducing cost as well as the overall weight of the assembly 2000, while maintaining sufficient structural integrity to the support member 2420 to support a multi-directional signal assembly thereon.

In at least one embodiment, a support member 2420 has a base 2422 mounted at one end and a cap 2424 mounted to an opposite end. A signal support assembly 2400 in accordance with at least one embodiment of the present invention also includes a retainer plate 2426 which is utilized to prevent the cap 2424 from detaching from the support member 2420. In one further embodiment, a retainer fastener 2428 is utilized to secure retainer plate 2426 to support member 2420, which in at least one further embodiment, comprises a retainer aperture 2429 cooperatively structured with retainer fastener 2428 so as to secure retainer plate 2426 in an operative position, and thus, preventing cap 2424 from detaching from the support member 2420. With reference to FIG. 53A, it may be seen that the diameter of the retainer plate 2426 is at least greater than distance between locking tabs 2425 of the cap 2424, thus preventing the cap 2424 for passing over retainer plate 2426.

With continued reference to the illustrative embodiment of FIG. 53, the signal support assembly 2400 in accordance with at least one embodiment of the present invention further comprises a signal mount assembly 2440. More in particular, in at least one embodiment, a signal mount assembly 2440 comprises at least one indexed member 2442 having an aperture 2443 dimensioned such that the indexed member 2442 is movably positionable along the support member 2420 of signal support assembly 2400. Stated otherwise, aperture 2443 is dimensioned to receive at least a portion of support member 2420 therethrough. In at least one further embodiment, the signal mount assembly 2440 comprises a plurality of indexed members 2442 as is shown, once again, in the illustrative embodiment of FIG. 53.

In one embodiment, an indexed member 2442 comprises at least one second coupling member 2444, however, as shown in the illustrative embodiment of FIG. 53A, indexed member 2442 comprises a plurality of second coupling member 2444 disposed equidistant along one surface of indexed member 2442. Each second coupling member 2444 is dimensioned to securely yet releasably receive a first coupling member 2344 affixed to one end of an interconnect member 2342. A guide channel 2446 is associated with each second coupling member 2444 of each indexed member 2442, once again, as shown best in FIG. 53A. Each indexed member 2442 in accordance with at least one embodiment of the present invention comprises at least one glide 2448 disposed on a surface opposite second coupling member 2444 and corresponding guide channel 2446. In at least one embodiment, an indexed member 2442 comprises a glide 2448 corresponding to each second coupling member 2444 disposed thereon, once again, as shown best in FIG. 53A.

Figure 55:
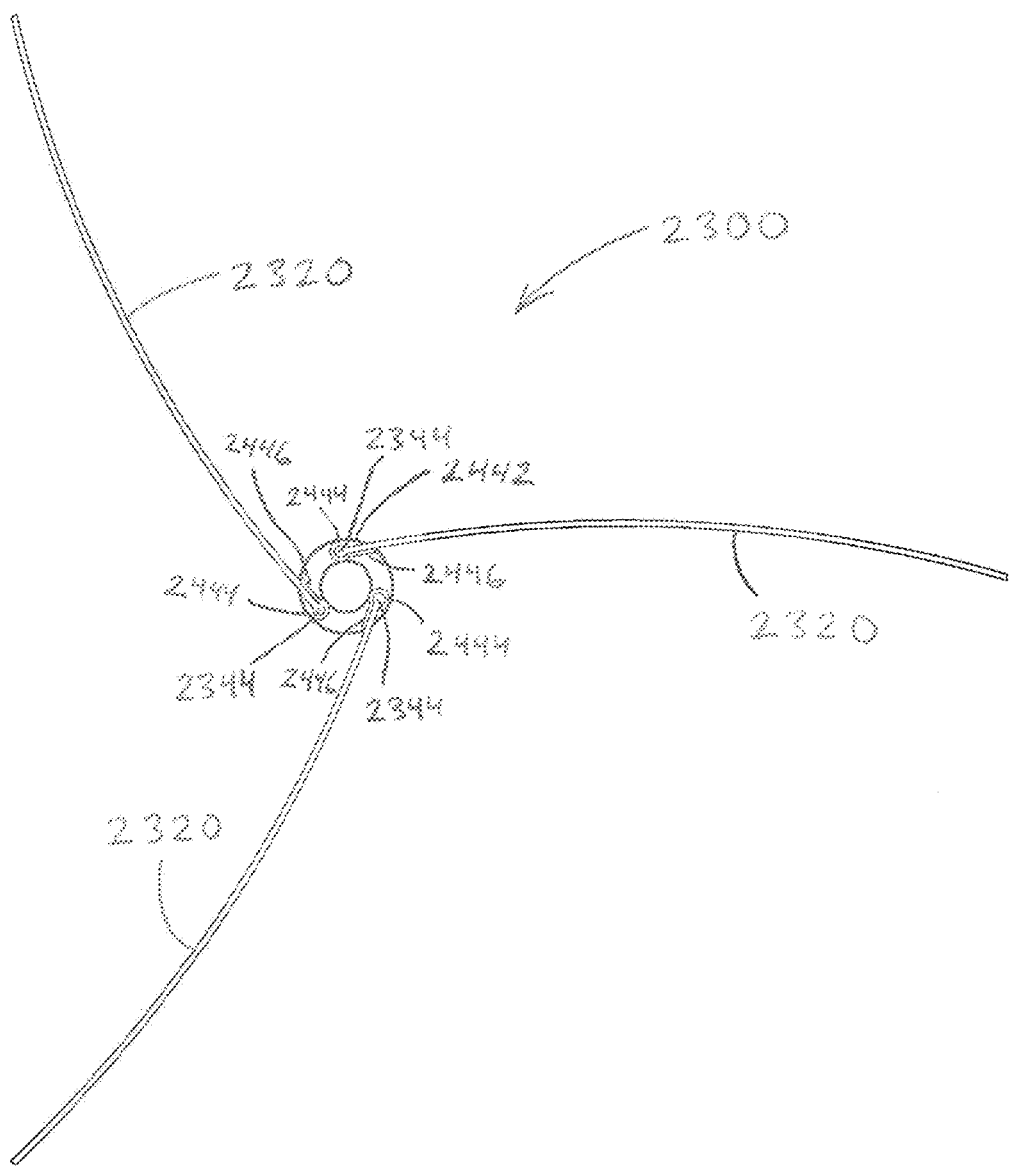
FIG. 55 is a partial cutaway view of one illustrative embodiment of signal display panels operatively engaging an indexed member of a vessel mounted multi-directional signal assembly while disposed in a deployed orientation in accordance with the present invention.

FIG. 55 is a partial cutaway view of one illustrative embodiment of a plurality of signal display panels 2320 of a multi-directional signal assembly 2300 operatively engaging an indexed member 2442. More in particular, as shown in the illustrative embodiment of FIG. 55, each signal display panel 2320 is disposed in a deployed orientation in accordance with one embodiment of the present invention. As further shown in FIG. 55, a first coupling member 2344 of each display panel 2320 is inserted into a corresponding second coupling member 2444 of indexed member 2442. Further, an edge of the signal display panel 2320, which may be upper edge or lower edge, is disposed within a corresponding glide channel 2446 of indexed member 2442, thereby restricting movement of signal display panel 2320 relative to indexed member 2442, while the signal display panel 2320 is disposed in a deployed orientation in accordance with at least one embodiment of the present invention, and as shown in the illustrative embodiment of FIG. 55.

Figure 54:
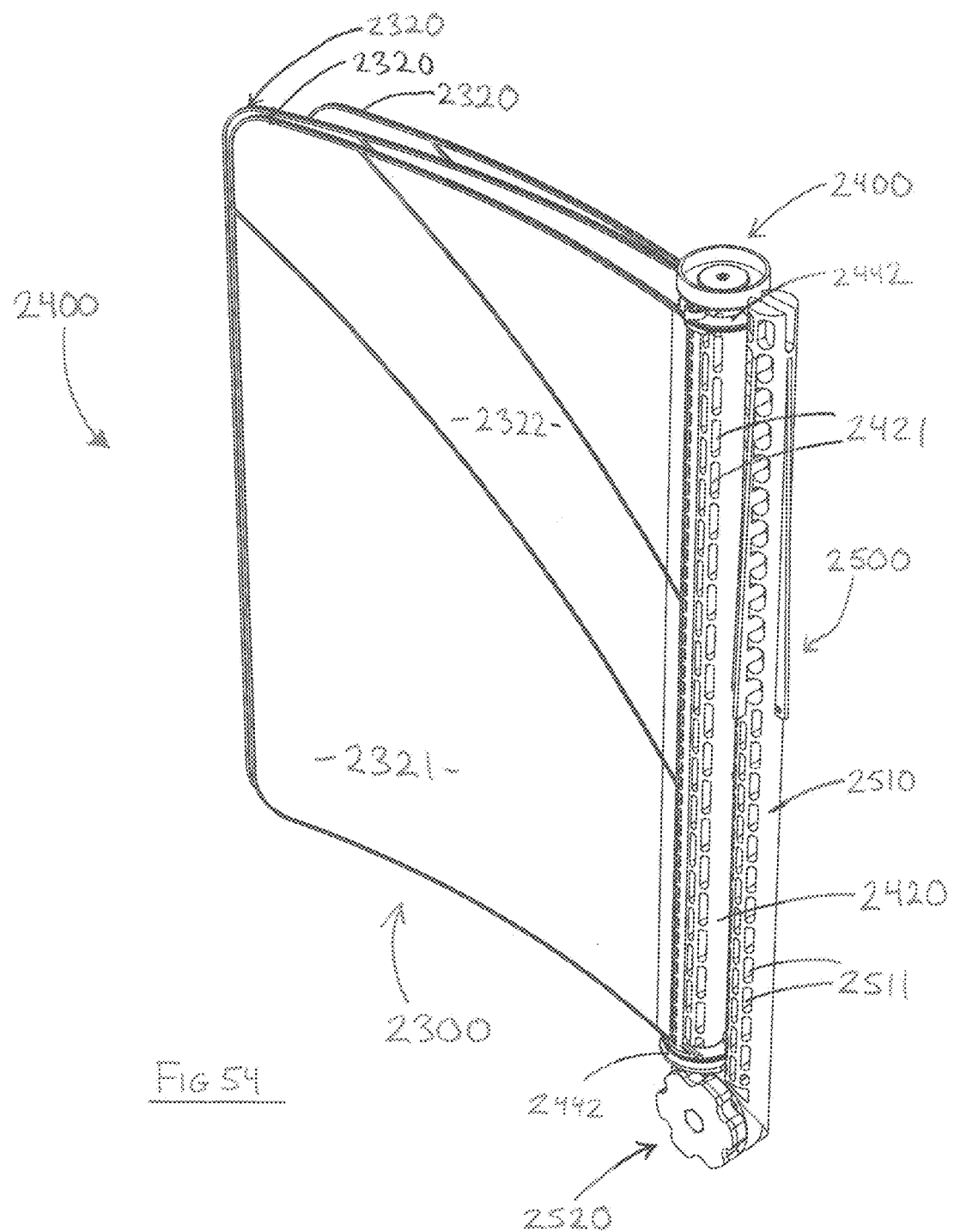
FIG. 54 is perspective view of the illustrative embodiment of the vessel mounted multi-directional signal assembly of FIG. 46 in a collapsed orientation.
Figure 56:
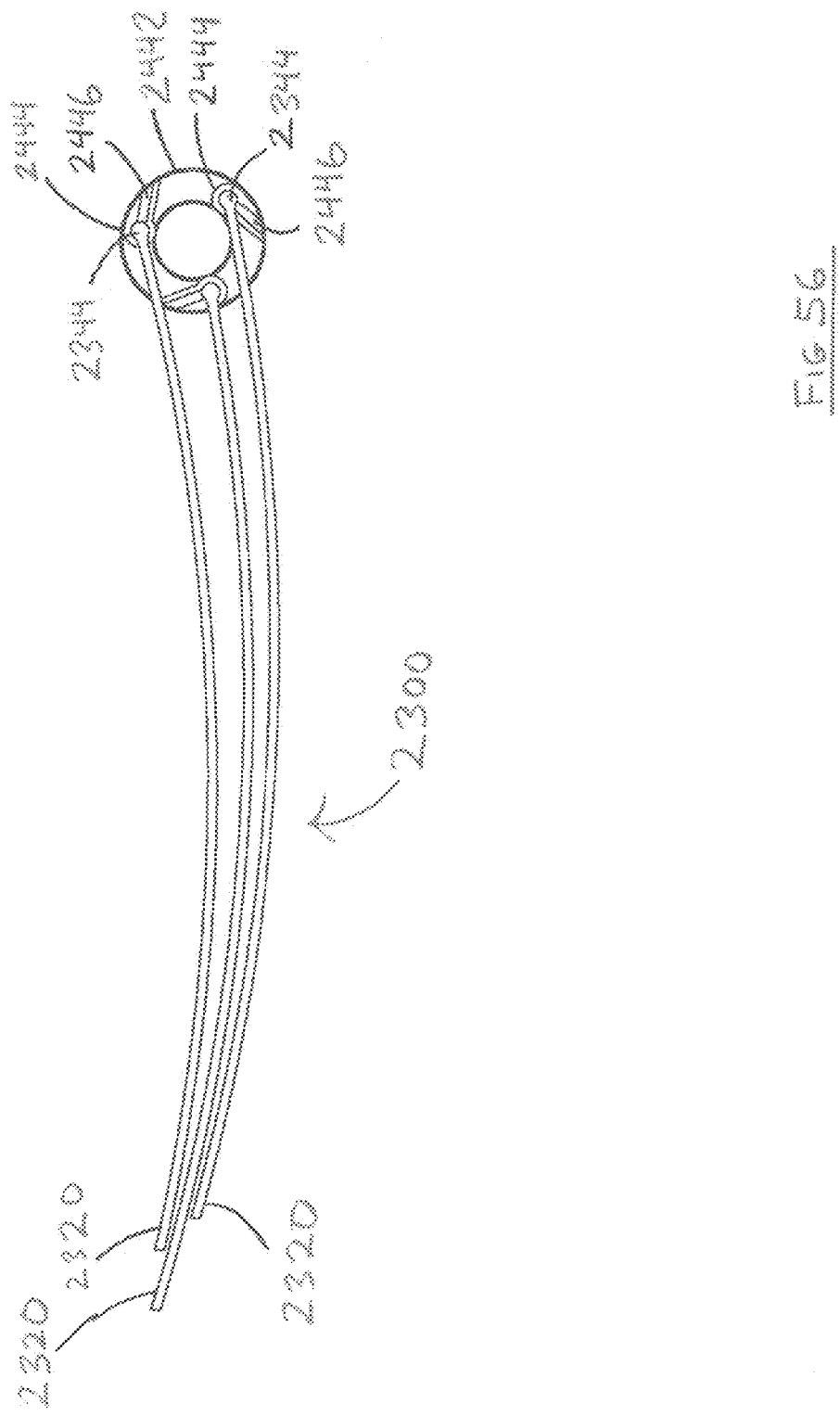
FIG. 56 is a partial cutaway view of one illustrative embodiment of signal display panels engaging an indexed member of a vessel mounted multi-directional signal assembly while disposed in a collapsed orientation in accordance with the present invention.

FIG. 56 is a partial cutaway view of one illustrative embodiment of a signal display panel 2320 of a multi-directional signal assembly 2300 engaging an indexed member 2442 in accordance with the present invention while disposed in a collapsed orientation. More in particular, when disposed in a collapsed orientation, while a first coupling member 2344 of each signal display panel 2320 is disposed in an operatively engaging and interconnected orientation with a corresponding second coupling member 2444 of indexed member 2442, no portion of any of the plurality of signal display panels 2320 is disposed within a corresponding guide channel 2446 of indexed member 2442, as shown best in FIG. 56. FIG. 54 is one further illustrative of one embodiment of a vessel mounted multi-directional signal assembly 2000 having a collapsible multi-direction signal assembly 2300 comprises a plurality of signal display panels 2320, wherein, each of the plurality of signal display panels 2320 is disposed in a collapsed orientation.

In order to dispose the plurality of signal display panels 2320 of the multi-directional display assembly 2300 between the deployed orientation, as shown by way of example in FIGS. 46 through 50 and 55, and the collapsed orientation as shown in FIGS. 54 and 56, the cap 2424 is rotated about support member 2420 until locking tabs 2425 disengage from corresponding locking slots 2423 and allowing the cap 2424 to be moved a short distance along the length of support member 2420, thereby allowing the corresponding edges 2323, 2323' of each signal display panel 2320 to be disengaged from corresponding guide channels 2446 and rotated about its first coupling members 2344, while remaining operatively engaged and interconnected with corresponding second coupling members 2444, until each signal display panel 2320 is positioned adjacent one another in the collapsed orientation as shown in the referenced figures. In at least one embodiment, each locking slot 2423 comprises a generally L-shaped configuration.

As previously indicated, FIG. 54 is further illustrative of a multi-directional signal assembly 2300 disposed in a collapsed orientation so as to facilitate transportation and/or storage of a vessel mounted-multi-directional signal assembly 2000 in accordance with at least one embodiment of the present invention. More in particular, and as shown best in the illustrative embodiment of FIG. 54, when disposed in a collapsed orientation, a vessel mount assembly 2500 is rotated towards and disposed substantially adjacent to a signal support assembly 2400. Adjustment unit 2520 is provided to permit disposition of a vessel mount assembly 2500 between an open configuration, such as is shown in the illustrative embodiment of FIGS. 46 through 50, and a closed configuration, as shown best in FIG. 54. As will be appreciated, disposition of the multi-directional signal assembly 2300 into a collapsed orientation in combination with disposition of a vessel mount assembly 2500 into a closed orientation, such as is shown in the illustrative embodiment of FIG. 54, significantly reduces a footprint of the present vessel mounted multi-directional signal assembly 2000, thereby facilitating transport and/or storage of the same.

Looking further to the illustrative embodiment of FIG. 53, an adjustment unit 2520 in accordance with at least one embodiment of the present invention is shown. More in particular, adjustment unit 2520 in at least one embodiment comprises a first adjustment member 2522, attached to one end of support member 2420, and a second adjustment member 2524 attached to an upper end of mount member 2510. First adjustment member 2522 and second adjustment member 2524 are cooperatively structured to engage one another in a secure yet incrementally movable configuration relative to one another. In at least one embodiment, each of first adjustment member 2522 and second adjustment member 2524 cooperatively comprise a birth type coupling each having a complimentary series of angular peaks and valleys radiating outwardly from a center, as may be seen from the illustrative embodiment of second adjustment member 2524 in FIG. 53. As such, when in position proximate one another, the peaks of one coupling member engage the valleys of the other coupling member, thereby collapsing into a quasi-unitary component, which is not readily separable when held in position via coupling 2526.

A coupling 2526 is utilized to interconnect first adjustment member 2522 to second adjustment member 2524. In at least one embodiment, such as is shown in the illustrative embodiment of FIG. 53, coupling 2526 may comprise a nut and bolt which extends through a portion of each of the first adjustment member 2522 and the second adjustment member 2524, as well as through a portion of an adjustment knob 2528. As will be appreciated from the foregoing, the head of the bolt of coupling 2526 is dimensioned to correspond to a portion of a channel through adjustment knob 2528 such that as adjustment knob 2528 is rotated in a clockwise or counterclockwise direction, the bolt of coupling 2526 will likewise be rotated in a clockwise or counterclockwise direction, thereby tightening or loosening coupling 2526 relative to first adjustment member 2522 and second adjustment member 2524. When coupling 2526 is loosened, first adjustment member 2522 and second adjustment member 2524 may be rotated relative to one another, thus allowing rotation of a mount member 2510 relative to signal mount assembly 2400.

Turning again to the illustrative embodiment as shown in FIGS. 46 through 50, a vessel mount assembly 2500 in accordance with at least one embodiment of the present invention is illustrated. As may be best seen in FIGS. 47 and 49, vessel mount assembly 2500 comprises a mount member 2510 having a generally elongated configuration. A mount member may be constructed from any of a variety of rigid or semi-rigid materials including but in no manner limited to wood, metal, e.g., aluminum, metal alloys, plastic, fiberglass, etc. In at least one embodiment, and similar to support member 2420, a mount member 2510 may comprise a plurality of construction apertures 2511 which extend at least partially therethrough, however, in at least some cases a plurality of construction apertures 2511 extend completely through mount member 2510. As before, the plurality of construction apertures 2511 are strategically positioned in an array so as to optimize the benefits of reduced materials of construction, thereby reducing cost as well as the overall weight of the assembly 2000, while maintaining sufficient structural integrity to the mount member 2510.

In at least one embodiment, a mount member 2510 on a vessel mounted assembly 2500 comprises at least one wing 2512 extending outwardly from and along a distal portion thereof. In another embodiment, such as is illustrated best in FIG. 47, a mount member 2510 comprises a plurality of wings 2512 extending outwardly from a distal end thereof. In at least one further embodiment, a mount member 2510 comprises four wings, each disposed approximately ninety degrees apart from one another around a distal end of mount member 2510, each of the wings 2512 extending outwardly thereof.

Figure 57:
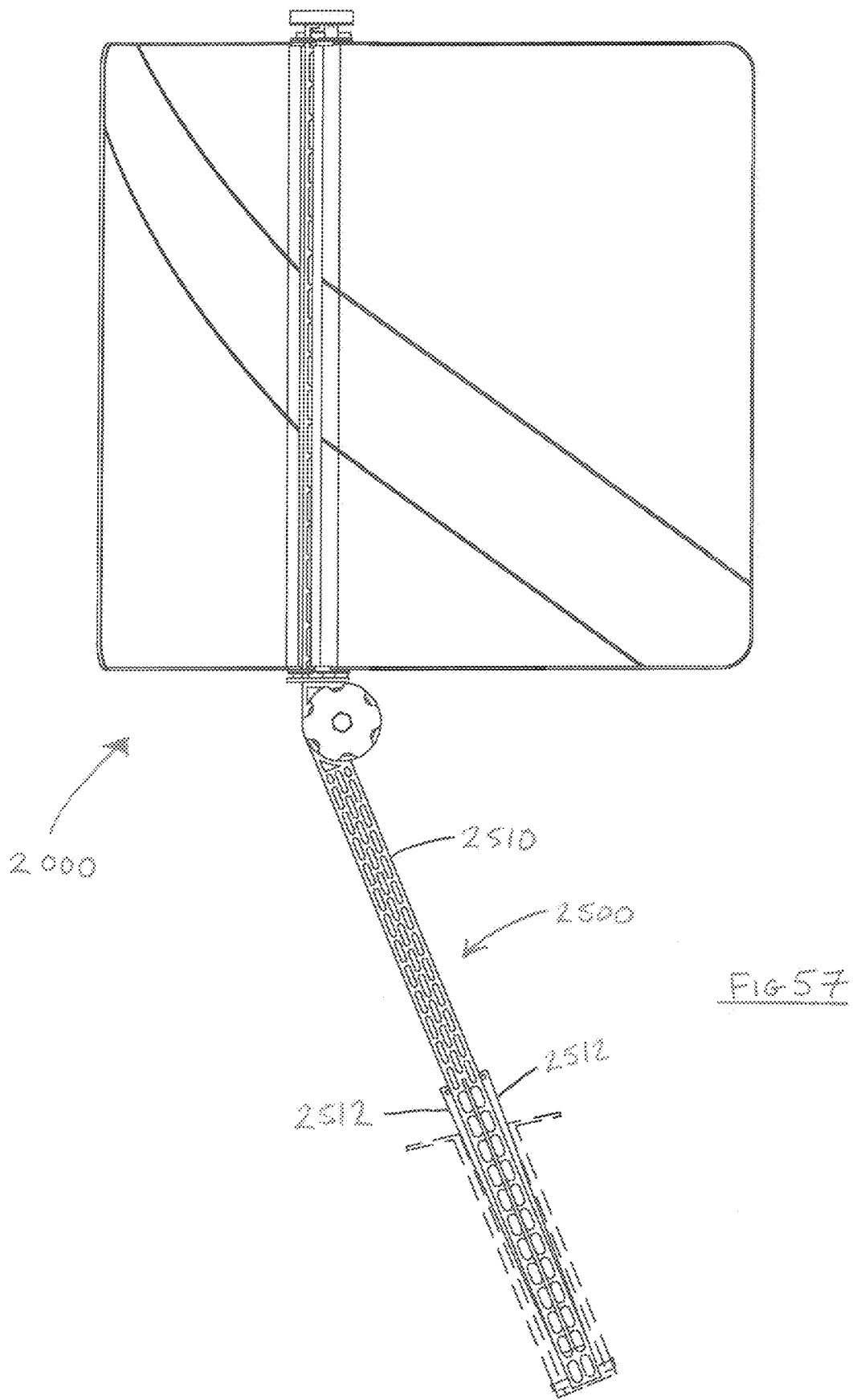
FIG. 57 is a partial perspective view of one illustrative embodiment of a vessel mount assembly cooperatively engaging a rod holder on a vessel in accordance with the present invention.
Figure 58:
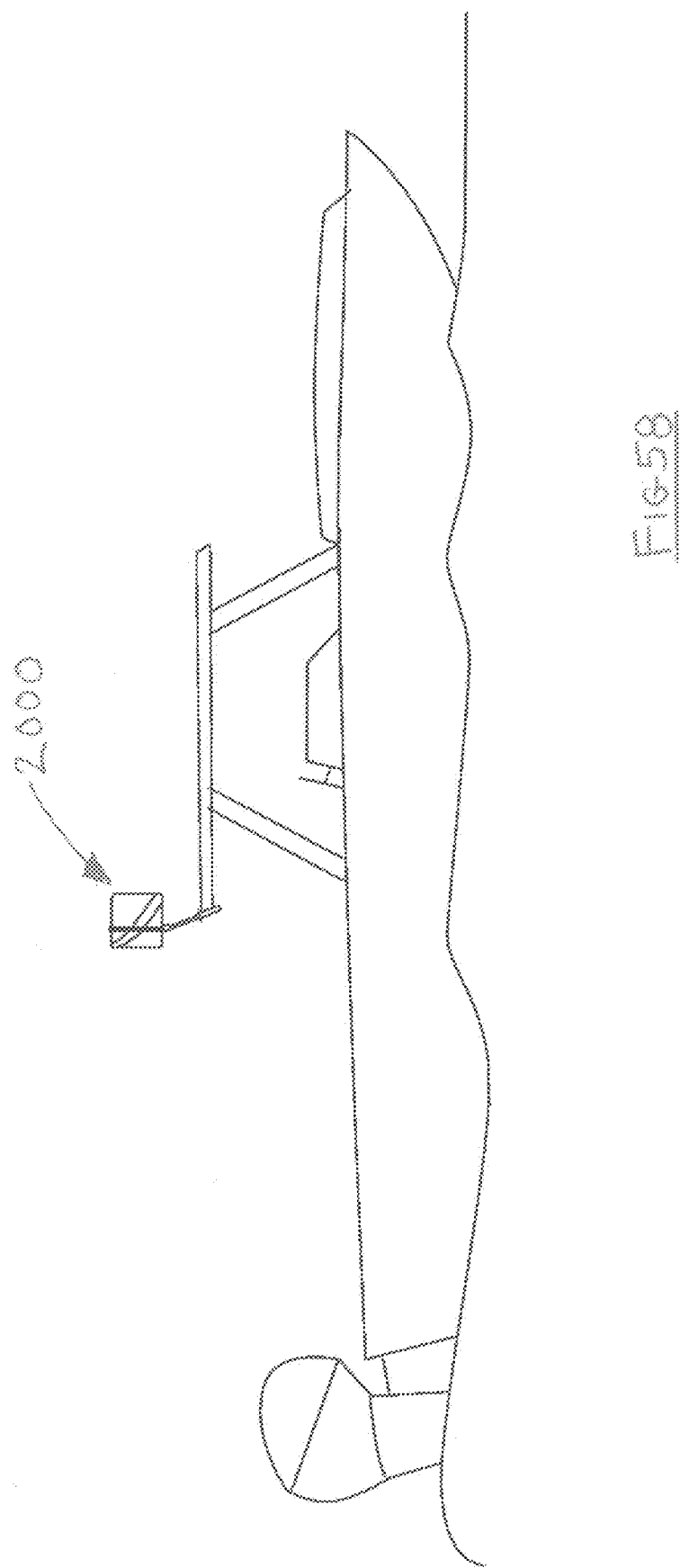
FIG. 58 is a perspective view of one illustrative embodiment of a vessel mounted multi-directional signal assembly deployed on a vessel in accordance with the present invention.

As will be appreciated from the illustrative embodiment of FIG. 57, wherein a vessel mount assembly 2500 of a vessel mounted multi-directional signal assembly 2000 cooperatively engages a rod holder of a vessel in accordance with the present invention, the wings 2512 serve to center mount member 2510 within the rod holder as well as to provide for a snug compression fit thereof. In at least one further embodiment, a vessel mount assembly 2500 comprises an index notch 2514 disposed through a portion of a distal end of mount member 2510, such as is shown best in FIG. 49. Index notch 2514 is dimensioned to correspond with a cross pin disposed in a rod holder of a vessel such that when a vessel mount assembly 2500 is inserted into a rod holder, the index notch 2514 engages cross pin of the rod holder thereby preventing rotation of the mount member 2510 and thus, preventing unwanted rotation of the vessel mounted multi-directional signal assembly 2000, in accordance with the present invention. FIG. 58 presents one illustrative embodiment of a vessel mounted multi-directional signal assembly 2000 deployed in a rod holder of a vessel in accordance with the present invention.

Figure 51:
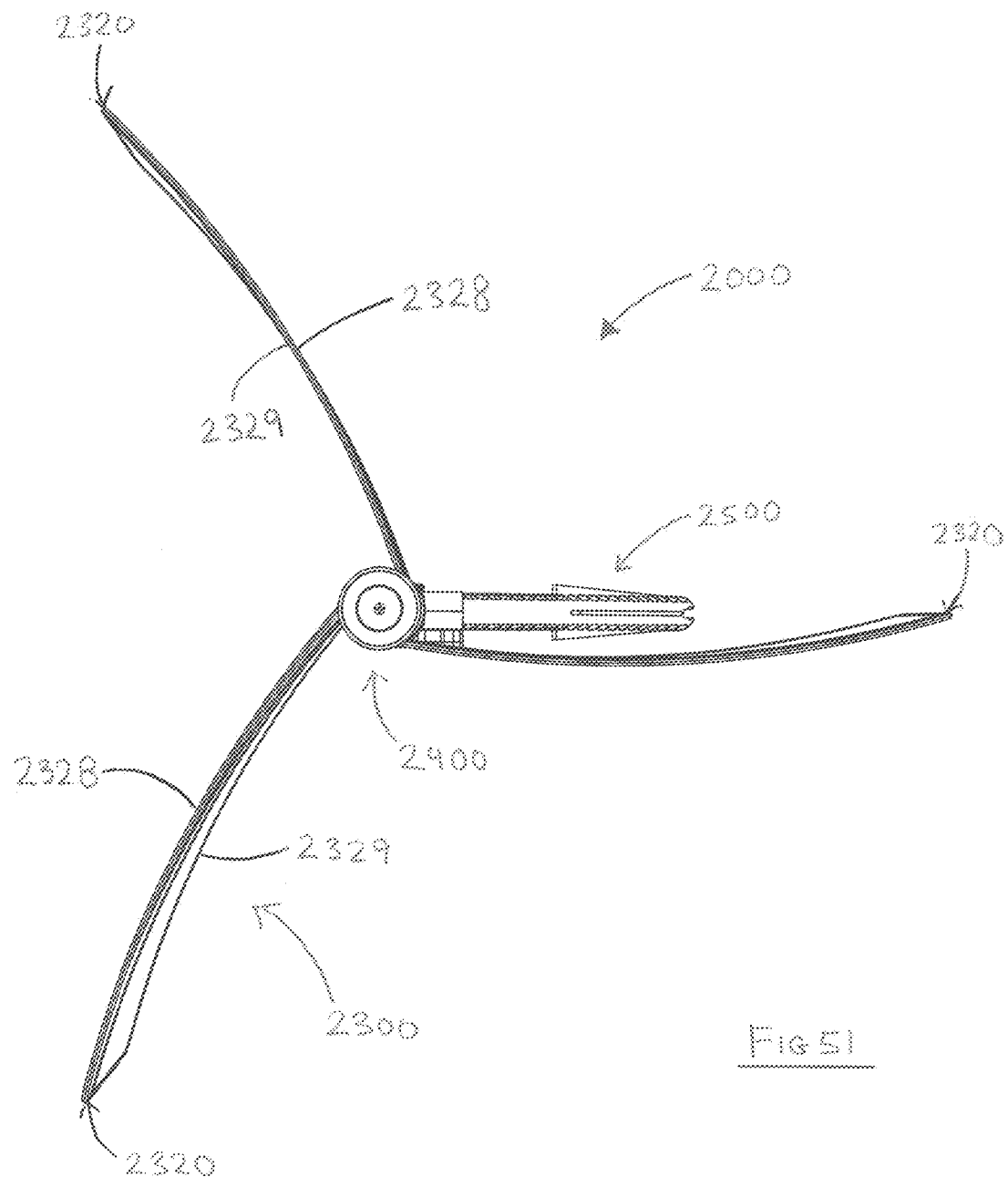
FIG. 51 is top plan view of the illustrative embodiment of the vessel mounted multi-directional signal assembly of FIG. 46.
Figure 52:
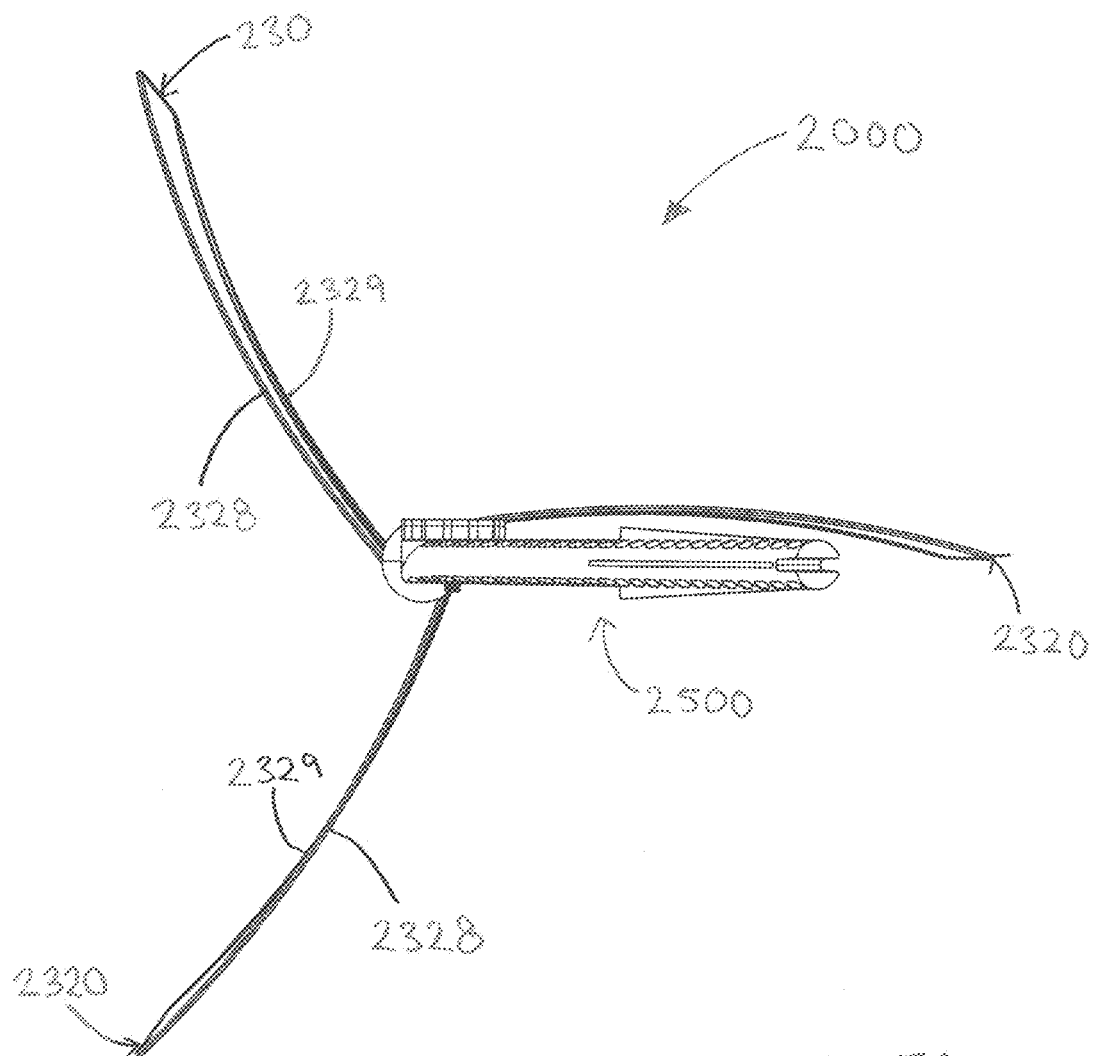
FIG. 52 is bottom plan view of the vessel mounted multi-directional signal assembly of FIG. 46.

Turing next to the illustrative embodiment of the vessel mounted multi-directional signal assembly 2000 in accordance with the present invention as shown in FIGS. 51 and 52, a convex surface 2328 and corresponding concave surface 2329 of each signal display panel 2320 is also clearly illustrated. With reference to FIG. 53, each signal display panel 2320 comprises a panel arc 2326 which is at least partially defined by an arc angle formed between an inner edge 2324 and an outer edge 2325 of each panel 2320, wherein the panel arc 2326 at least partially defines the convex surface 2328 and corresponding concave surface 2329.

As will be further appreciated from the illustrative embodiments of FIGS. 51 and 52, the plurality of signal display panels 2320 in accordance with at least one embodiment of a vessel mounted multi-directional signal assembly 2000 in accordance with the present invention comprises a Savonious style wind turbine which reduces the drag against the panels 2320 when moving against the wind rather than when moving with the wind, whereby in a difference in drag causes the panels 2320 of the multi-directional assembly 2300 to spin. Further, the triadic design, i.e., three signal display panels 2320 disposed equidistance from one another, allows the multi-directional signal assembly 2300 to spin regardless of the direction in which the wind is blowing, as the wind will catch at least one of the plurality of signal display panels 2320 and begin rotation of the multi-directional signal assembly 2300, regardless of origin of the wind.

Figure 59:
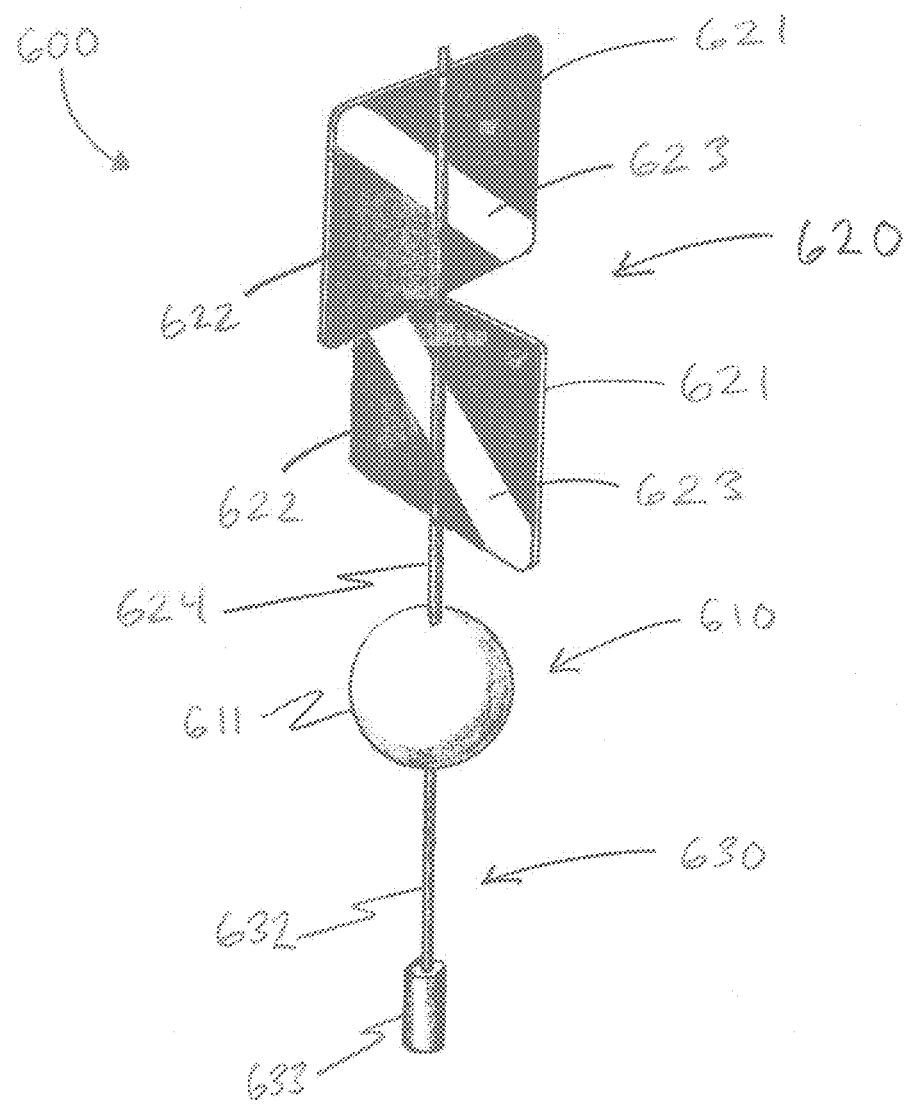
FIG. 59 is a perspective view of yet one further alternate illustrative embodiment of a multi-directional signal assembly in accordance with the present invention.

Turning next to FIG. 59, a perspective view of yet one further alternate illustrative embodiment of a multi-directional signal assembly 2000 in accordance with the present invention is presented. As shown in the illustrative embodiment of FIG. 59, a multi-directional signal assembly 600 comprises a signal display assembly 620 having a plurality of display panels 621. Each display panel 621 has a display surface 622 disposed on opposite sides thereof. A signal indicia 623 is affixed to at least one display surface 622 of a signal display assembly 620 in accordance with the present invention. In at least one embodiment, a signal indicia 623 is affixed to each display surface 622 of each display panel 621.

Signal indicia 623, in accordance with at least one embodiment of the present invention and as disclosed above, comprises a Unites States dive flag, which is a widely known and readily recognizable signal indicating that a diver or snorkeler is in the water in the vicinity of the dive flag. The U.S. dive flag is crucial to mark the location of divers or snorkelers in the water, so that boats know to steer clear of the area for obvious safety reasons. The U.S. dive flag consists of a bright red or orange square having a broad white band running diagonally there through from the upper left corner to the lower right corner, such as is shown, by way of example, in the illustrative embodiment of FIG. 59.

A signal display assembly 620 in accordance with at least one embodiment of the present invention further comprises a support 624 to which display panels 621 are securely attached. In at least one embodiment, and more in particular, with reference to the illustrative embodiment of FIG. 59, display panels 621 are securely attached to a support 624 and are arranged substantially perpendicular to one another, as well as being positioned one on top of the other.

As such, and as will be appreciated from the illustrative embodiment of FIG. 59, at least one of the plurality of display surfaces 622 is visible from any point along a circle circumscribed around a vertical axis through the signal display unit 620 and planar with the plurality of display surfaces 622. Stated otherwise, while deployed in a body of water, at least one of the plurality of display surfaces 622 of the present multi-directional signal assembly 600, and more importantly, at least one signal indicia 623 displayed thereon, is visible from any direction.

FIG. 59 further illustrates that in at least one embodiment, a signal display assembly 600 in accordance with the present invention comprises a float assembly 610 having a float body 611, to facilitate deployment of a signal display assembly 620 on a surface of a body of water. More in particular, float body 611 comprises a buoyant construction sufficient to support a signal display assembly 620 on a surface of a body of water. In at least one embodiment, a float body 611 includes an inner core (not shown) formed of a lightweight material of construction and an outer coating (not shown) to impart structural integrity to the inner core 116, similar to an exoskeleton, in a similar manner as disclosed above with reference to FIG. 15.

In accordance with the illustrative embodiment of FIG. 59, a multi-directional signal assembly 600 further comprises a counterweight assembly 630, to provide stability and to maintain a signal display assembly 620 in an upright orientation relative to a surface of a body of water when the present multi-directional signal assembly 600 is deployed thereon. As before, a counterweight assembly 630 in accordance with at least one embodiment of the present invention comprises a weight deployment member 632. A weight 633 is affixed to one end of weight deployment member 632, as shown in the illustrative embodiment of FIG. 59. Weight deployment member 632 may be retractable, such as, into support 624, so as to facilitate transport and/or storage of the present multi-directional signal assembly 600. In at least one embodiment, weight 633 is securely affixed to one end of weight deployment member 632. In at least one further embodiment, weight 633 is movably or removably attached to weight deployment member 632, once again, to facilitate transport and/or storage of the present multi-directional signal assembly 600. A movable weight 633 further allows adjustment of the position of weight 633 relative to the signal display assembly 620 as may be dictated by conditions on a body of water in order to maintain the signal display assembly 620 in an upright operative display orientation.

FIGS. 69 through 73 are illustrative of a collapsible multi-directional signal assembly generally as shown as 2000' disposed in various land-based operative environments. With the exception of modifications to a mount assembly to facilitate installation in an operative land-based orientation, the present collapsible land-based multi-directional signal assembly 2000' comprises essentially identical operative components as shown in detail in FIGS. 46 through 58, and as such, these components are not represented and specifically identified in FIGS. 69 through 73.

Figure 69:
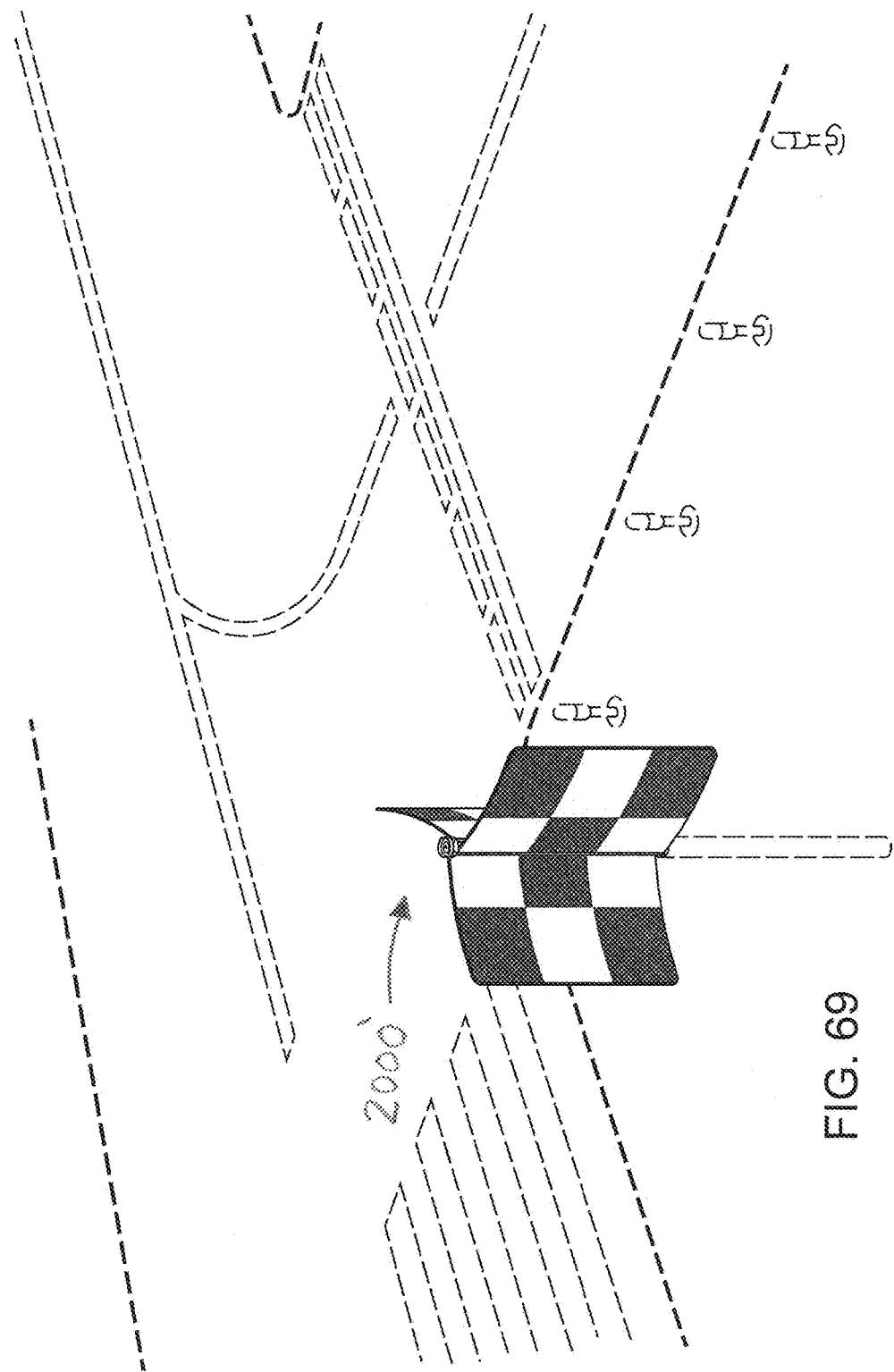
FIG. 69 is a perspective view of one illustrative embodiment of a collapsible land-based multi-directional signal assembly disposed in a land-based installation having a plurality of signal display panels fully deployed in an operative display orientation.

Looking first to FIG. 69, a collapsible land-based multi-directional signal assembly 2000' is operatively disposed proximate an airport runway. As shown in FIG. 69, the collapsible land-based multi-directional signal assembly 2000' comprises a plurality of signal display panels as was described in detail with reference to FIGS. 46 through 58.

As is shown in the illustrative embodiment of FIG. 69, each of the plurality of the signal display panels includes at least one display surface having a signal indicia affixed thereto and displayed thereon. As further shown in the illustrative embodiment of FIG. 69, each signal indicia comprises a portion of an indicia representative of a standard Federal Aviation Administration checkered airport flag. As before, the signal indicia affixed on display surfaces of adjacent ones of the plurality of signal display panels are complimentary with one another so that when viewed in combination, each complimentary pair of signal indicia form a single indicia representative of a standard Federal Aviation Administration checkered airport flag displayed across corresponding adjacent ones of the plurality of signal display panels. As before, the plurality of signal display panels are rotatable about a signal mount assembly so as to further alert pilots moving aircraft about the runaway to the presence and location of the checkered airport flag.

The plurality of signal display panels of collapsible land-based multi-directional signal assembly 2000' in accordance with the present invention may be constructed from any of a variety of rigid or semi-rigid materials of construction, such as, but in no manner limited to wood, metal, e.g., aluminum, metal alloys, plastic, fiberglass, etc., once again, as was described in detail with reference to FIGS. 46 through 58.

Figure 70:
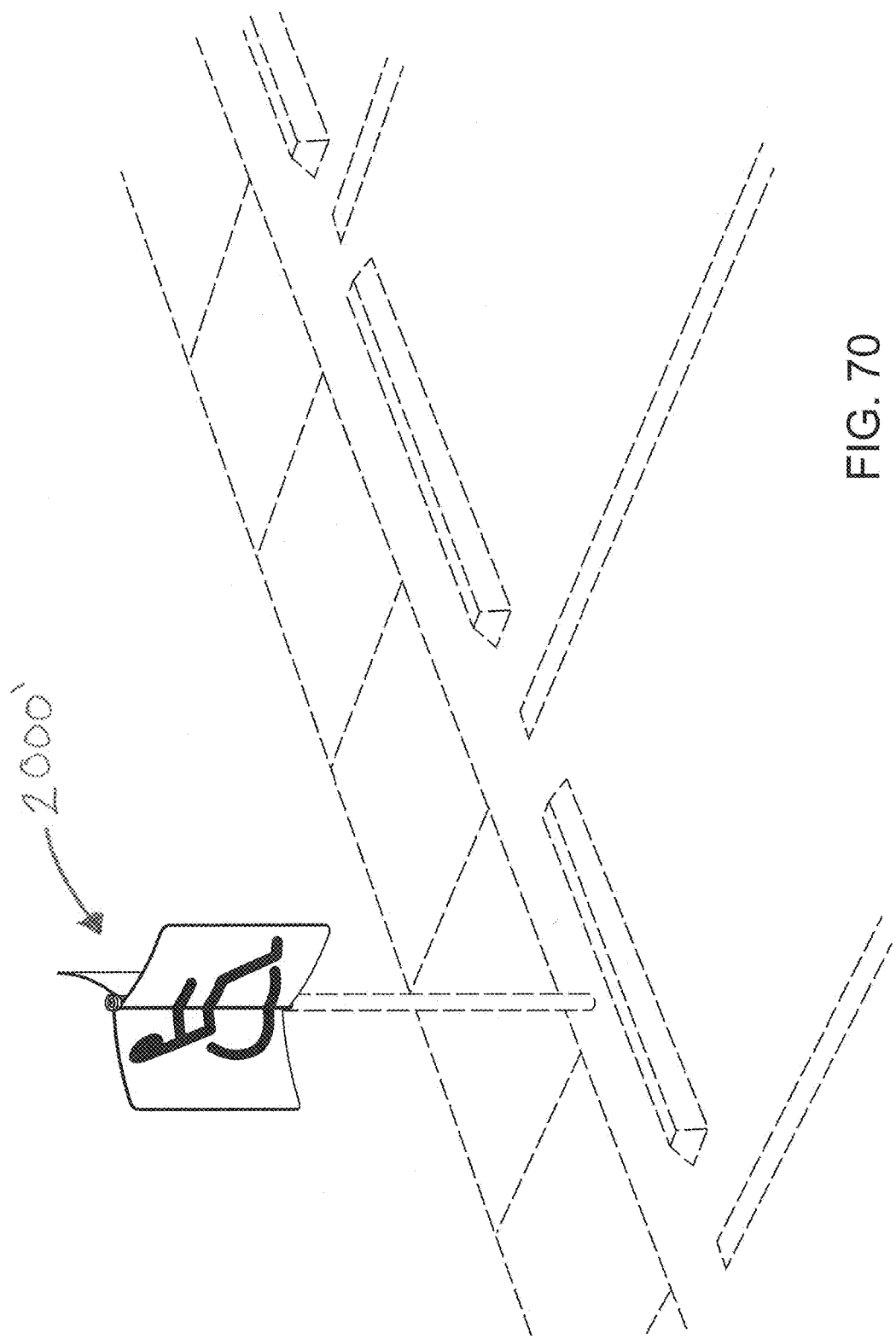
FIG. 70 is a perspective view of another illustrative embodiment of a collapsible land-based multi-directional signal assembly disposed in a land-based installation having a plurality of signal display panels fully deployed in an operative display orientation.

Turning next to the illustrative embodiment of FIG. 70, each of a plurality of signal display panels of a collapsible land-based multi-directional signal assembly 2000' include at least one display surface having a signal indicia affixed thereto and displayed thereon, and each signal indicia comprises a portion of an indicia representative of a handicapped parking sign. Once again, the plurality of signal display panels are rotatable about a signal mount assembly so as to further alert drivers to the presence and location of the handicapped parking sign and corresponding designated handicapped parking space.

Figure 71:
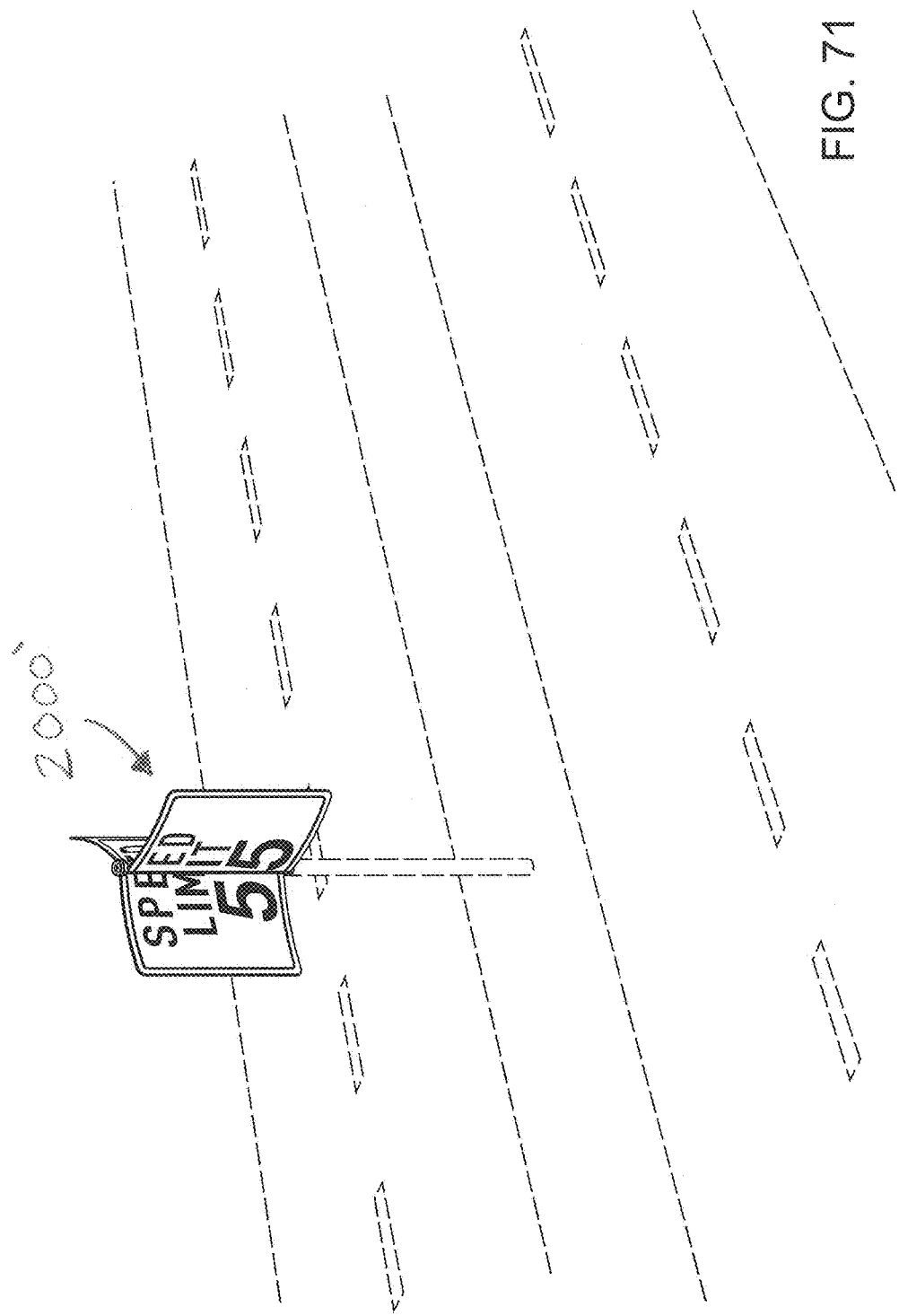
FIG. 71 is a perspective view of one further illustrative embodiment of a collapsible land-based multi-directional signal assembly disposed in a land-based installation having a plurality of signal display panels fully deployed in an operative display orientation.

The illustrative embodiment of FIG. 71 is representative of one embodiment of a collapsible land-based multi-directional signal assembly 2000' disposed to alert drivers travelling in either direction of a roadway as to the speed limit. Of course, it will be appreciated by those of skill in the art that a collapsible land-based multi-directional signal assembly 2000' in accordance with the present invention may be utilized to convey other forms of information to drivers travelling in either direction of a roadway, such as, by way of example only, road work in the area, fog alerts, road closures, etc.

As shown in the illustrative embodiment of FIG. 71, each of a plurality of signal display panels of a collapsible land-based multi-directional signal assembly 2000' once again include at least one display surface having a signal indicia affixed thereto and displayed thereon, and each signal indicia comprises a portion of an indicia representative of a speed limit sign. As before, the plurality of signal display panels are rotatable about a signal mount assembly so as to further alert drivers to the speed limit on the roadway on which he or she is travelling.

Figure 72:
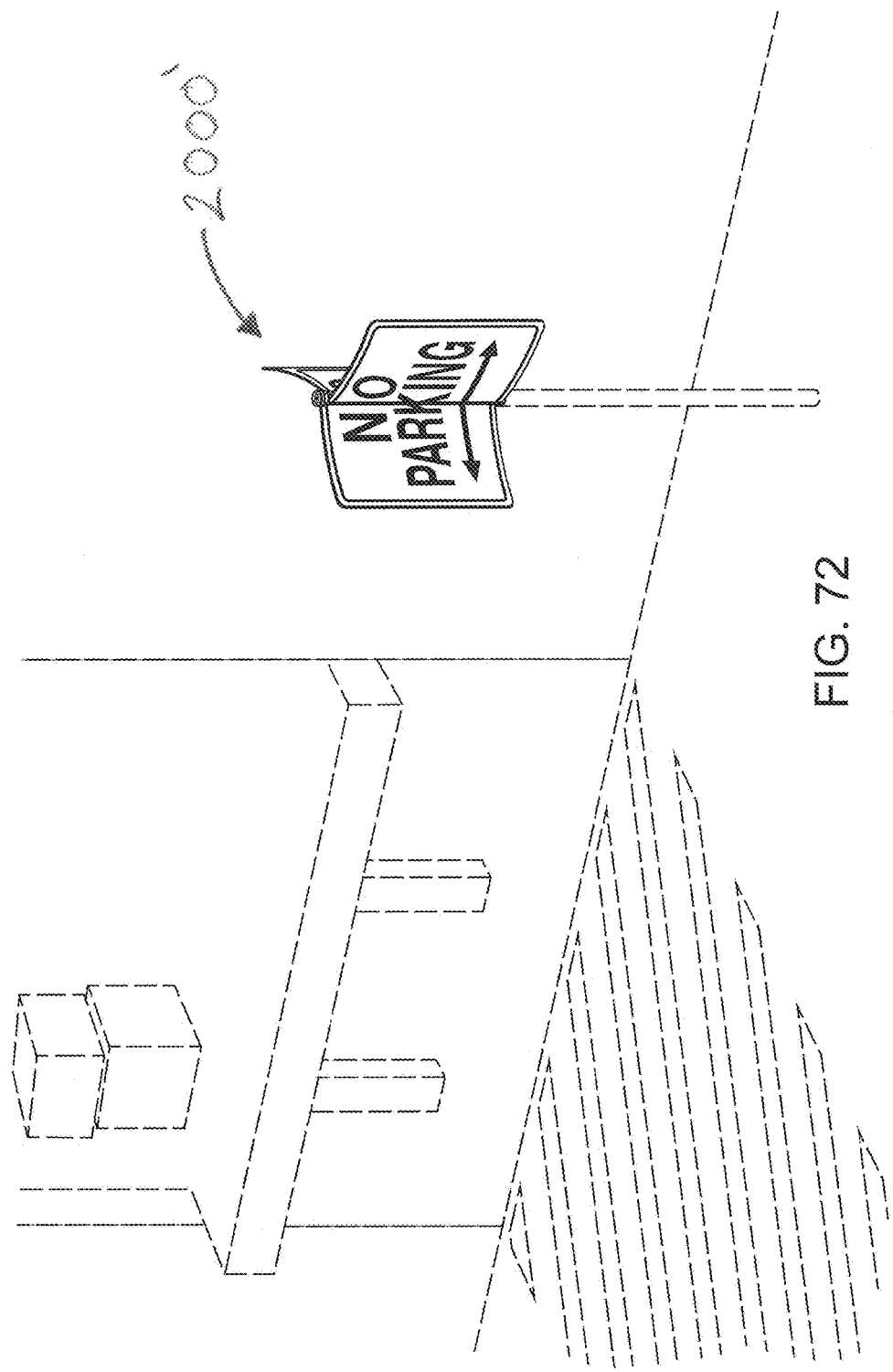
FIG. 72 is a perspective view of still another illustrative embodiment of a collapsible land-based multi-directional signal assembly disposed in a land-based installation having a plurality of signal display panels fully deployed in an operative display orientation.

With reference to the illustrative embodiment of FIG. 72, and somewhat similar to the illustrative embodiment of FIG. 70, each signal indicia affixed to the plurality of signal display panels of a collapsible land-based multi-directional signal assembly 2000' include a portion of an indicia representative of a no parking sign. Once again, the plurality of signal display panels are rotatable about a signal mount assembly so as to further alert drivers to the presence and location of the no parking sign.

FIG. 73 is illustrative of one embodiment of a collapsible land-based multi-directional signal assembly generally as shown at 2000' disposed in a land-based vehicle operative environment. More in particular, and as may be seen from FIG. 73, a collapsible land-based multi-directional signal assembly 2000' is operatively mounted to a portion of a pick-up truck. As further illustrated in FIG. 73, each signal indicia affixed to the plurality of signal display panels of a collapsible land-based multi-directional signal assembly 2000' include a portion of an indicia representative of a sports team cheer, in this case, GO TIGERS.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A collapsible land-based multi-directional signal assembly deployable in an operative land-based orientation, said assembly comprising:
    a collapsible multi-directional signal display assembly comprising a plurality of signal display panels, said plurality of signal display panels disposable between a deployed orientation and a collapsed orientation,
    each of said plurality of signal display panels comprising a pair of oppositely disposed display surfaces,
    each of said plurality of signal display panels further comprising an inner edge and an outer edge,
    an interconnect member attached along said inner edge of each of said plurality of signal display panels, each said interconnect member comprising oppositely disposed ends,
    a plurality of complimentary signal indicia, wherein at least one of said plurality of complimentary signal indicia is affixed onto a different one of each of said plurality of display surfaces,
    a signal support assembly and a signal mount assembly, wherein said signal support assembly and said signal mount assembly are cooperatively structured to facilitate disposition of said plurality of signal display panels between said deployed orientation and said collapsed orientation, wherein said collapsed orientation is at least partially defined by each of said plurality of signal display panels disposed adjacent and overlying or underlying one another and extending outwardly in a single direction from said signal support assembly while remaining interconnected thereto, and
    a mount assembly operatively interconnected to said signal support assembly, wherein said mount assembly comprises a mount member to securely mount said collapsible multi-directional signal display assembly in the operative land-based orientation.

2. The collapsible land-based multi-directional signal assembly as recited in claim 1 wherein each said interconnect member comprises at least one first coupling member affixed to one of said oppositely disposed ends thereof.

3. The collapsible land-based multi-directional signal assembly as recited in claim 1 wherein each said interconnect member comprises a first coupling member affixed to each of said oppositely disposed ends thereof.

4. The collapsible land-based multi-directional signal assembly as recited in claim 3 wherein said signal mount assembly comprises at least one indexed member having a plurality of second coupling members attached thereto.

5. The collapsible land-based multi-directional signal assembly as recited in claim 4 wherein said at least one indexed member further comprises a plurality of guide channels, wherein each of said plurality of guide channels corresponds to a different one of said plurality of second coupling members.

6. The collapsible land-based multi-directional signal assembly as recited in claim 5 wherein each of said plurality of signal display panels further comprises an upper edge and a lower edge.

7. The collapsible land-based multi-directional signal assembly as recited in claim 6 wherein said deployed orientation of said plurality of signal display panels is at least partially defined by at least one said first coupling member affixed to one said oppositely disposed end of said interconnect member of each of said plurality of signal display panels disposed in an operative engagement with a corresponding different one of said plurality of second coupling members of said at least one indexed member, and at least a portion of one of said upper edge or said lower edge of each of said plurality of signal display panels is disposed in a corresponding one of said plurality of guide channels of said at least one indexed member.

8. The collapsible land-based multi-directional signal assembly as recited in claim 6 wherein said deployed orientation of said plurality of signal display panels is further defined by each of said first coupling members affixed to each of said oppositely disposed ends of said interconnect member of each of said plurality of signal display panels disposed in an operative engagement with a corresponding different one of said plurality of second coupling members of oppositely disposed indexed members, and at least a portion of each of said upper edge and said lower edge of each of said plurality of signal display panels is disposed in operative engagement within a corresponding one of said plurality of guide channels of said oppositely disposed indexed members.

9. The collapsible land-based multi-directional signal assembly as recited in claim 6 wherein said collapsed orientation of said plurality of signal display panels is at least partially defined by each of said first coupling members affixed to each of said oppositely disposed ends of said interconnect member of each of said plurality of signal display panels disposed in an operative engagement with a corresponding different one of said plurality of second coupling members of oppositely disposed indexed members, while each of said upper edge and said lower edge of each of said plurality of signal display panels is disengaged from and outside of corresponding ones of said plurality of guide channels of said oppositely disposed indexed members.

10. The collapsible land-based multi-directional signal assembly as recited in claim 1 wherein said complimentary signal indicia affixed onto corresponding adjacent ones of said plurality of display surfaces in combination form a single indicia representative of a Federal Aviation Administration checkered airport flag.

11. The collapsible land-based multi-directional signal assembly as recited in claim 1 wherein said complimentary signal indicia affixed onto corresponding adjacent ones of said plurality of display surfaces in combination form a single indicia representative of a handicapped parking sign.

12. The collapsible land-based multi-directional signal assembly as recited in claim 1 wherein said complimentary signal indicia affixed onto corresponding adjacent ones of said plurality of display surfaces in combination form a single indicia representative of a speed limit sign.

13. The collapsible land-based multi-directional signal assembly as recited in claim 1 wherein said complimentary signal indicia affixed onto corresponding adjacent ones of said plurality of display surfaces in combination form a single indicia representative of a no parking sign.

14. The collapsible land-based multi-directional signal assembly as recited in claim 1 wherein said complimentary signal indicia affixed onto corresponding adjacent ones of said plurality of display surfaces in combination form a single indicia representative of a sports team cheer.

* * * * *